(12) United States Patent
Iyer et al.

(10) Patent No.: US 7,130,812 B1
(45) Date of Patent: Oct. 31, 2006

(54) METHOD AND SYSTEM FOR MANAGING REAL TIME DATA

(75) Inventors: Rama Iyer, Irvine, CA (US); Gregory S. Bradley, Webster Groves, MO (US); Phillip R. Shaw, St. Louis, MO (US); Jeffery M. Penner, Hazelwood, MO (US); David L. Huffman, Irvine, CA (US); Emmanual G. Pandy, Tustin, CA (US); Kanika Ghosh, Laguna Niguel, CA (US); Devanand Ramachandren, West Mambalam (IN)

(73) Assignee: Centergistic Solutions, Inc., Orange, CA (US)

( * ) Notice: Subject to any disclaimer, the term of this patent is extended or adjusted under 35 U.S.C. 154(b) by 0 days.

(21) Appl. No.: 10/723,754

(22) Filed: Nov. 26, 2003

(51) Int. Cl.
*G06F 17/30* (2006.01)

(52) U.S. Cl. .......................... 705/10; 705/28
(58) Field of Classification Search .................. 705/10, 705/28; 707/101, 104.1
See application file for complete search history.

(56) References Cited

U.S. PATENT DOCUMENTS

| | | | |
|---|---|---|---|
| 6,038,564 A * | 3/2000 | Sameshima et al. ........... | 707/10 |
| 6,078,924 A * | 6/2000 | Ainsbury et al. ............ | 707/101 |
| 6,119,103 A * | 9/2000 | Basch et al. ................. | 705/35 |
| 6,151,584 A * | 11/2000 | Papierniak et al. ........... | 705/10 |
| 6,532,427 B1 * | 3/2003 | Joshi et al. .................... | 702/84 |
| 6,633,834 B1 * | 10/2003 | Conrad et al. ............... | 702/188 |
| 6,664,897 B1 * | 12/2003 | Pape et al. ................ | 340/573.3 |
| 6,700,575 B1 * | 3/2004 | Bovarnick et al. .......... | 345/440 |
| 6,968,316 B1 * | 11/2005 | Hamilton ................... | 705/36 R |

FOREIGN PATENT DOCUMENTS

WO    WO 9828698 A1 *  7/1998
WO    WO 9855954 A1 * 12/1998

OTHER PUBLICATIONS

Kapsamelis "Strategies for implementing enterprise-wide data collection systems"; Apr. 1998; Automatic I.D. News v14n4 pp. 23-24; Dialog file 15, Accession No. 01611751.*

Trithart "The environment: the data, the information, the debate"; Sep. 1990; RQ, v30, n1 p. 13(10); Dialog 148, Accession No. 04911436.*

* cited by examiner

*Primary Examiner*—Romain Jeanty
(74) *Attorney, Agent, or Firm*—Klein, O'Neill & Singh, LLP

(57) ABSTRACT

A system and method for information management is provided. The system provides for collection of data from multiple, dissimilar and disparate sources having various collection schedules by a plurality of data collectors. It further provides a central database for storage of the collected data with front-end alerts and triggers. The central database has a central data store module for data storage and a central configuration module for configuring the data as well as the components of the system. The system includes a reporting module for generating and forwarding user specific scheduled reports from the accessed data in the central database. The presentation of the data could be any time, anywhere and in any format required by the end user. The system also provides an administration module for collecting, monitoring and configuring the collected data, data collectors, central database and the reports for the end user(s).

12 Claims, 105 Drawing Sheets

| QUESTIONNAIRE | TITLE | DESCRIPTION |
|---|---|---|
| 1 | SALES FORECAST | COLLECTS SALES FORECAST INFORMATION FROM SALES TEAM-MEMBERS |
| 2 | QUALITY INFORMATION | COLLECTS PRODUCTION QUALITY INFORMATION |

RESPONDERS

| RESPONDER ID | QUESTIONNAIRE | USER ID |
|---|---|---|
| 1 | 1 | 12 |
| 2 | 1 | 6 |

PRESENTATION SCHEDULE

| SCHEDULE ID | RESPONDER ID | START DATE | END DATE | DAYS OF WEEK FREQUENCY | REMAINDER EMAIL TIME | EMAIL TEXT |
|---|---|---|---|---|---|---|
| 1 | 1 | 11/01/01 | 01/31/02 | M,T,W,TH,F | 16:00 HOURS | RESPOND AT A WEBSITE E.G. WWW.ABC.COM |
| 2 | 2 | 07/01/00 | 06/30/01 | EVERY MONTH END | 10:00 HOURS | INPUT MONTHLY FORECAST |

QUESTIONS

| QUEST | QUESTIONNAIRE | TYPE | TEXT | RESULT TYPE | VALIDATE |
|---|---|---|---|---|---|
| 1 | 1 | NUMERIC | WHAT DO YOU THINK REVENUES FOR NEXT QUARTER ARE? | NUMERIC | YES |
| 2 | 1 | TRUE/FALSE | DID YOU CALL 30 CUSTOMERS TODAY? | BOOLEAN | YES |
| 3 | 1 | TEXT | WHO DO YOU EXPECT TO CONVERT FROM PROSPECTIVE CUSTOMER? | TEXT (256) | NO |
| 4 | 1 | RANGE | ON A SCALE OF 1 TO 10 WHAT DO YOU THINK ARE CHANCES OF CONVERTING PROSPECT? | BITMAP | NO |

FIGURE 4F

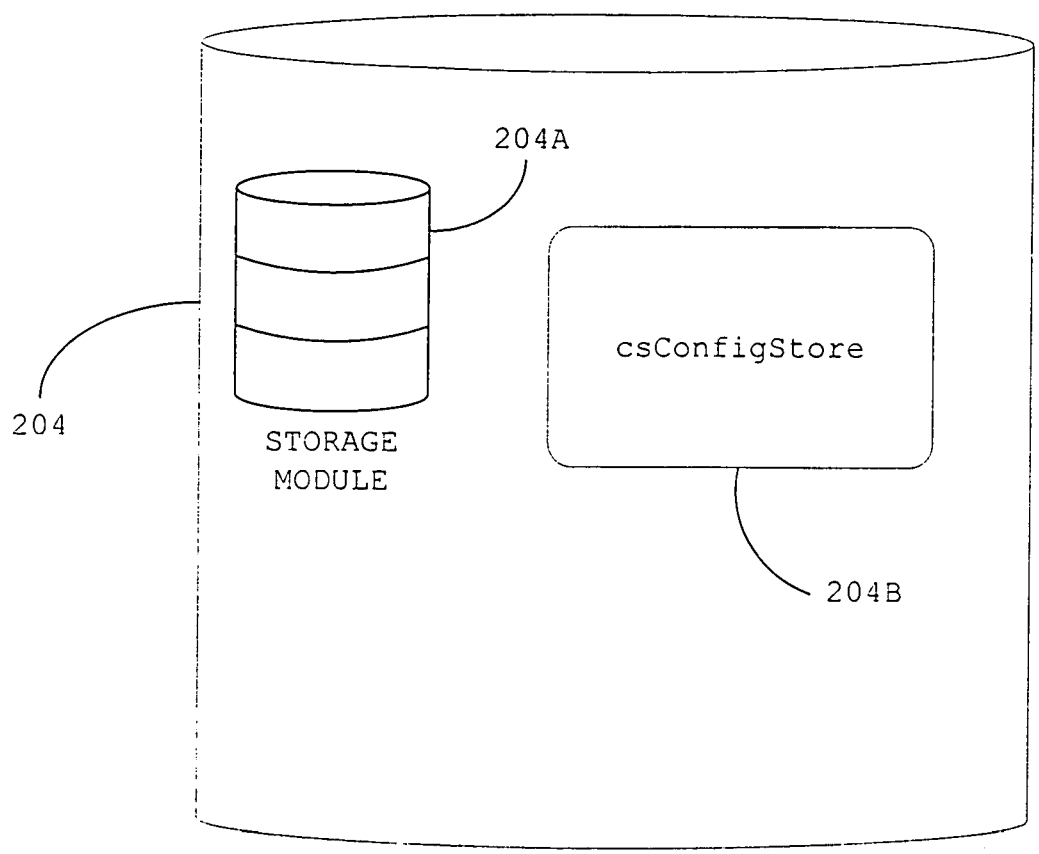
FIGURE 7A DATABASE

| PeriodTypeID | DataSourceID | BeginningDateTime | InterfaceID | Hits | FAQs | Searches | Assist |
|---|---|---|---|---|---|---|---|
| 16 | 6 | 8/20/2000 | 1 | 40 | 4 | 3 | 0 |
| 16 | 6 | 8/21/2000 | 1 | 9 | 0 | 0 | 0 |
| 16 | 6 | 8/26/2000 | 3 | 4 | 0 | 0 | 0 |
| 16 | 6 | 8/27/2000 | 1 | 7 | 6 | 0 | 0 |
| 16 | 6 | 8/28/2000 | 3 | 37 | 0 | 0 | 3 |
| 16 | 6 | 8/30/2000 | 3 | 15 | 0 | 0 | 1 |
| 16 | 6 | 9/3/2000 | 1 | 5 | 1 | 0 | 1 |
| 16 | 6 | 9/14/2000 | 3 | 24 | 0 | 0 | 1 |

FIGURE 7B - INTERVAL DATA

| DataSourceID | ACD_Group | AgentsAvailable | AgentsUnavailable | AgentsWork | |
|---|---|---|---|---|---|
| 3 | SALES | 9 | 4 | 2 | 6 |
| 1 | DOS | 57 | 56 | 64 | 6 |
| 1 | UNIX | 3 | 3 | 2 | 2 |

FIGURE 7C SNAPSHOT DATA

FIGURES 7B AND 7C

Diagram of Tables Associated With Property Sets

The tables that are used in tblDescData are:
- Property Sets
- Property Data Types
- Users of Property Sets

802

Add Object Properties

This page allows you to specify a user friendly name and the object type for the objects assigned to this Data Source type. This data will be used later on, while configuring users, datasources, widgets, thresholds and schemas.
You can either use the default values or specify your choice.

| Object Name | User Friendly Name | Object Type |
|---|---|---|
| tblHPOpenViewEventDetail | tblHPOpenViewEventDetail | Table |
| vwHPOpenViewEventDetail | vwHPOpenViewEventDetail | View |

< Back | Next > | Cancel | Help

FIGURE 80

Specify Access Columns                                                              ☒

This page allows you to specify the access columns associated with each of the assigned objects of this Data Source type. Tha access columns are actually the columns on which the different levels of drill down capability of PowerUser depends on.
The data will be grouped at different levels based on the specified access columns.

| Object Name | Access Column1 | Access Column2 | Access Column3 |
|---|---|---|---|
| tblHPOpenViewEventDetail | NULL | NULL | NULL |
| vwHPOpenViewEventDetail | NULL | NULL | NULL |

< Back    Finish    Cancel    Help

FIGURE 8P

FIGURE 9A - POWERUSER INTERFACE

FIGURE 9B - LOGIN WINDOW

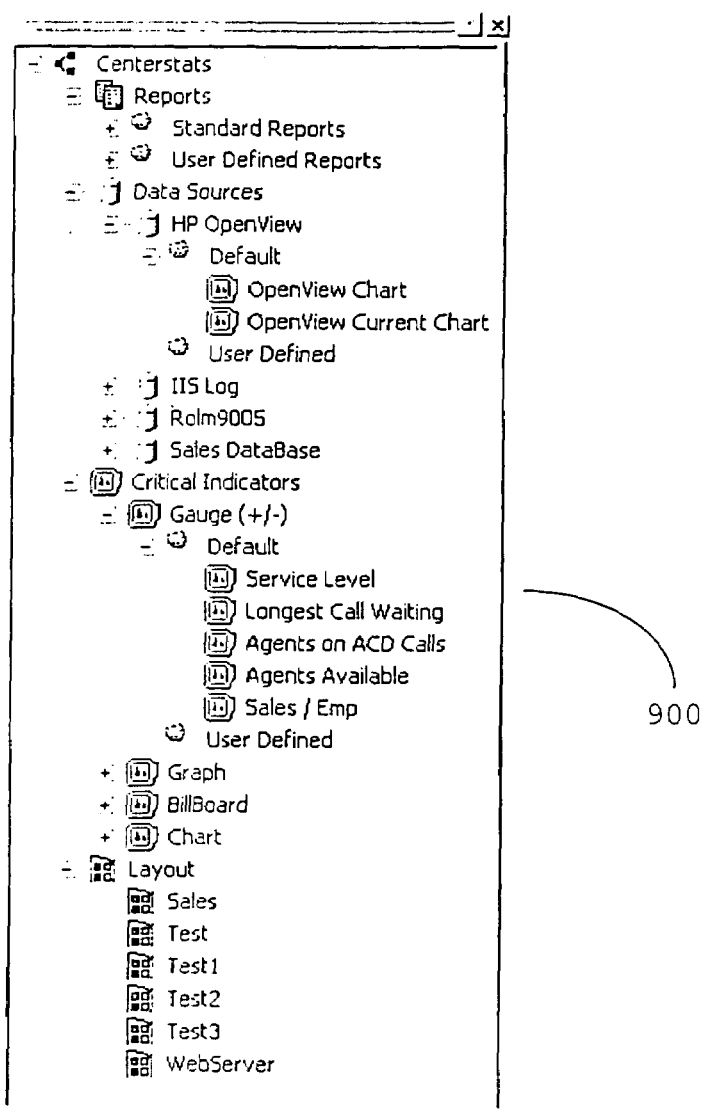
FIGURES 9C - SELECTION TREE VIEW

FIGURE 13B

Define Report Parameters                                              ✕

This screen shows the list of parameters defined for the selected report file. Please specify a value for each of them. These parameter values are required to retrieve the actual data from the database to print the report. Improper setting of these parameters will result in a failure to generate the report.

── Report Parameters ───────────────────────────────────────

Start date :                              Start Time :
[BEGINNING OF CURRENT YEAR ▼]             [8:00:00 AM]

End Date :                                End Time :
[TODAY                     ▼]             [5:00:00 PM]

Logon.AgentName(s):
[AMY_R, ANA, BERONICA                                    ▼]

< Back      Next >      Cancel       Help

| Property ID | Property Name | Property Value |
|---|---|---|
| 1015 | Top | 0 |
| 1016 | Bottom | 300 |
| 1017 | Left | 0 |
| 1018 | Right | 350 |
| 1019 | InstanceName | Agents Available (Ave... |
| 1020 | WhereClause | |
| 1021 | UserScreenID | 0 |
| 1022 | DB_ObjectID | 327692 |
| 1023 | PredefinedFlag | 0 |
| 1024 | PeriodTypeID | 0 |
| 1025 | BeginningDateTime | TODAY |
| 1026 | EndingDateTime | TODAY |
| 1027 | BorderFlag | 1 |
| 1028 | BackgroundColor | 16777215 |
| 1029 | ForegroundColor | 1644825 |
| 1030 | FrameColor | 3618615 |
| 1031 | GuageFaceColor | 2960685 |
| 1032 | PenColor | 1315860 |
| 1033 | TextColor | 6741856 |
| 1034 | FrameBlink | 0 |
| 1035 | BackgroundBlink | 0 |
| 1036 | ForegroundBlink | 0 |
| 1037 | GuageFaceBlink | 0 |
| 1038 | SoundFile | |
| 1039 | VideoFile | |
| 1040 | ShowWidgetLabelFlag | 1 |
| 1041 | MinWidth | 50 |
| 1042 | MinHeight | 50 |
| 1050 | OK_Color | 3055677 |
| 1051 | CautionColor | 2423797 |
| 1052 | DangerColor | 255 |
| 1053 | ArrowColor | 16777215 |
| 1054 | FirstPercent | 15 |
| 1055 | SecondPercent | 20 |
| 1056 | ThirdPercent | 32 |
| 1057 | OptimumValue | 50 |
| 1058 | PercentTextColor | 16777215 |

FIGURE 17M

Name and Type  ✕

Properties and Options:
This page selects how a threshold will be referred to in terms of name. Names should be unique to prevent confusion.

Name
Agent Time In State

Description
Threshold on how long an agent is in a state

< Back | Next > | Cancel

Set Name and Description

Name and Description
Sets a name and a description for this layout.
Name should be kept unique to avoid confusion when selecting layouts.

Name
Test Layout 4

Description
Test Layout 4

< Back | Next > | Cancel | Help

Assign Users

Users
Select Users that should have access to the current layout.
Add any restrictions for specific users and click Finish to save the current layout.

Check the users allowed this layout.

- ☐ tbowman
- ☑ dev
- ☑ Demo
- ☑ JDOE
- ☑ JDOE

< Back | Finish | Cancel | Help

METHOD AND SYSTEM FOR MANAGING REAL TIME DATA

CROSS REFERENCE TO RELATED APPLICATION

This application is related to the provisional U.S. patent application entitled, "INFORMATION MANAGEMENT SYSTEMS", Ser. No. 60/353,646, filing date, Jan. 31, 2002, the disclosure of which is incorporated herein by reference, in its entirety.

FIELD OF THE INVENTION

The present invention relates to information management systems, more particularly, to computerized information management systems that provide relevant metrics for assisting business entities in making business decisions.

BACKGROUND OF THE INVENTION

Advances in computing technology today have provided various options for business entities when it comes to conducting business and making business decisions. Various software and hardware solutions today are used by businesses to conduct various aspects of business, including manufacturing, inventory management, marketing, sales and human resources management. Various data indicators are used to forecast business conditions overcome competition and operate efficiently.

Availability of critical information at all times and everywhere is important for a business entity's (or "enterprise") success. It is not only important to measure performance metrics but strategic growth drivers as well. Establishing a balanced view throughout an enterprise is very critical to short term performance and long-term growth.

Traditional boundaries today are disappearing in businesses. More and more businesses are operating across time zones, business lines and marketing segments. In addition to serving multiple market segments, enterprises are employing advanced production and inventory control systems, and outsourcing non-critical functions.

Management emphasis is on improving productivity, which results in increased stockholder value. Enterprises are relying on various specialized business function software like "Supply Chain," ERP, CRM, Sales automation etc., to provide value to customers.

Most businesses have a combination of legacy and newer business applications, including software and hardware systems. They are also likely to have multiple and/or dissimilar applications performing similar functions. During mergers and acquisitions of businesses, it is common for companies to inherit a number of systems. Depending on the company these may or may not be integrated. Successful integration typically depends on the organization of strategic objectives and the extent to which processes logically match up to these objectives. Such coordinated integration leads to strategic advantage, e.g., opportunities to share marketing, sales, production, procurement and R&D information.

Information availability and distribution is a major factor in the success of organizations. Since businesses have a number of applications that are critical, availability of information from those systems are also critical to the success of the organization as a whole. Because sources of information can be from different arenas, generating a collective information pool is a problem. Information may be available in many different formats: namely paper, spreadsheet, online/ offline document, proprietary applications etc. Information may also be collected from disparate sources that may be incompatible. Further, the problem is compounded in delivering relevant data to the correct audience. Also, the needs for specific information vary from consumer to consumer, in content and delivery techniques.

With all the options available today, in hardware and/or software, what is still lacking is a comprehensive and scalable system that allows business entities to collect and analyze meaningful data. Therefore, there is a need for a system that allows collection of data from various sources and the means to filter the collected data based upon user choices.

SUMMARY OF THE INVENTION

In one aspect of the present invention a system for information management systems is provided. The system provides for collection of data from multiple, dissimilar and disparate sources having various collection schedules by a plurality of data collectors. It further provides a central database, i.e., a centralized storage of the collected data with ease of maintenance as well as front-end alerts and triggers. The central database has a central data store module for data storage and a central configuration module for configuring the data as well as the components of the system.

The system comprises user interface(s), which facilitate (s) the user (s), to access data from the central database and provides user with a varying degree of options to evaluate accessed data.

The system also provides a reporting module for generating and forwarding user specific scheduled reports from the accessed data in the central database. The presentation of the data could be any time, anywhere and in any format required by the end user. The system also provides an administration module for collecting, monitoring and configuring the collected data, data collectors, central database and the reports for the end user(s).

In another aspect of the present invention there is provided a method for compilation of the data from multiple, dissimilar and disparate sources by the means of various data collectors. API Data Collectors include DTS, XML interactive, remote and legacy data collector(s).

The method of compiling data includes gathering data from plurality of data sources in accordance with a specific collection schedule, parsing, packetizing and transmitting the data to the central database for further processing.

In another aspect of the present invention there is provided a method for storage and maintenance of the collected data by a central database system. The method of storing and configuring data collected includes receiving data from plurality of data sources; storing the received data in the central datastore while generating alerts and front-end thresholds for the received data; and then configuring the received data.

In another aspect of the present invention there is provided a method for presentation of the stored and maintained data in the format required by the end user and at the convenience or requirement of the end user. This method comprises steps of setting up user preferences; collecting end user selected data from the central database; and transmitting the data to the end users based on end user preferences.

In another aspect of the present invention there is provided a method for managing information systems, more particularly managing computerized managed systems. The method of collecting, storing and presenting data, includes collecting data from plurality of data sources by plurality of data collectors; storing and maintaining the collected data; and presenting real time and static data to the users; wherein the presentations could be transmitted periodically or on specific request of the user.

In another aspect, a method for collecting data from plural sources is provided. The method includes, receiving information from plural entities; analyzing the information; and performing trend analysis.

The method also includes, setting up threshold limits for incoming data; comparing incoming data with the threshold limits; and activating an event based on such comparison.

In another aspect of the present invention, a method for transmitting data to plural end-users is provided. The method includes, setting up user preferences; collecting end-user selected data in real time; and transmitting data to the end-users based on end-user preferences.

In another aspect, a system for collecting data is provided. The system includes, plural data collectors that collect data from plural data sources; and reporting module, wherein the reporting module provides various reports based on the data collected from the plural data collectors. The system includes a triggering module that activates an event based on collected data.

In another aspect, a data collection system that allows collection of data from plural sources is provided. The data collection system includes, a collector module that collects data from the plural sources; a parsing module that parses incoming data from the plural data sources; and a collection scheduler that sets up data collection schedules for collecting real time data.

In yet another aspect, a method for defining a data source type for collecting data is provided. The method includes, selecting a data source type with a collector module; assigning tables and/or views associated with the data source type; and specifying access columns associated with the assigned tables and/or views, wherein the access column provide drill down capability.

In yet another aspect of the present invention, a method for printing reports using a real time data collection system is provided. The method includes specifying server name; specifying report description; selecting report parameters; selecting target of the report; and sending the report.

This brief summary has been provided so that the nature of the invention may be understood quickly. A more complete understanding of the invention can be obtained by reference to the following detailed description of the preferred embodiments thereof, in connection with the attached drawings.

BRIEF DESCRIPTION OF THE DRAWINGS

FIG. 4F is an example of a questionnaire used by the interactive data collector, according to one aspect of the present invention.

FIG. 7A block diagram of a database, according to one aspect of the present invention.

FIGS. 7B–7C shows an example of how data may be stored in the database, according to one aspect of the present invention.

FIGS. 8I to 8P provide screen shots for creating and defining a data source type, according to one aspect of the present invention.

FIGS. 9A–9F provides an example of a Power user access, according to one aspect of the present invention.

FIGS. 12A–12C and 13A–13C provide examples of web reports, according to one aspect of the present invention.

FIGS. 14A–14F provides an example for creating or modifying reports, according to one aspect of the present invention.

FIGS. 19A–19C shows an example how data can be filtered, according to one aspect of the present invention.

Features appearing in multiple figures with the same reference numeral are the same unless otherwise indicated.

DETAILED DESCRIPTION OF THE PREFERRED EMBODIMENTS

Definitions:

InfoUser: A user who only views information.
PowerUser: A user who views and analyzes information.
SVG: Scalable Vector Graphics In one aspect, the present invention provides a system and process for a business organization (also referred as an "enterprise") that improves efficiency and productivity. The system collects data from various data sources, stores and analyzes the data in a central database and distributes it to plural users and/or devices.

In one aspect, the present system is modular and scalable. The system allows users to add custom components, based on user needs. Users are provided data based on user needs and choice through plural means, including, web-based reports, email alerts or otherwise, In another aspect the present system includes a plurality of data collectors, a central database, a PowerUser (a user that can analyze and use data in various ways) Interface, an InfoUser ("a user who needs data for information only") Application Server, an InfoUser Interface package, an Administrator module and a Reporting Options module. Data collectors collect data from a plurality of data sources and the data is stored in the central database (also referred to herein as a "database") as discussed below.

Administrator module comprises of utilities to set up collection schedules for data collectors, front-end alerts, User-Interface Thresholds, PowerUser and InfoUser accounts and permissions and display devices (also referred to herein as "widgets"). Administrator module includes utilities to monitor data collectors and their performance; allows design of data transformation service ("DTS") packages, generate backend tables, and store trigger procedures.

In order to understand the various adaptive aspects of the present invention, the following provides a brief description of a computer system that may be used to implement computer-executable process steps, according to the various aspects of the present invention.

Figure 1A:
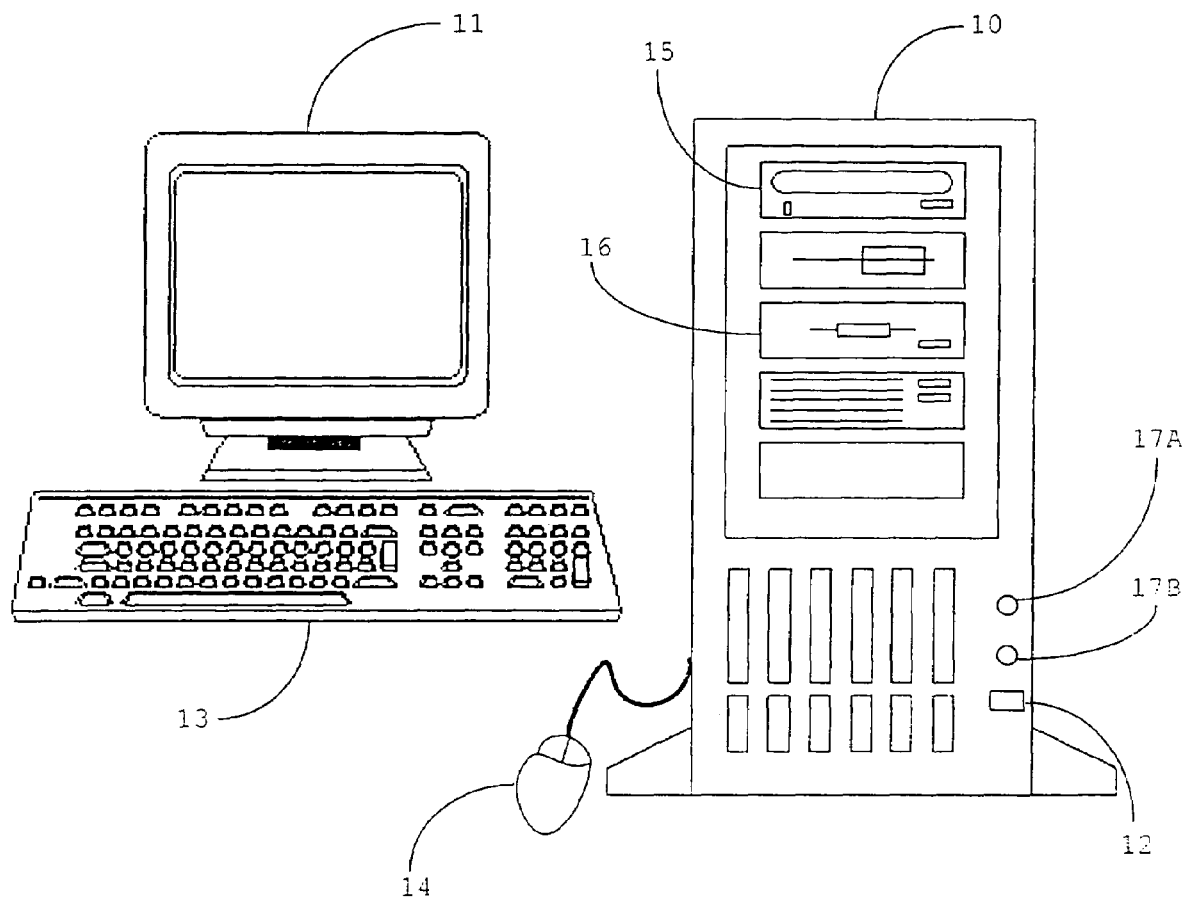
FIG. 1A shows a block diagram of a computer system, used according to one aspect of the present invention.

FIG. 1A is a block diagram of a computing system for executing computer executable process steps according to one aspect of the present invention. FIG. 1A includes a host computer 10 and a monitor 11. Monitor 11 may be a CRT type, a LCD type, or any other type of color or monochrome display. Also provided with computer 10 are a keyboard 13 for entering data and user commands, and a pointing device 14 for processing objects displayed on monitor 11.

Computer 10 includes a computer-readable memory medium such as a rotating disk 15 for storing readable data. Besides other programs, disk 15 can store application programs including web browsers by which computer 10 connect to the Internet and the systems described below.

According to one aspect of the present invention, computer 10 can also access computer-readable floppy disks storing data files, application program files, and computer executable process steps embodying the present invention or the like via a floppy disk drive 16. A CD-ROM, or CD R/W (read/write) interface (not shown) may also be provided with computer 10 to access application program files, audio files and data files stored on a CD-ROM.

A modem, an integrated services digital network (ISDN) connection, or the like also provides computer 10 with an Internet connection 12 to the World Wide Web (WWW). The Internet connection 12 allows computer 10 to download data files, audio files, movies, video, application program files and computer-executable process steps embodying the present invention.

Computer 10 is also provided with external audio speakers 17A and 17B to assist a listener to listen to audio files either on-line downloaded from the Internet, or off-line using a CD.

It is noteworthy that the present invention is not limited to the FIG. 1 architecture. For example, notebook or laptop computers, handheld devices, set-top boxes or any other system capable of running computer-executable process steps, as described below, may be used to implement the various aspects of the present invention.

Figure 2A:
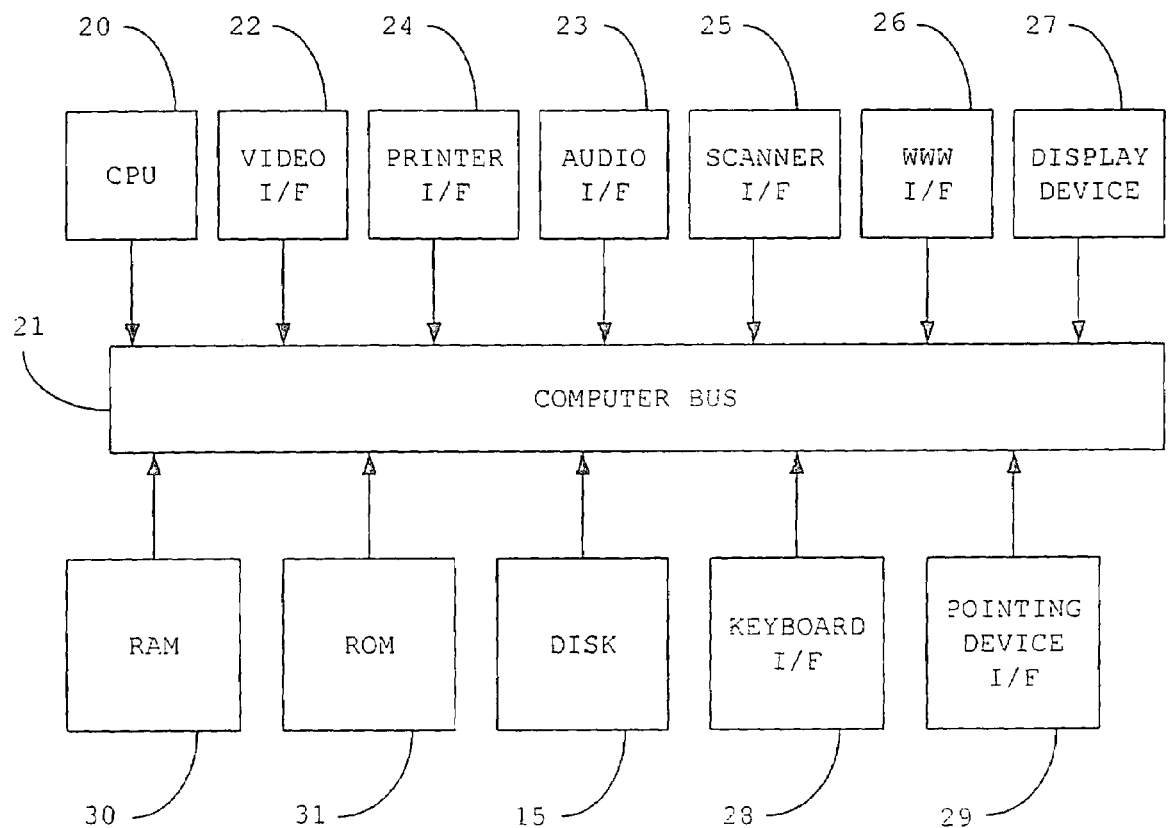
FIG. 2A shows a block diagram of the internal architecture of the computing system in FIG. 1A.

FIG. 2A is a block diagram showing the internal functional architecture of computer 10. As shown in FIG. 2A, computer 10 includes a CPU 20 for executing computer-executable process steps and interfaces with a computer bus 21. Also shown in FIG. 2A are a video interface 22, an audio interface 23, a printer interface 24, a scanner interface 25, a WWW interface 26, a display device interface 27, a keyboard interface 28, a pointing device interface 29, and a rotating disk 15.

Audio interface 23 allows a listener to listen to audio data and video interface 22 allows user to access video. Printer interface 24 and scanner interface 25 provide computer 10 with connectivity to a scanner and printer (not shown).

As described above, disk 15 stores operating system program files, application program files, web browsers, and other files. Some of these files are stored on disk 15 using an installation program. For example, CPU 20 executes computer-executable process steps of an installation program so that CPU 20 can properly execute the application program.

Random access memory ("RAM") 30 also interfaces to computer bus 21 to provide CPU 20 with access to memory storage. When executing stored computer-executable process steps from disk 15 (or other storage media such as floppy disk 16 or WWW connection 12), CPU 20 stores and executes the process steps out of RAM 30.

Read only memory ("ROM") 31 is provided to store invariant instruction sequences such as start-up instruction sequences or basic input/output operating system (BIOS) sequences for operation of keyboard 13.

Computer-executable process steps, according to one aspect of the present invention may be performed using the Internet. The following provides a brief description of the Internet.

The Internet connects thousands of computers world wide through well-known protocols, for example, Transmission Control Protocol (TCP)/Internet Protocol (IP), into a vast network. Information on the Internet is stored world wide as computer files, mostly written in the Hypertext Mark Up Language ("HTML"). Other mark up languages, e.g., Extensible Markup Language as published by W3C Consortium, Version 1, Second Edition, October 2000, ©W3C may also be used. The collection of all such publicly available computer files is known as the World Wide Web (WWW). The WWW is a multimedia-enabled hypertext system used for navigating the Internet and is made up of hundreds of thousands of web pages with images and text and video files, which can be displayed on a computer monitor. Each web page can have connections to other pages, which may be located on any computer connected to the Internet.

A typical Internet user uses a client program called a "Web Browser" to connect to the Internet. A user can connect to the Internet via a proprietary network, such as America Online or CompuServe, or via an Internet Service Provider, e.g., Earthlink. The web browser may run on any computer connected to the Internet. Currently, various browsers are available of which two prominent browsers are Netscape Navigator and Microsoft Internet Explorer.

The Web Browser receives and sends requests to a web server and acquires information from the WWW. A web server is a program that, upon receipt of a request, sends the requested data to the requesting user.

A standard naming convention known as Uniform Resource Locator ("URL") has been adopted to represent hypermedia links and links to network services. Most files or services can be represented with a URL.

URLs enable Web Browsers to go directly to any file held on any WWW server. Information from the WWW is accessed using well-known protocols, including the Hypertext Transport Protocol ("HTTP"), the Wide Area Information Service ("WAIS") and the File Transport Protocol ("FTP"), over TCP/IP protocol. The transfer format for standard WWW pages is Hypertext Transfer Protocol (HTTP).

Figure 3A:
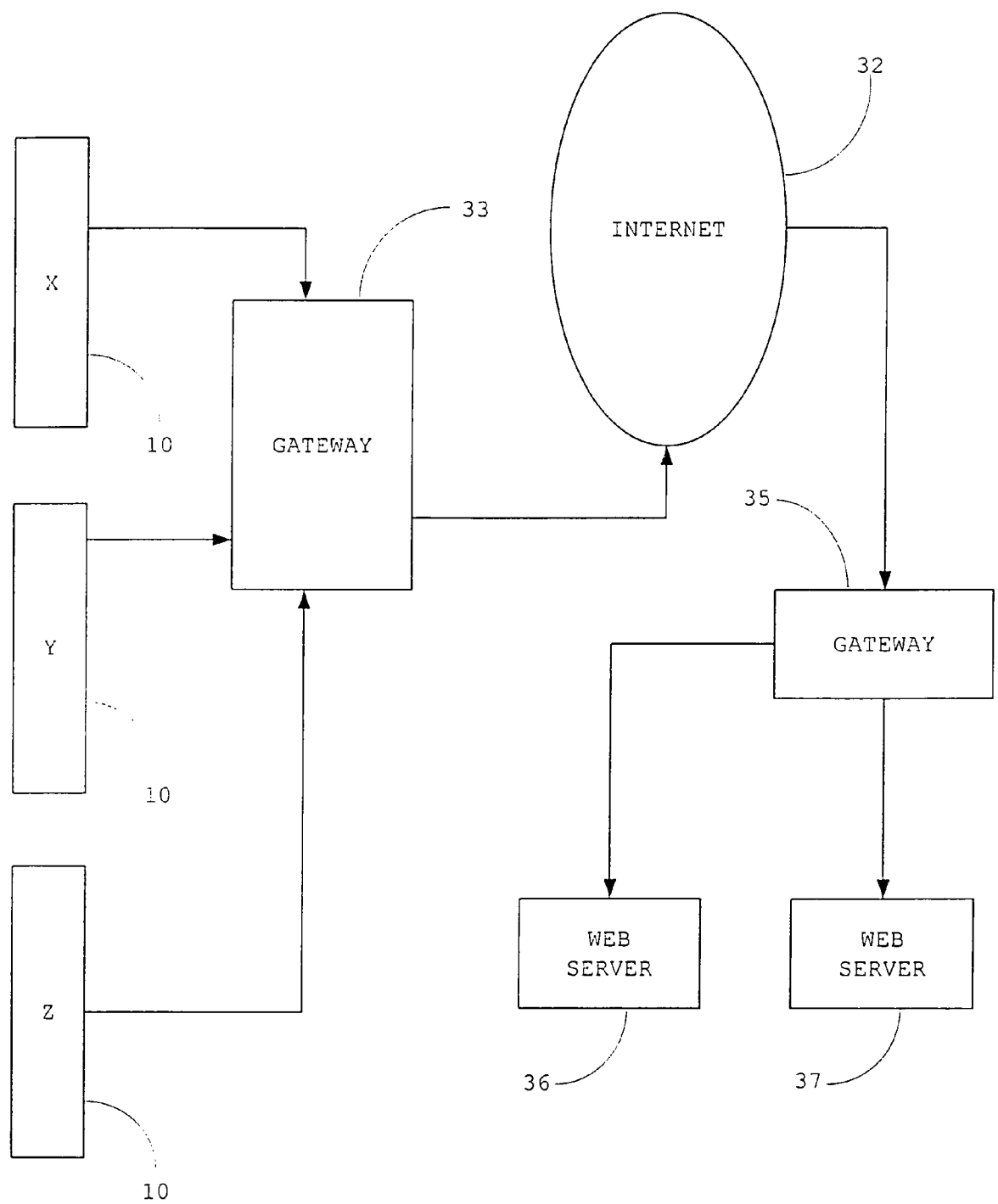
FIG. 3A shows a block diagram of plural computing systems coupled over the Internet.

FIG. 3A shows a typical topology of a computer network with computers similar to computer 10, connected to the Internet. For illustration purposes, three computers X, Y and Z are shown connected to the Internet 32 via WWW interface 26 through a gateway 33, where gateway 33 can interface N number of computers.

WWW interface 26 may be a modem, network interface card or a unit for providing connectivity to other computer systems over a network using protocols such as X.25, Ethernet or TCP/IP, or any device that allows, directly or indirectly, computer-to-computer communications. It is noteworthy that the invention is not limited to a particular number of computers. Any number of computers that can be connected to the Internet 32 or any other computer network may be used.

FIG. 3A further shows a second gateway 35 that connects a network of web servers 36 and 37 to the Internet 32. Web servers 36 and 37 may be connected with each other over a computer network.

Figure 1B:
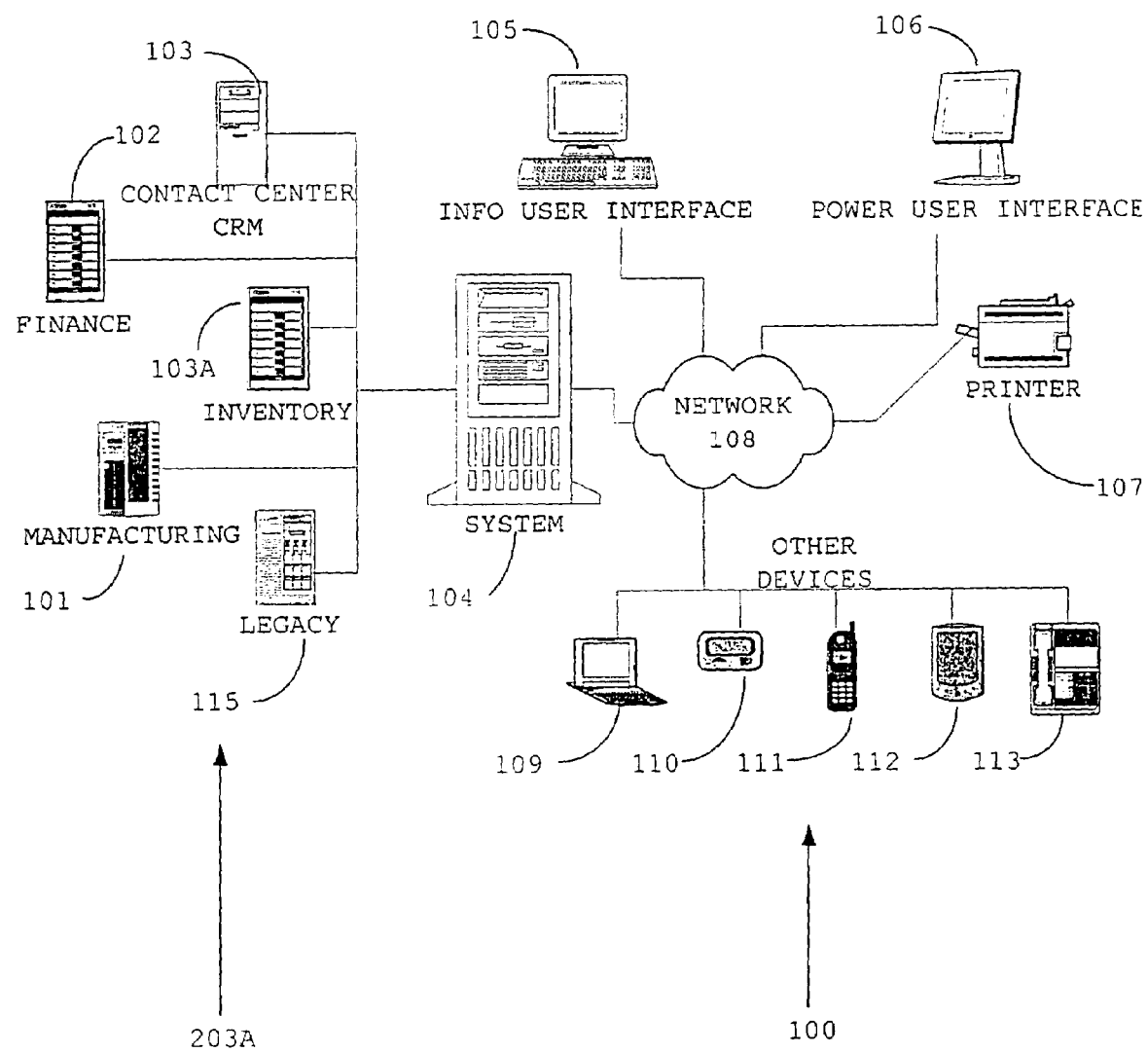
FIG. 1B shows a block diagram of a system that allows real-time data collection/analysis, according to one aspect of the present invention.

FIG. 1B shows the overall architecture of system 100 with System 104 coupled to various data sources 203A, including finance data source 102, Manufacturing data source 101, CRM data source 103, inventory data source 103A, and legacy systems data source 115. The foregoing data sources provide data in various formats that can be used by business entities to make crucial business decisions. For example, finance data source 102 may provide various financial indicators that may be used to make financial decisions. Manufacturing data source 101 may provide data points used to determine product quality, production efficiency, project schedules and other manufacturing related information. Inventory data source 103A provides inventory status and allows enterprises to manage, order and control inventory costs. CRM (Customer relation management) data source 103 provides data points that assist enterprise's to manage customer base and improve customer satisfaction, which in turn improves profits and growth. Legacy systems data source(s) 115, as discussed below, collects data from proprietary systems in a proprietary format.

It is noteworthy that the invention is not limited to the foregoing data sources, other data sources may be used to implement the various adaptive aspects of the present invention.

System 104 is coupled to a computer network 108, which is coupled to an InfoUser Interface 105, PowerUser Interface 106, peripheral printer 107 and plural other devices including a computer 109 (similar to computer 10), pager 110, cell phone 111, handheld PDA 112 and telephone 113. It is noteworthy that the foregoing output devices are merely to illustrate the adaptive nature of the present invention and are not intended to limit the scope of the invention.

InfoUser Interface 105 may be a computer system, for example, as shown in FIG. 1A or any other computing device. InfoUser Interface 105 is coupled to System 104 via an InfoUser Server 105A, discussed below. An InfoUser application 105B runs on InfoUser Sever 105A or InfoUser Interface 105 to view and/or edit information from various sources.

Figure 2B:
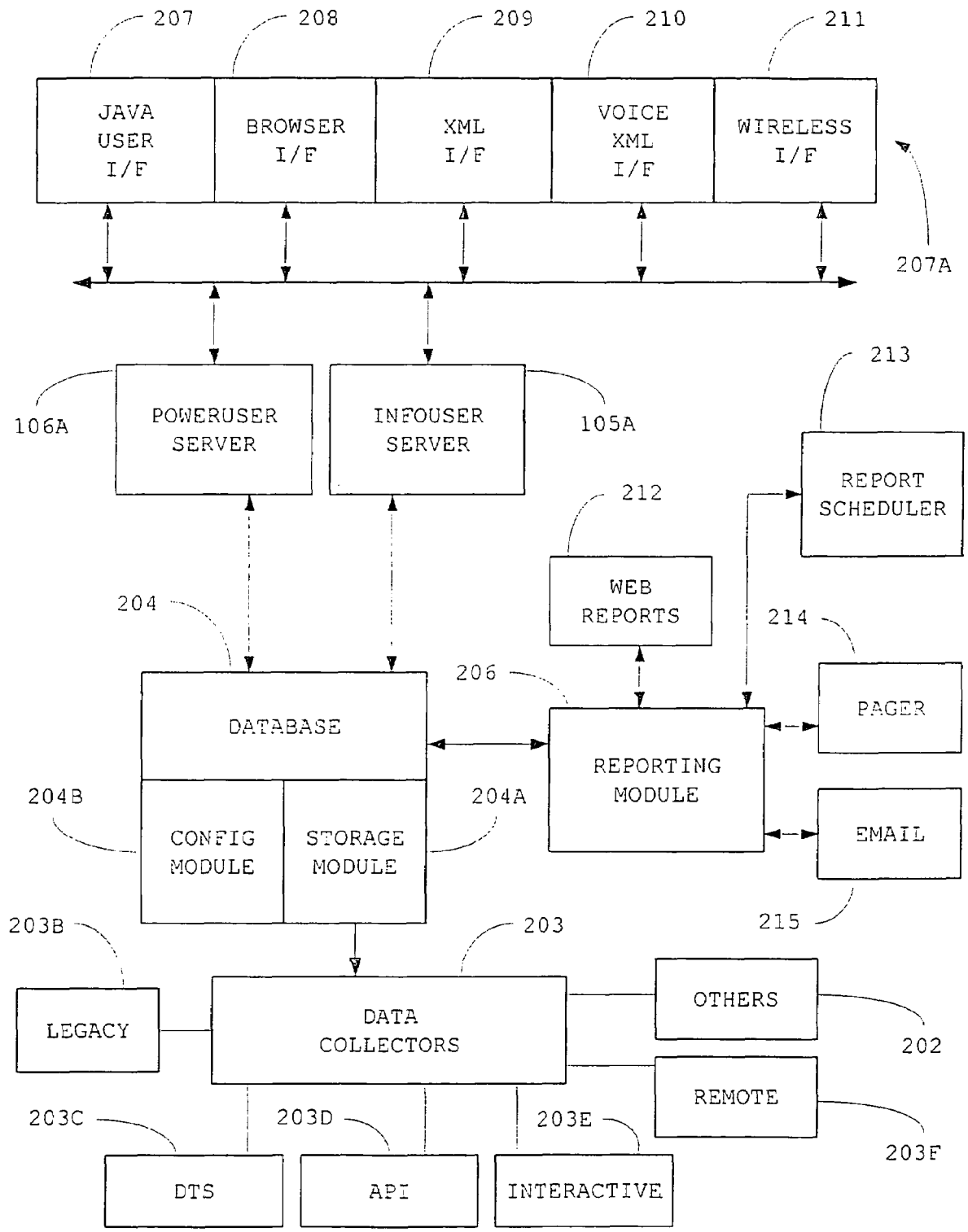
FIG. 2B shows another block diagram of system in FIG. 1B, according to one aspect of the present invention.

PowerUser Interface 106 may be a computer system, for example, as shown in FIG. 1A or any other computing device. PowerUser Interface 106 is coupled to System 104 via a PowerUser Server 106A, discussed below. A PowerUser application 106B runs on PowerUser Sever 106A or PowerUser Interface 106 that allows users to view and/or edit information from various data sources 203A FIG. 2B shows another block diagram of System 104 as coupled to database 204. Database 204 includes storage module 204A for storing data and configuration module 204B for storing configuration information. Database 204 is operationally coupled to plural data collectors 203 that collect data from plural data sources 203B–203F.

FIG. 2B also shows plural interfaces, PowerUser interface server 106A and InfoUser interface server 105A, and reporting module 206. Reporting module 206 alerts a user regarding specific data points and/or patterns.

Various other interface and reporting schemes are also provided and include a java user interface 207, a browser interface 208, XML (extensible markup Language) interface 209, Voice XML interface 210, wireless interface 211 coupled to Info-user interface server 105A and Power user interface server 106A.

Reporting module 206 is coupled to scheduling module ("report scheduler") 213 that schedules data collection, date alerts, whether print or electronic, according to one aspect of the present invention. Reporting module 206 is coupled to a pager 214, and email alert program 215 that can provide data to users at any time. Also provided is a web-reporting module 212 operationally coupled to reporting module 206 that provides web reports, as described below.

Figure 3B:
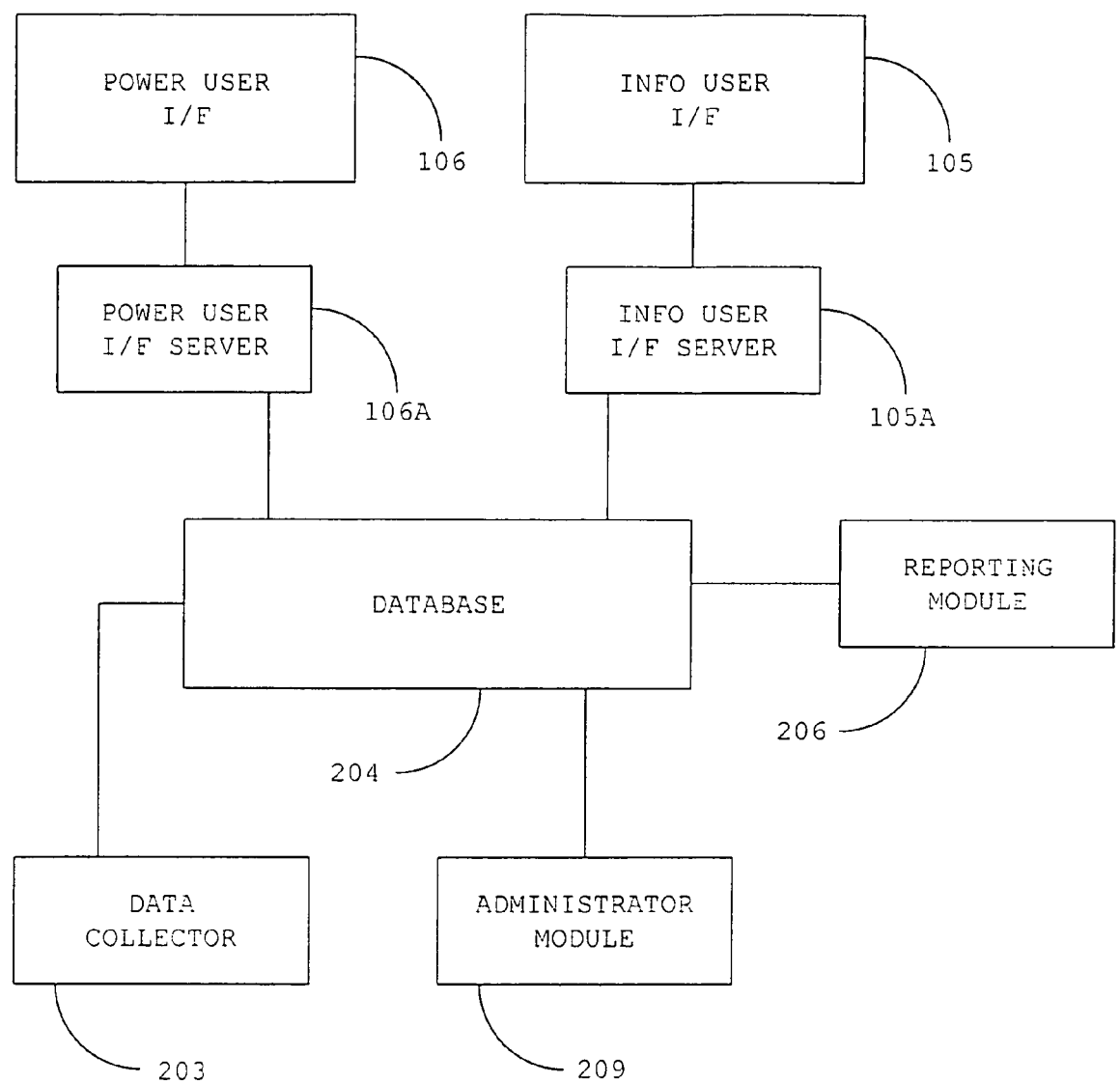
FIG. 3B shows yet another block diagram of the system in FIG. 1B, according to one aspect of the present invention.

FIG. 3B shows yet another block diagram of the basic architecture of System 104 according to one aspect of the present invention. System 104 is operationally coupled to data collector(s) 203 that collect data from various data sources. The collected data is stored at database 204, which is accessible by the PowerUser interface 106 via Power-Interface server 106A, InfoUser Interface 105 via Infouser Interface Server 105A. Administrator module 209 is also operationally coupled to database 204, as discussed below.

Figure 3C:
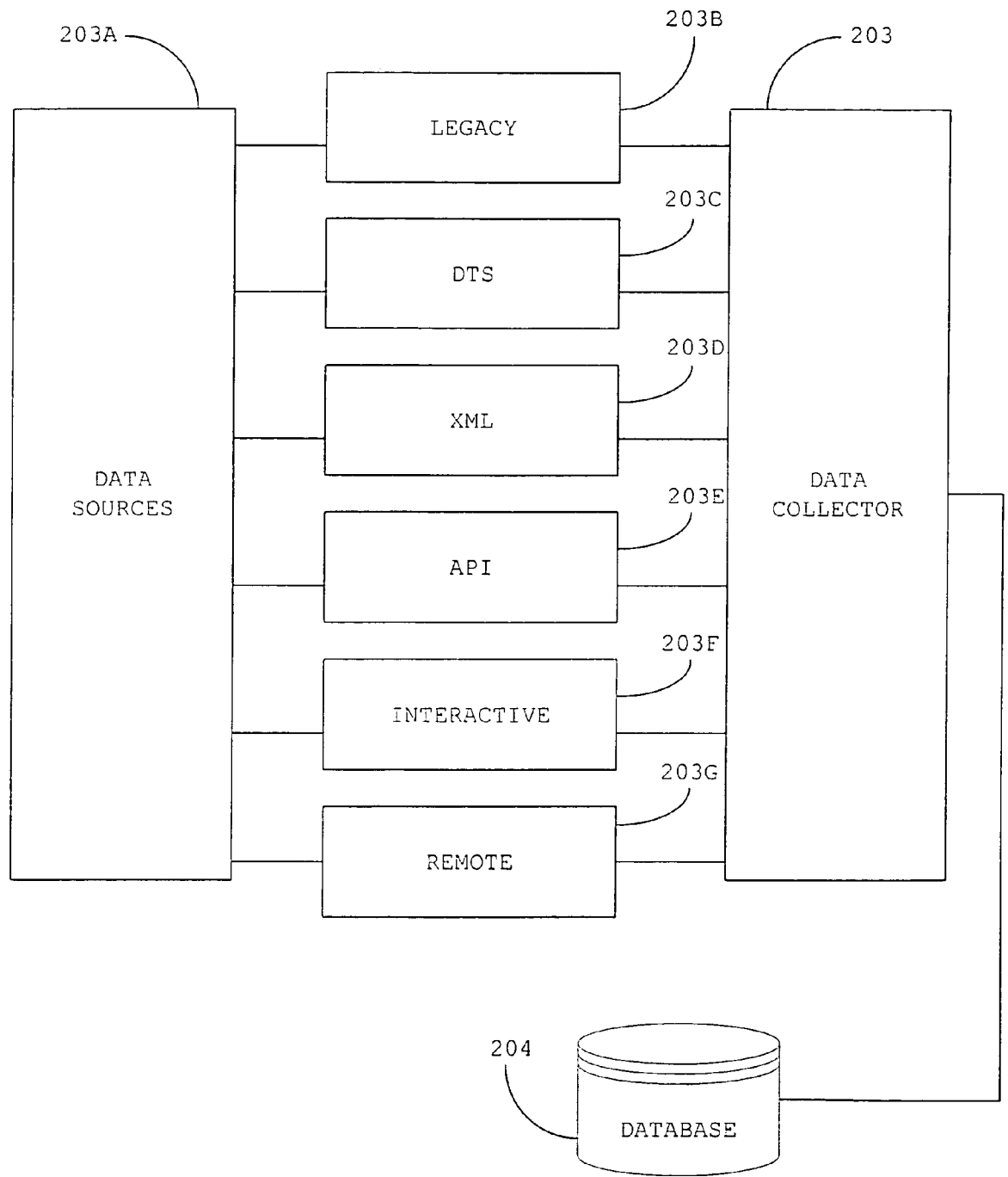
FIG. 3C shows plural data collectors operationally coupled to a database, according to one aspect of the present invention.

FIG. 3C is a top-level block diagram that shows various data collectors, namely, legacy data collector 203B, DTS data collector 203C, XML data collector 203D, API data collector 203E, Interactive data collector 203F and remote data collector 203G coupled to plural data sources 203A, which are described in detail below.

Prior to discussing the operational flow of System 104, the following provides a description of the various components of the system of the present invention.

Data Collectors:

In one aspect of the present invention, data collectors collect, parse and packetize (format) data before sending data to storage module 204A, as described below. Data collectors collect data from a data source and write to Storage Module 204A. Data collectors may be distributed and/or centralized. Depending on data collection/distribution load, data collectors can be bundled together into a single service for load balancing. Each service in that case will execute a number of collectors as threads and each thread with a collector service can be started or stopped without disturbing other threads in the service, as described below.

For a Windows NT service, data collectors are a set of interface objects contained in dynamic link libraries ("DLLs") that run as an executable program, denoted for illustration purposes as "CSCollector.exe". A single instance of the program can host multiple collector type objects and each collector type object can host multiple connections.

Figure 4A:
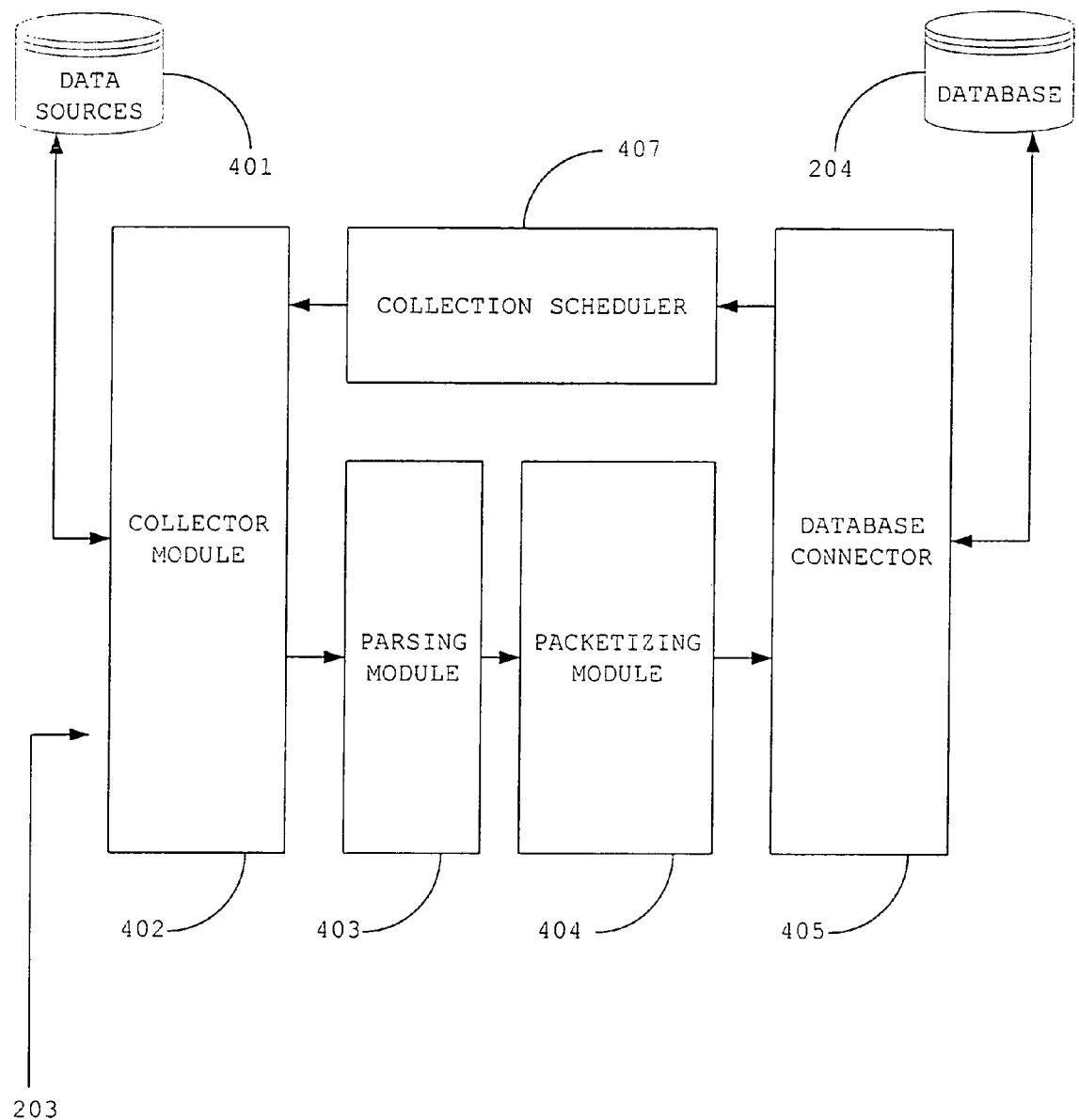
FIG. 4A shows a block diagram of a data collector, according to one aspect of the present invention.

FIG. 4A shows a top-level block diagram of a Data Collector 203. Data Collector 203 may be designed and built as a Windows NT Service. Data collector 203 includes a collector module 402 that initiates individual thread collectors for each defined data source 203A. Database connector 405 connects to database 204 using OLE-DB provider for ODBC (SQL Server). Multiple Data collectors may operate simultaneously on different computers and at remote locations.

Typically, database connector 405 queries database 204 for setup and configuration information before starting the collection process. After collector module 402 thread starts successfully, database connector 405 delivers a collection schedule from database 204 to collection scheduler 407.

Each collector thread sets up collection of objects (or data) based on a collection schedule defined by collection scheduler 407. Depending on the type of schedule, some objects may be requested during plural data collection cycles, while other objects are requested just once. Some data sources can be programmed to deliver data periodically to collector threads.

Once the objects are collected, they are parsed and packetized, by parsing module 403 and packetizing module 404. It is noteworthy that module 403 and 404 may be included in a single module, as shown below. Data is parsed in two stages by parsing module 403. Initially parsing module 403 performs data separation and then parses the data.

When data is received from a data source (including legacy data source), collector module 402 writes the data to a temporary memory buffer (disk 15 or RAM 30). Collector module 402 locates the beginning and end of the data using predetermined key words. A complete data report is detected and collector module 402 extracts the report. The report content is then parsed. Each data report is parsed row-by-row and column values for each row are extracted. Each parsed row may be written to a table and stored in database 204.

DTS Data Collector

Figure 4B:
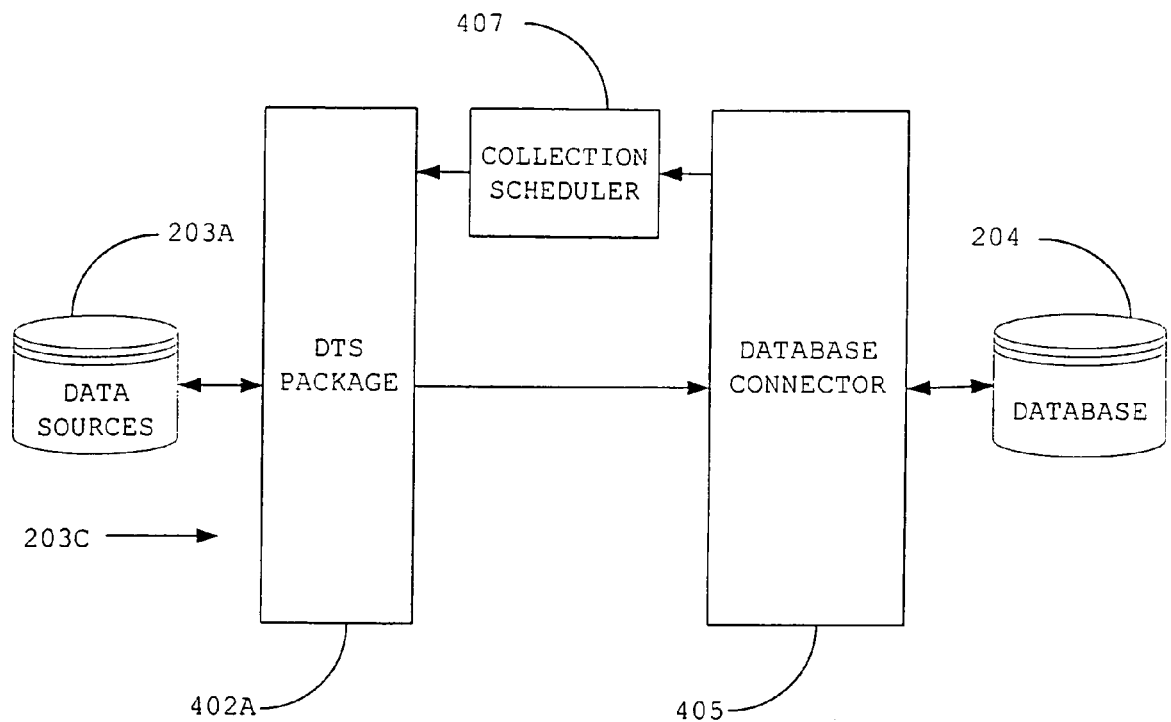
FIG. 4B shows a block diagram of a DTS data collector, according to one aspect of the present invention.

FIG. 4B shows a block diagram of a DTS (Data Transformation Service) collector 203C. DTS Data Collector 203C runs a DTS package 402A at scheduled times to collect information from an ODBC compliant data source and writes it to Storage Module 204A. DTS package(s) 402A are pre-generated during "assembly" time and may be associated with any other data collector used by system 104.

DTS package 402A filters collected data and enables system 104 to provide useful information to users. DTS package 402A selects the necessary columns from source table(s), including key columns for transformation. The collected data set is filtered to include only those rows that are not in Storage Module 204A tables. Transformations, if any, are applied to the filtered data set and the result is written in a destination table(s) and stored in Storage Module 204A.

Figure 4C:
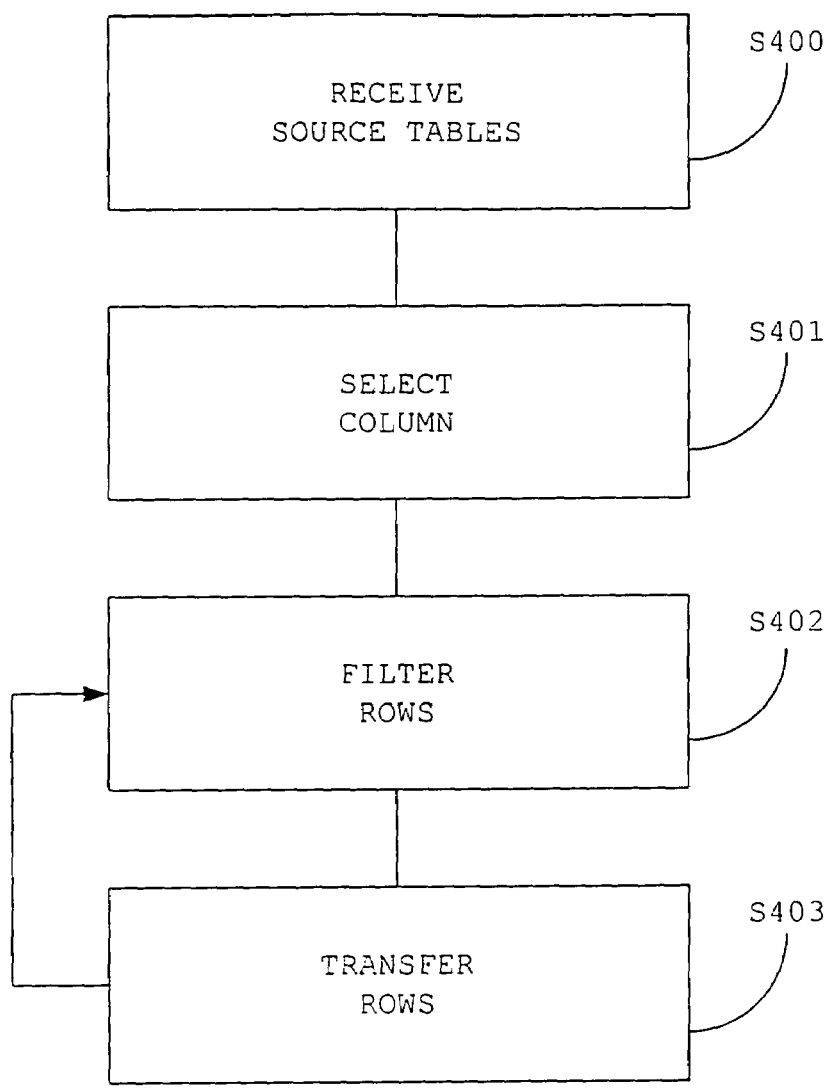
FIG. 4C is a process flow diagram as used by a DTS package, according to one aspect of the present invention.

FIG. 4C is a flow diagram of computer-executable process steps used by DTS package 402A in DTS collector 203C.

In step S400, source tables are received by DTS package 402A. Source tables include data from the various data sources shown in FIG. 1B and discussed above.

In step S401, DTS package 402A selects columns from the data set, to create a subset of available data based on information needs. This reduced set allows system 104 to operate efficiently to create the information subset based on customer requirements.

In step S402, rows are filtered by DTS package 402A based on a key value. Most typically the key value is a date/time stamp.

In step S403, data is transformed and sent to database 204. An example of the data can be web-server log information from a WWW server, where the information is filtered to collect only hits to certain HTML pages of relevance to management.

Structure of DTS Data collector 203C:

The following section describes the structure of DTS data collector 203C, as used in a Windows NT environment:

(1) Class CNTService: public CWinApp is an abstract base class

Class CStatusMonitor: public CNTService
   MainWorkLoop( ) calls
   StartAllCollectors( )calls StartCollector( )calls
StartConnection( )calls CDataCollector::Create( ). Inside this function a call is made to CreateDataCollector( ), and an exported function of the collector DLL that is created. This returns a CDataCollectorApi pointer, which is stored for access by the data collector.

CDataCollectorApi::StartConnection( ) is then called.

It is noteworthy that subsection (i) as described above is common to all data collectors.

(ii) class CDtsSchdlCollector:public CDataCollectorApi StartConnection( ) calls

GetActiveReports( ) which populates CTableRequestCommandArray with CTableRequestCommand objects, one for each scheduled DTS package 402A.

Then a CDtsSchedule object is created for each connection.

class CDtsSchedule: public CDataCollectorThread: public CWinThread

InitInstance( ) is automatically called which calls:

RunTilDone( ) which is the main execution loop for the thread. It continually calls: TableRequestCommandArray::GetFirstRequestCommandToRun( ). If a DTS package is to be executed, it is accomplished by calling ExecutePackage( ) which sets up a smart pointer to the DTS Package COM object.

Object Data Transformation Services Package Object (dtspkg.dll):

LoadFromStorageFile( ) is called with the file name of a desired DTS package;

GlobalVariables( ) is then called to validate the Data sourceID; and

Execute( ) is then called to run the package.

Figure 5:
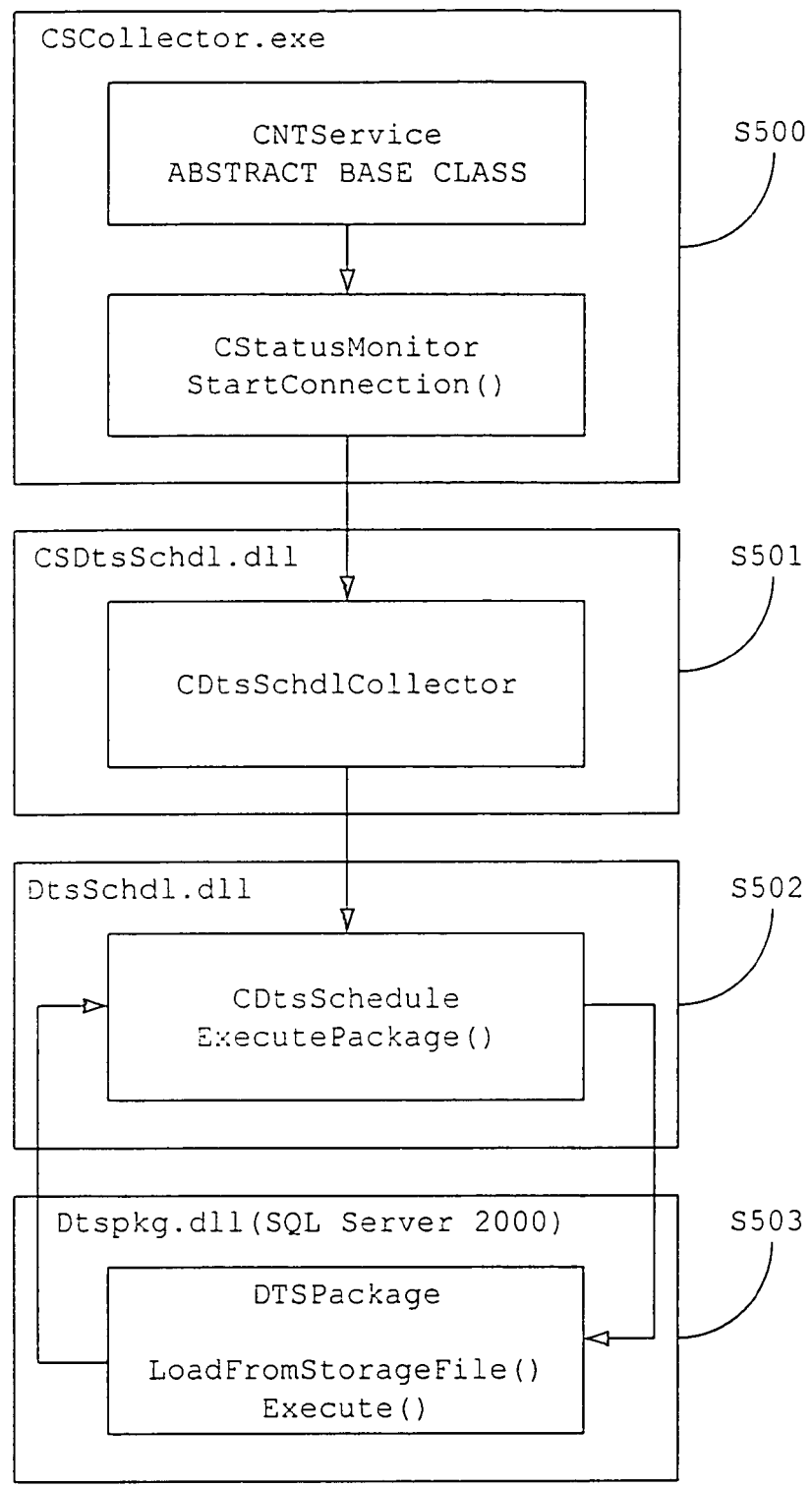
FIG. 5 is a process flow diagram used by the DTS data package, according to one aspect of the present invention.

DTS package 402A is responsible for querying database 204. FIG. 5 shows a process flow diagram for executing Data package 402A, based on the foregoing commands.

In step S500, the collector service begins. The service startup depends on the initial setup, i.e. automatic or manual start. The collector service is the base service that is needed for any type of data collector. The service manages the interface with the Microsoft Windows Operating system and manages resources. S500 also starts a monitoring thread to allow a system administrator and support personnel to monitor the data collection process.

Step S501, initiates an instance of the DTS collector 203C. DTS collector 203C runs a DTS package from within the service application.

Steps S502 and S503 open a pre-defined DTS package and execute it based on a pre-set schedule of operation.

API Data Collector

Figure 4D:
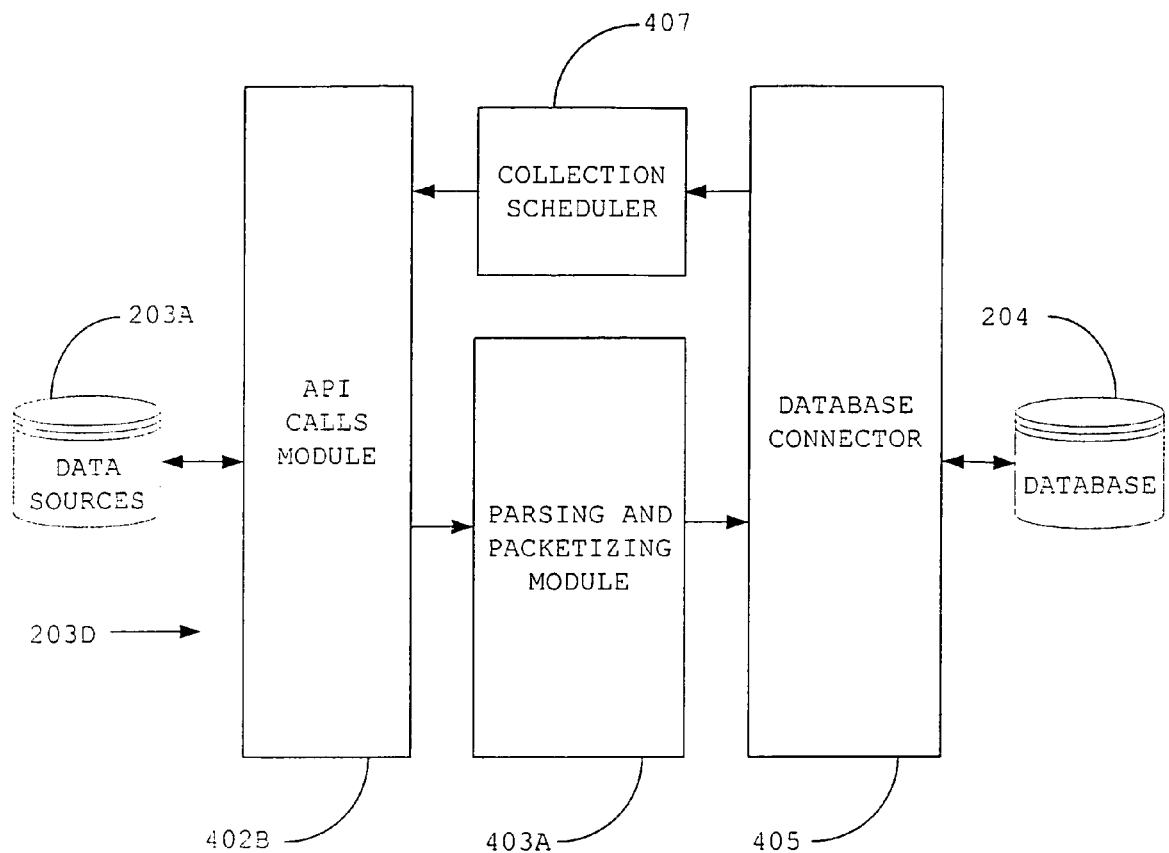
FIG. 4D is a block diagram of an API data collector, according to one aspect of the present invention.

API Data Collector 203D (FIG. 4D) is used when an API (Application Programming Interface) is available for a data source. Typically the manufacturer of a source system makes the API available. The API allows access to public areas of the source system. Depending on the protocol used, the API can interface directly (connect to a process on the same system), via TCP/IP or via a COM/ActiveX Object, CORBA interface among other ways.

Each API Data Collector 203D is designed and built for a specific data source. API Calls module 402B interfaces with data sources 203A and transfers the data to parsing and packaging module 403A that transfers the processed data to connector 405. Data is collected from data sources 203A based on a collection schedule provided by collection scheduler 407 obtained from database 204.

XML Data Collector

XML Data Collector 203D takes XML data and transforms into Storage Module 204A format tables.

Interactive Data Collector:

Interactive Data Collector 203E allows interactive collection of data. Interactive Data Collector 203E captures information from users using interactive question(s) and answer(s). This enables users to input parameters including forecasts, estimates and derived information.

Figure 4E:
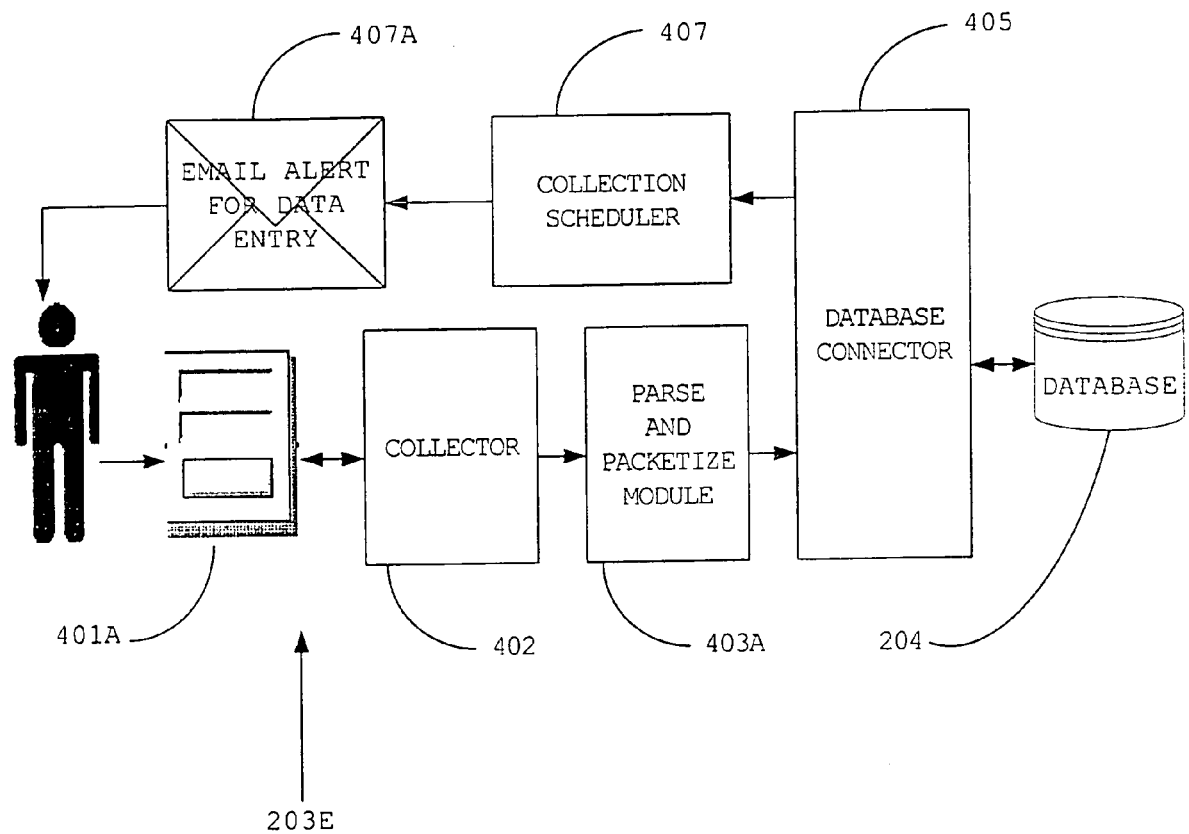
FIG. 4E is a block diagram of an interactive data collector, according to one aspect of the present invention.

FIG. 4E shows a block diagram of Interactive Data Collector system 203E. To capture data, System 104 may send an email with a link (URL address) to a data input page on a web-browser to a pre-identified group of people. After the group receives the email, the recipients can go to a web page using the web-browser and answer a series of questions. These answers become input for the interactive data collector system 203E.

Data collector 203E performs plural functions, including, the following:

(a) Allows system administrators to enter/create a questionnaire; assign a group of people to the questionnaire for responses; and define a schedule for collection;

(b) Prompt a user for input at scheduled times by sending them an email with a link to a web page; and (c) Accept responses from users via a web page.

With respect to FIG. 4E, receiving module 401A receives user input which is collected by collector 402. The data is parsed and packetized by module 403A and sent to database 204 via connector 405. Collection scheduler 407 sets up an alert system, preferably, of electronic mail (email) that is sent to the user.

System administrators are able to create a questionnaire which may have the following attributes:

1. Questionnaire title
2. List of Users—Who respond to the questions
3. Presentation schedule—When and how often are the question(s) presented?

A questionnaire may include multiple questions. Each question has a set of properties. These properties include:

Type of Question:
(a) True/False
(b) Multiple Choice
(c) Range Type
(d) Numeric
(e) Text input Typically, a User responds to an email and logs into System 104. Thereafter, System 104:

a) Validates the user to ensure the user can respond to the questionnaire;

b) Present the user with a list of questionnaire that need input;

c) On selection of a questionnaire from a list, System 104 creates and displays the page;

d) Allows the user to save work and come back to it later; and e) When the user responds, processes the input and store the results in database 204.

An example of the questionnaire with the presentation schedule is provided in FIG. 4F.

Figure 4G:
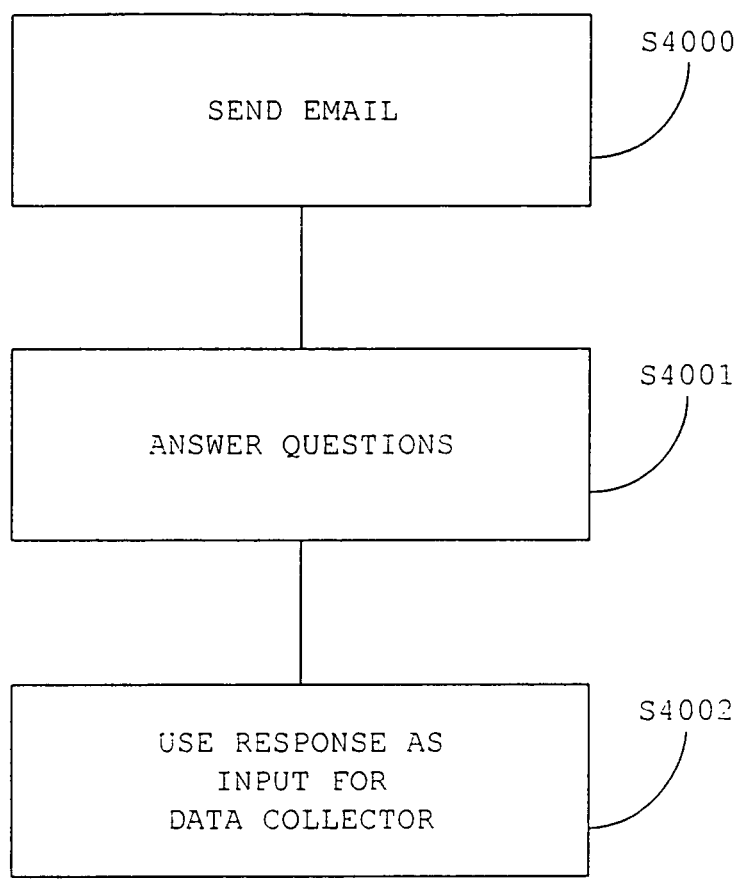
FIG. 4G is a process flow diagram used by the interactive data collector, according to one aspect of the present invention.

FIG. 4G shows executable process steps for using Interactive data collector 203E.

In step S4000, an email is sent to user(s) with a link or attached questionnaire.

In step S4001, the user accesses the questionnaire and responds to the questions.

In step S4002, user response is received by receiving module 401A and then sent to collector 402.

Legacy Data Collector: Legacy collector(s) 203B (also referred to herein as 115) are capable of retrieving data from legacy data systems, which can be accessed through a terminal, interface, for example, the ACD system such as Rolm 9005, sold by Siemens Corporation® and Lucent® CMS, sold by Lucent Corporation. Legacy Data Collector 203B allows System 104 to retrieve data using a serial or Internet Protocol (IP) based terminal connection.

Legacy data collection systems typically have a proprietary interface for third party interaction. Legacy Data Collector 203B is designed and built for each legacy data source and includes serial and telnet interfaces along with TTY and ANSI (VT100) screen interfaces. Legacy Data Collector 203B may use a menu command structure to find the right information, which is parsed and written to Storage Module 204A.

Figure 6A:
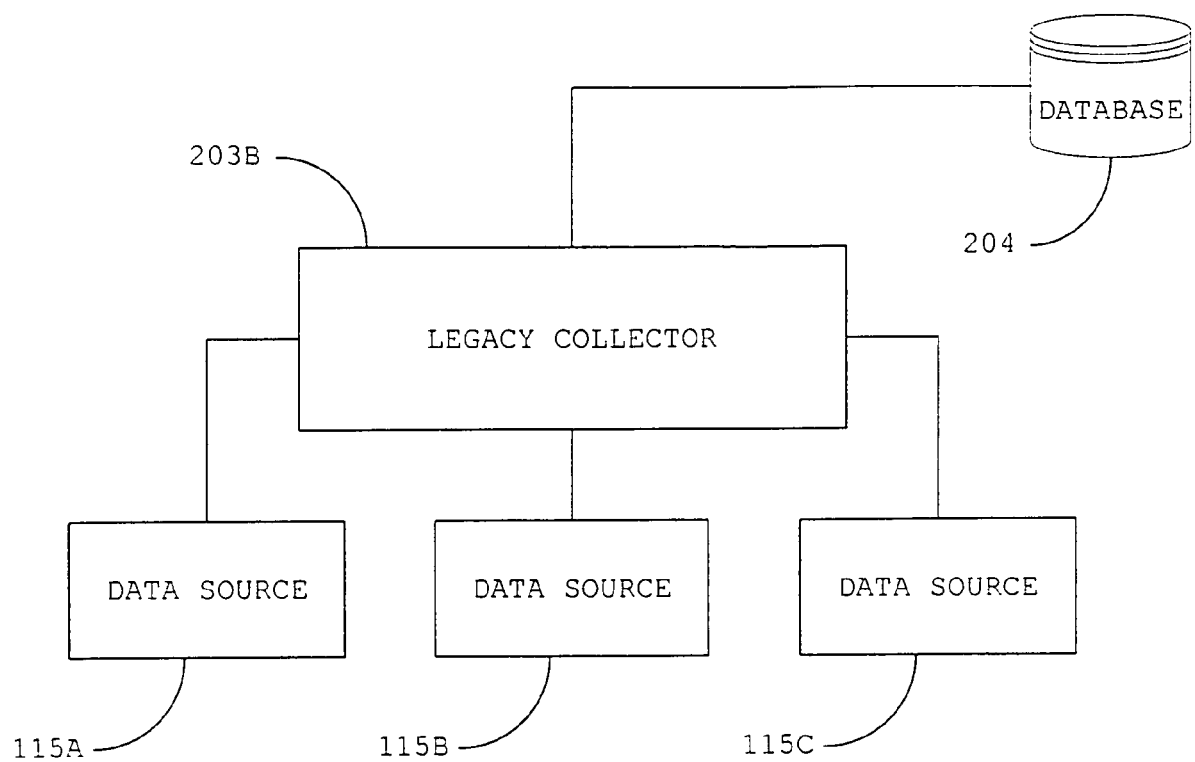
FIG. 6A is a block diagram of a legacy data collector, according to one aspect of the present invention.

An example of Legacy Data Collector system 203B is shown in FIG. 6A block diagram. The system can use one or more collectors. Each Legacy Data Collector 203B is operationally coupled to a data source through either a serial connection or Telnet connection. (Data sources 115A–115C)

Typically, data is returned by a data source in the form of tabular report. The legacy system generates the report upon a command entered by the user on a terminal (not shown). Some systems allow certain reports to be generated periodically until another command is issued to terminate it. Other reports may be requested each time it is needed. Legacy collector 203B reads metadata (machine understandable information for the web) from database 204. From the metadata, the legacy collector 203B determines what data to gather and when to issue the command to request that data from the source.

Figure 6B:
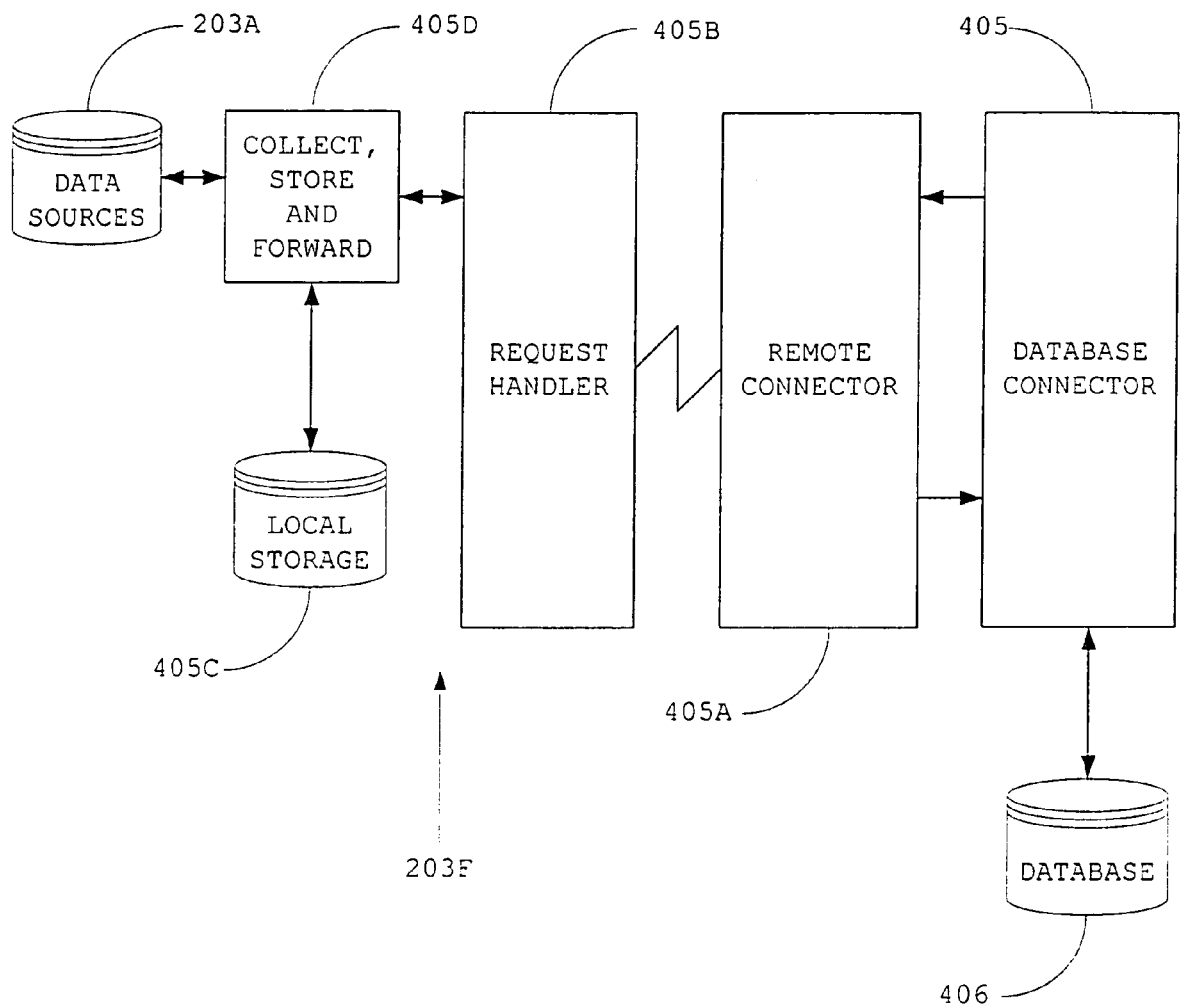
FIG. 6B block diagram of a remote data collector, according to one aspect of the present invention.
Figure 6C:
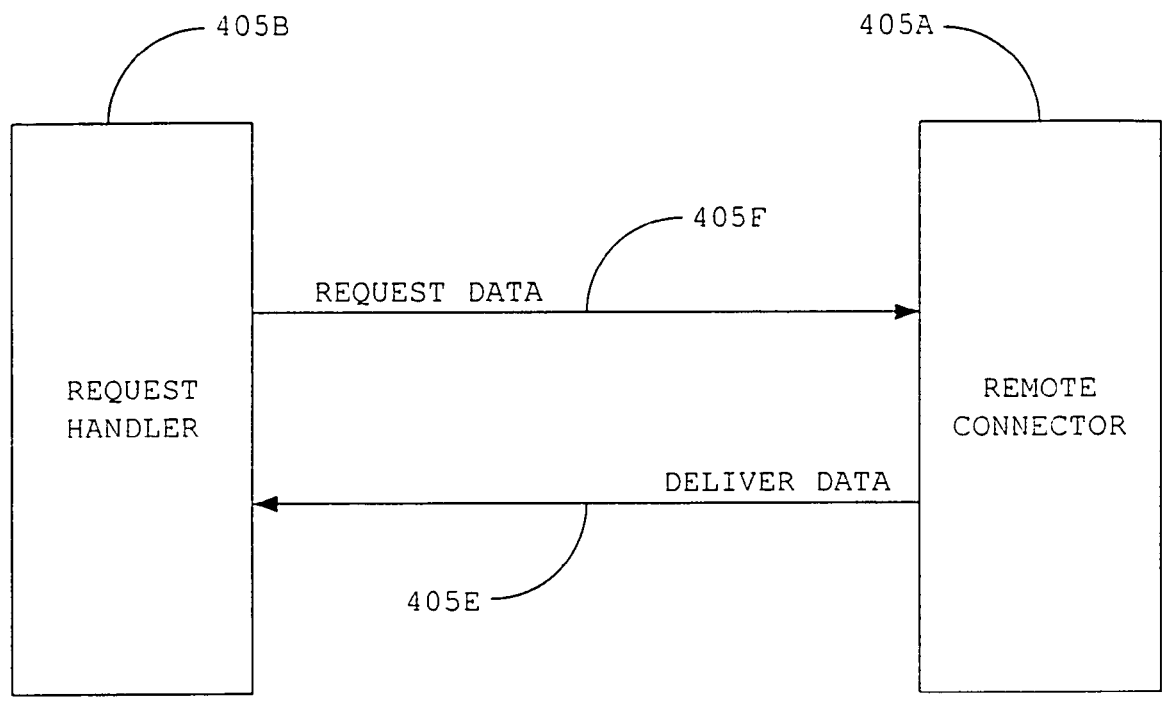
FIGS. 6C–6D shows a block diagram showing remote data collector components, according to one aspect of the present invention.
Figure 6D:
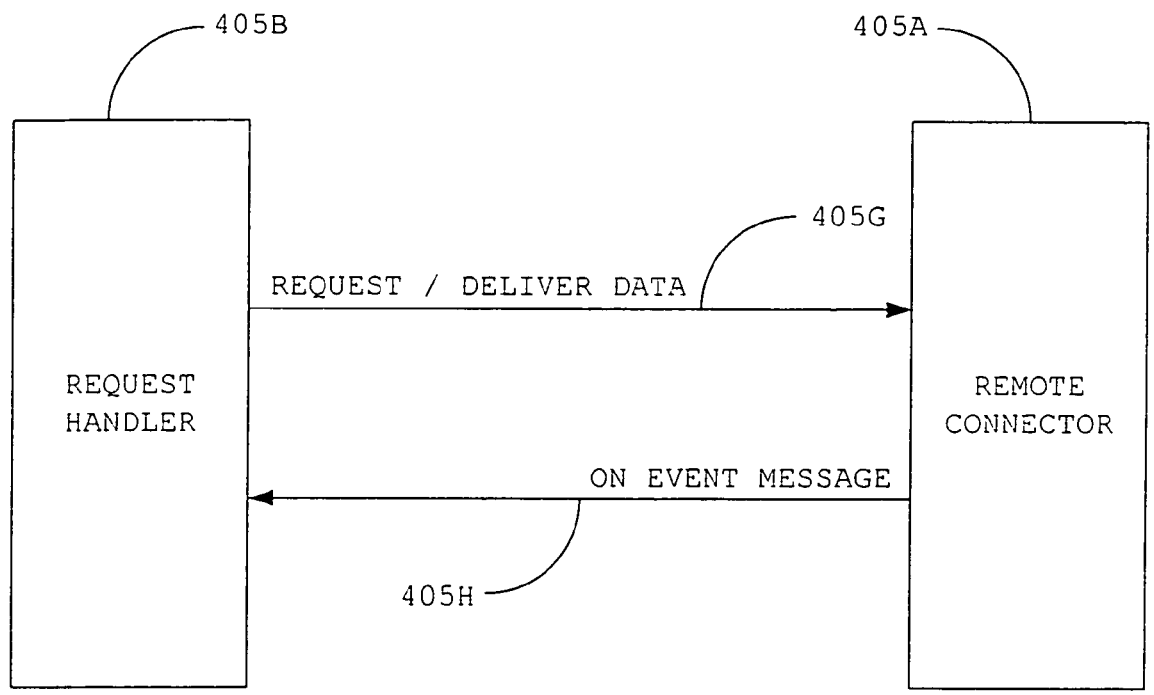
Figure 6E:
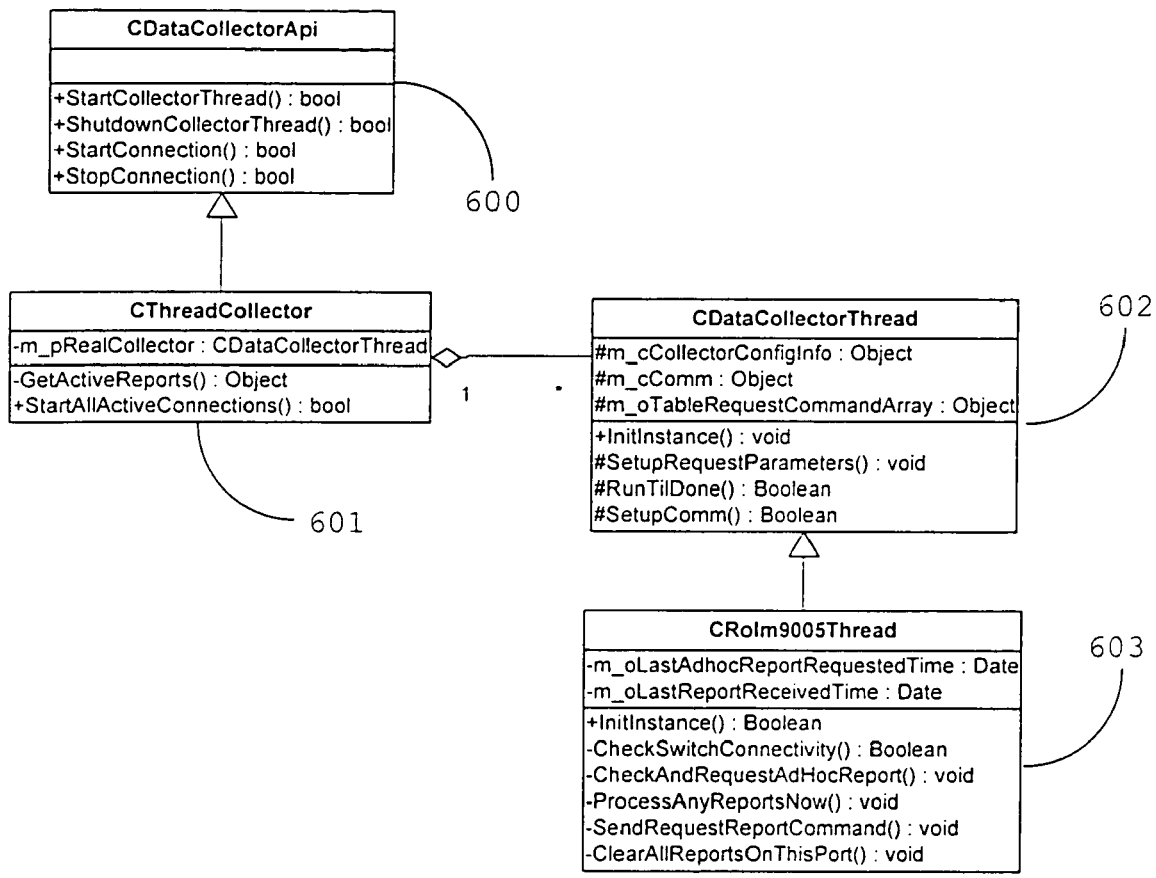
FIG. 6E is a class diagram of a legacy collector, according to one aspect of the present invention.

Class Diagram:

FIG. 6E shows a class diagram of a Legacy Data Collector. This diagram is for a Rolm 9005 equipment but the general class design is applicable to other legacy data systems. The CDataCollectorApi 600 and CdataCollectorThread 602 are the parent classes that define the methods and properties of the Legacy Data Collector(s) 203B.

CdataCollectorApi 600 is common to all modules and starts up the collector service. In addition to starting the collector service module 600 reads the configuration for collection properties from the database 204 and then initializes other modules as needed.

CthreadCollector 602 starts an instance of collector thread. A collector may have more than one thread and therefore multiple threads may be spawned for a collector. In the instance of the Rolm 9005 a collector thread is spawned for each defined serial/telnet connection to the data source.

CdataCollectorThread 602 starts up various connections specific components like the communication driver, the configuration information component, and the data stuffer module etc.

Crolm9005Thread 603 is the actual collector thread for the Rolm9005 data collector. The thread performs the following:

Performs login to the Rolm 9005

Issues collection commands to the Rolm 9005 collector for automatic report dumping.

Issues commands for real-time data collection Collects reports to parse and perform initial data manipulation and then sends them tto database 204.

Remote Data Collector

Remote Data Collector 203F, described below, allows data to be collected from remote data sources. Remote Data Collector 204F collects information from data sources located at remote sites.

FIG. 6B shows remote collector 203F with receiving module 405D that receives data from remote data sources 203A. The received data may be stored at local memory 405C (similar to disk 15). A request handler 405B receives the collected data and passes the data to remote connector 405A. The collected data is then passed to database connector 405 and to database 204.

Remote Connector 405A commands request handler 405B for data, and Request Handler 405B delivers the data. This allows remote collector 203G to obtain data from local storage 405C. (See FIG. 6C)

When an event (alert/threshold violation) 405H, (as shown in FIG. 6D) occurs, Request Handler 405B initiates a transfer process to indicate the event. Remote handler 405B sends a series of messages to remote connector 405A. These messages contain conditions of threshold violation and a message to initiate a data transfer session. Upon receiving the on-event message 405H, remote connector 405A completes the alerting action before starting a data transfer activity. This allows for timely alerts without data transfer and processing delays. It is noteworthy that this may be the ad hoc mode for data-transfer from data collector 203F to database 204.

It is also noteworthy that a remote collector 203F may be configured for a specific data-source.

Local Storage 405C:

Tables at local storage 405C follow similar design as the tables in Storage Module 204A discussed above. Local storage 405C may also contain tables for "alert" and "threshold" information. This will allow remote collector 203F to do on-event data transfer.

Collector Set-Up:

At system start-up 104, Remote connector 405A initiates a TCP/IP session with request handler 405B to transfer configuration information, including data collector rights, collection objects, collection schedules, and alert and threshold information. The TCP/IP protocol allows remote collector 203F to start and connect to a data source.

Data transfer may follow XML data formats. Requests for data and data delivery may follow XMLP (XML Protocol) being developed by W3C (World Wide Web Consortium). To ensure data security, remote collector 204F architecture follows XML Encryption standards or other industry standards.

Database 204:

FIG. 7A shows a block diagram of database 204. Database 204 may be built on a SQL Server 7.0/SQL Server 2000/SQL Server 2002 database system or any other database system. Database 204 includes storage module 204A and configuration module 204B, as discussed above. Storage module 204A provides stable data storage for the collected data. A "data store" is defined for each enabled Data Collector 203, and plural data stores may exist in storage module 204A.

Each data store consists of tables, views, triggers for front-end thresholds and stored procedures for transforming & validating the data. The data store includes two kinds of data structures. For interval information, the tables contain successive rows of information. Each row represents a unique value or summary for the interval. FIG. 7B shows an example of such interval data. Correspondingly, snapshot information contains just one row of information per unique key, as shown in FIG. 7C.

Configuration Module 204B

System 104 configuration and setup information is centralized and stored in configuration module 204B, which stores all configuration information for data collection, data source type definition, defining display layouts, storing report files and user permissions.

The configuration information is used to drive data collectors 203, PowerUser interface 106, InfoUser interface 105, Web Server module, user profiles and Reporting Options module 206.

Relevant Tables:

Strict information tables: The information tables are part of the main data store in database 204. These tables hold information from a data source. Periodic historical tables keep information over time and transient real time tables are rewritten with every update.

Figure 8A:
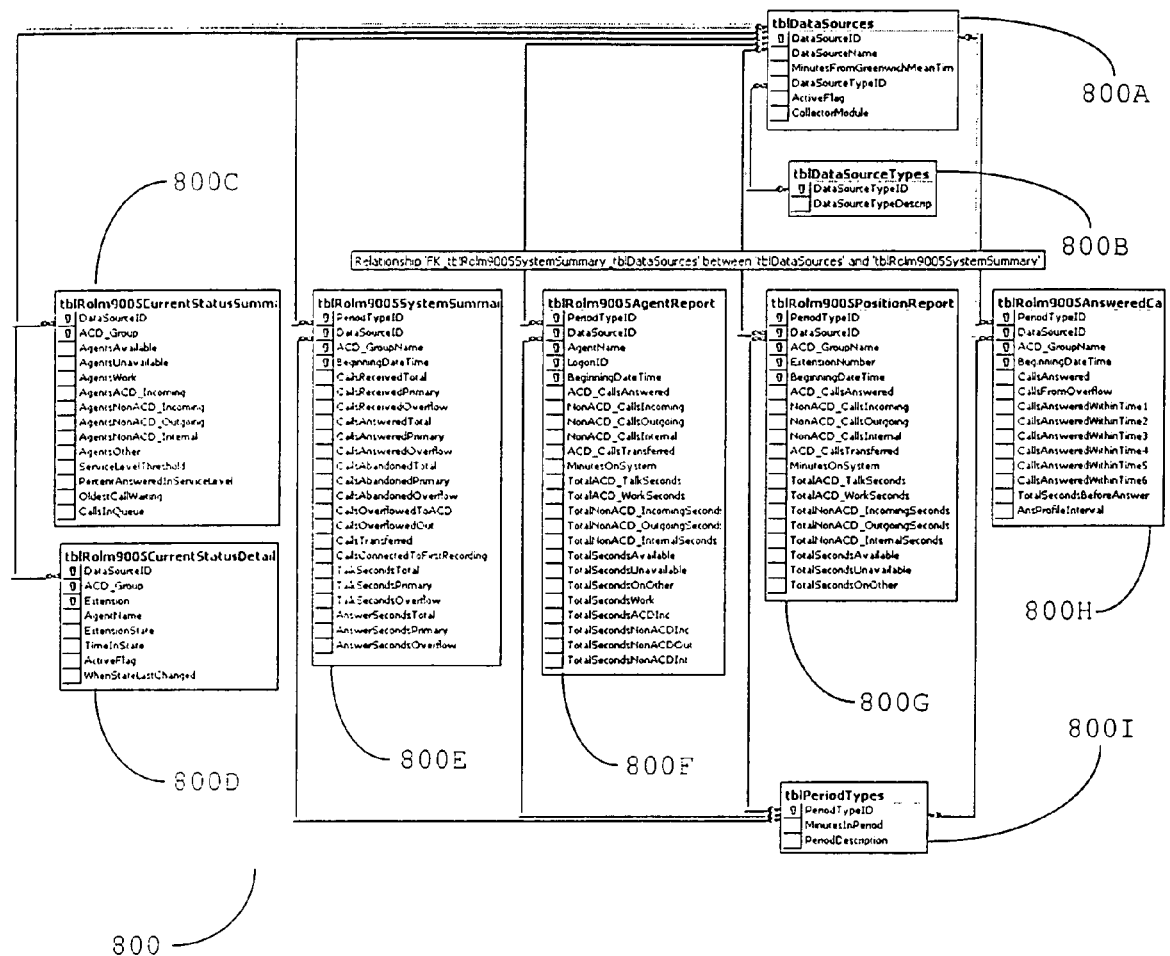
FIG. 8A is a database diagram for a legacy collector, according to one aspect of the present invention.

FIG. 8A shows a database diagram for Rolm 9005, a legacy collector 203B. It is noteworthy that the invention is not limited to ROLM 9005. Database diagram 800 includes a table of data sources 800A that provides information on the data source itself, for example, DataSouceID, Name, or Collector module etc.

Current status summary is provided by table 800C with details in table 800D. Table 800E provides the overall System summary.

Table 800F provides agent summary information on each agent defined on the data source, while table 800G provides position information for each agent position. An agent and agent position are different entities as defined on the Rolm 9005. Table 800H provides information on all the calls that have been answered by agents.

Figure 8B:
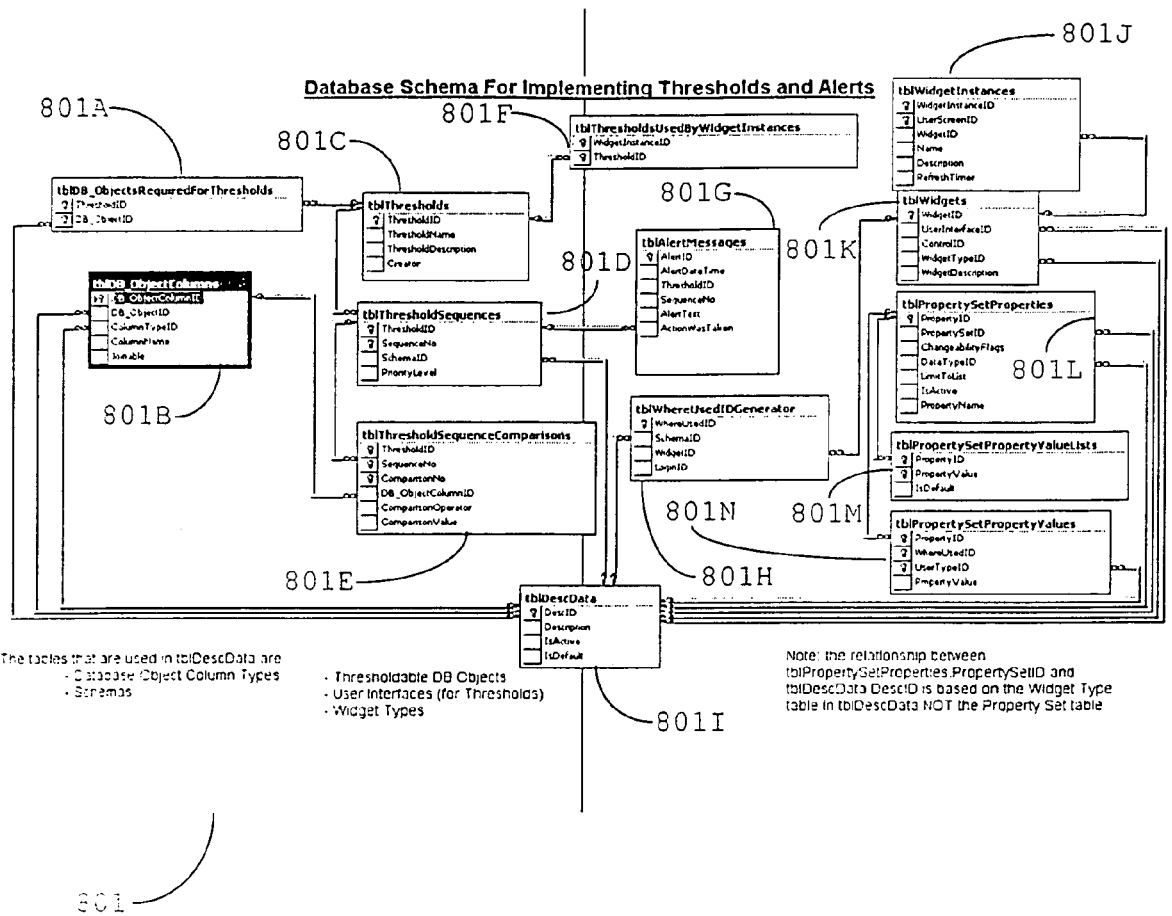
FIG. 8B is a database schema for implementing thresholds and alerts, according to one aspect of the present invention.

Alert Threshold Database Schema:

FIG. 8B provides a database schema for implementing alerts and thresholds, according to one aspect of the present invention. If a particular data point violates a pre-defined threshold, then an alert is generated and a user(s) is notified. Alert thresholds are processed when information is inserted into database 204 and may use "MS SQL" insert triggers that execute whenever data is inserted or updated. The triggers check for any thresholds relevant to a current table and then check every column in the incoming dataset to columns used by threshold(s).

FIG. 8B shows table 801 with table 801A that includes the objects required for thresholds. This table is operationally coupled to a threshold table 801C. If incoming data matches a column (Table 801B) it performs a comparison test. If a threshold is violated a message can be generated using information stored in a schema (property values) including email, paper, phone call or other alert methods. Whether or not action occurred is indicated along with the threshold and sequence that was violated, and the time of occurrence.

Alerts and Thresholds are setup to evaluate pre-defined conditions of incoming or displayed data. The alerts and thresholds are setup independent of the action that may be taken when the conditions are met. They can be setup on available data columns (Table 801B). An alert/threshold can consist of many levels of conditions connected by 'AND' and 'OR' clauses. Tables 801C, 801D and 801E hold the alerts/thresholds definitions. Alert conditions are evaluated when data in inserted into the database 204(*at* the time of collection) while thresholds are evaluated when a user is viewing information (late-model evaluation).

Defined alerts/thresholds are associated with actions (schemas). Schemas define the action that needs to be taken when a condition is met. The actions themselves are defined in tables 801I, 801L, 801M, 801N.

Table 801G defines the messages that will be sent out when an alert occurs.

Tables 801F, 801H, 801J, 801K define the various display time associations for the thresholds. Thresholds can be associated with multiple display widgets.

In one aspect of the present invention, system 104 can define and implement a stealth (pre-indicator) threshold evaluation. The pre-indicator allows a user to monitor a set of values and be alerted when a condition on related value met. This reduces the load on viewing and allows managers to concentrate on key indicators only. By allowing threshold evaluations on non-displayed data elements, users can be pre-notified of events based on a set of rules.

Schema/Properties:

Property sets are a set of pairs with identification and a value. Each identification is associated with a description. Property sets may be maintained for widget types, widget instances and others, such as thresholds. A property set can be active or inactive. Its ability to change can be controlled. It can be associated with a particular setup such as "default out of the box", and user defined "Screens". Properties can be associated with schemas, or a group of property sets together. These schemas can further be associated with specific user logins.

Figure 8C:
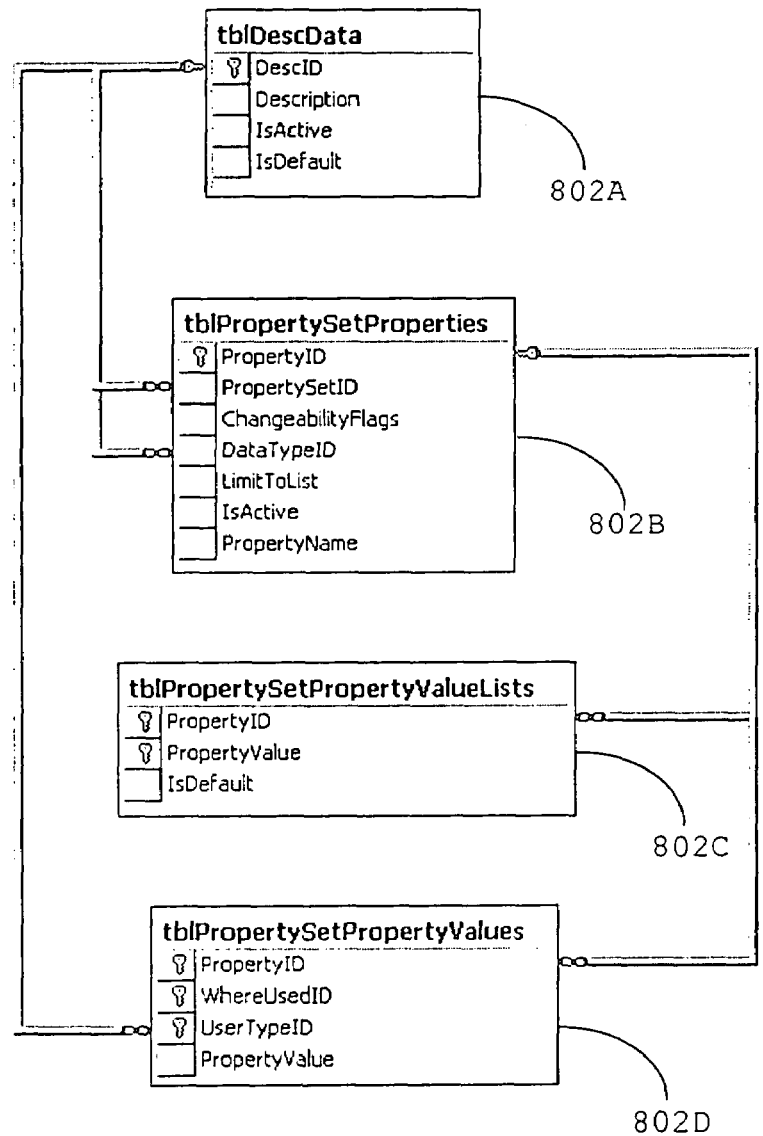
FIG. 8C is a diagram showing tables associated with data property sets, according to one aspect of the present invention.

FIG. 8C shows a diagram of tables 802 associated with property sets. Table 802A includes property sets, property data types and users of property sets. For example, when data collectors are defined there are a set of connection properties (like serial port parameters or connection IP address) which are stored in table 802B. While the values for those property types (like '9600,N,8,1' and '192.168.1.120') are stored in Table 802D.

Table 802B sets properties associated with identification, while table 802C sets property value lists. Table 802D sets property values, as shown in FIG. 8C.

Tables/Columns:

Permission tables (and views) which can be accessed through PowerUser Interface 105 are listed in a table and may be associated with a different name than the one used in database 204 stored in the database 204 tables. These permission tables are linked to a data source type and an object type (such as a table or view). Plural column values are stored with each object.

Each database 204 object can contain columns, which are listed in another table. These columns are recorded with an Identification (ID), parent object Id, name and type. User defined columns can be defined in another table that allows the user to combine existing columns to form a new column, performing some calculations or processing during column handling.

Permissions are handled through a table that contains an ID of the grantee and the grantor of authority, the time authority is granted, the data source granted for, and the object granted access to.

Figure 8D:
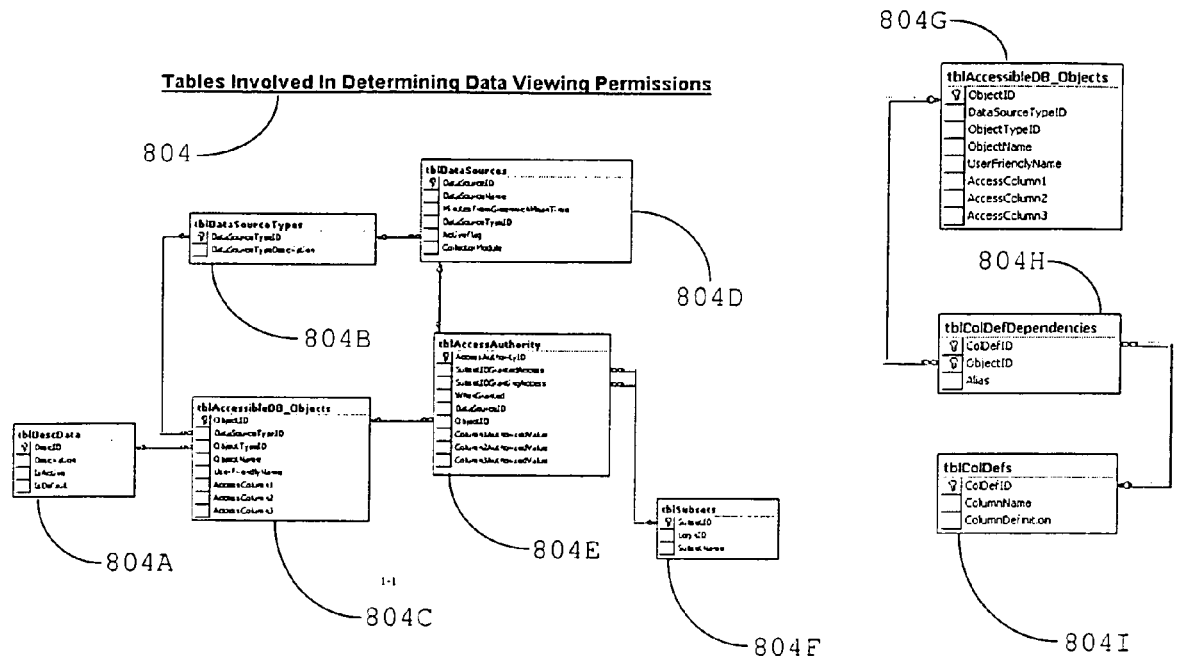
FIG. 8D is a diagram showing tables for viewing permissions, according to one aspect of the present invention.

FIG. 8D shows a diagram of tables 804 involved in determining data viewing permissions. Table 804B identifies the data source type for which permission is required, while table 804D identifies the data sources. Table 804C provides access objects for one or multiple data points, and is linked to table 804E that contains information on level of authority given to a user to view or modify a data point. Table 804F is operationally coupled to table 804F.

It is noteworthy that table 804C is coupled to table 804G and 804F such that Powerusers and InfoUsers can only view those widgets and display items that they have permission to view based on Table 804C.

Data Source/Reports/Collection:

In one aspect of the present invention, System 104 maintains a list of data source types. A data source type is linked to a set of reports. A data source type report contains information on report identification, data source type identification ("typeID"), report type, report name, and the objects that are in the report.

A data source can be created with a typeID and information such as its name, global position, active status, and what module is to be used when collecting information. A connection can be associated with a data "sourceId". There can be 0 to many connections for any data sourceId. A data source type report schedule contains information on the data sourceId, connectionId, reportId, when and how often to collect data, the command string that can be used, and a flag indicating whether to process the schedule or not.

Figure 8E:
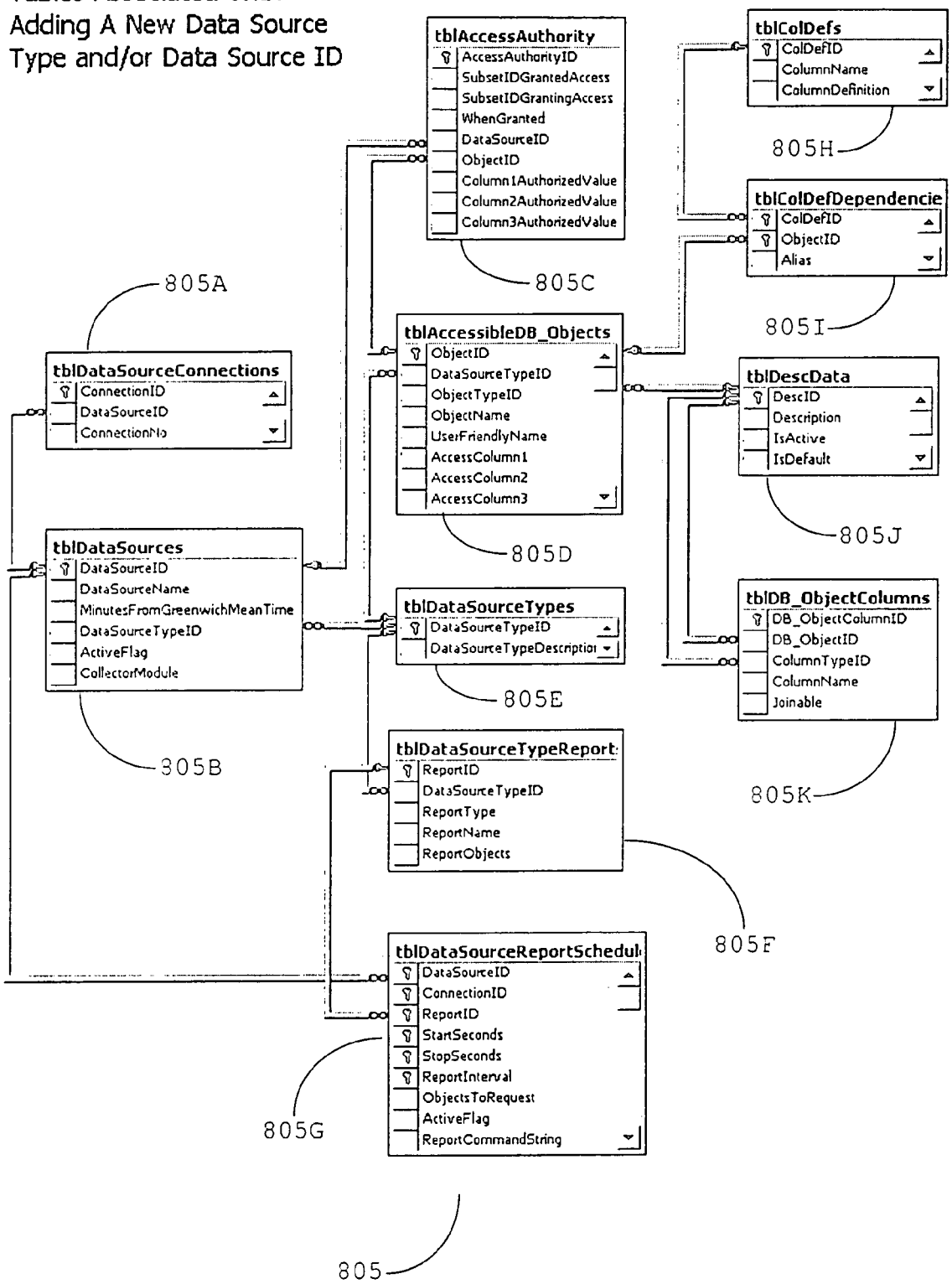
FIG. 8E is a diagram showing tables for adding a new data source, according to one aspect of the present invention.

FIG. 8E show tables 805 associated with adding a new data source type and/or data source ID. The table 805A defines connections for the data source. Table 805B defines the existing data sources. In table 805C, the permissions for the data sources are defined. Table and View objects are defined in table 805D while table 805E defines the data source types created through the interface (as discussed in FIGS. 8I through 8P). Table 805F defines data source type reports while table 805G defines how often 805F will run reports. Tables 805H and 805I are used for creating columns that don't natively exist in tables while table 805K defines the "natively existing columns" or actual columns. Table 805J is used to descriptively link tables 805D and 805K allowing for 1 to many relationships.

Figure 8F:
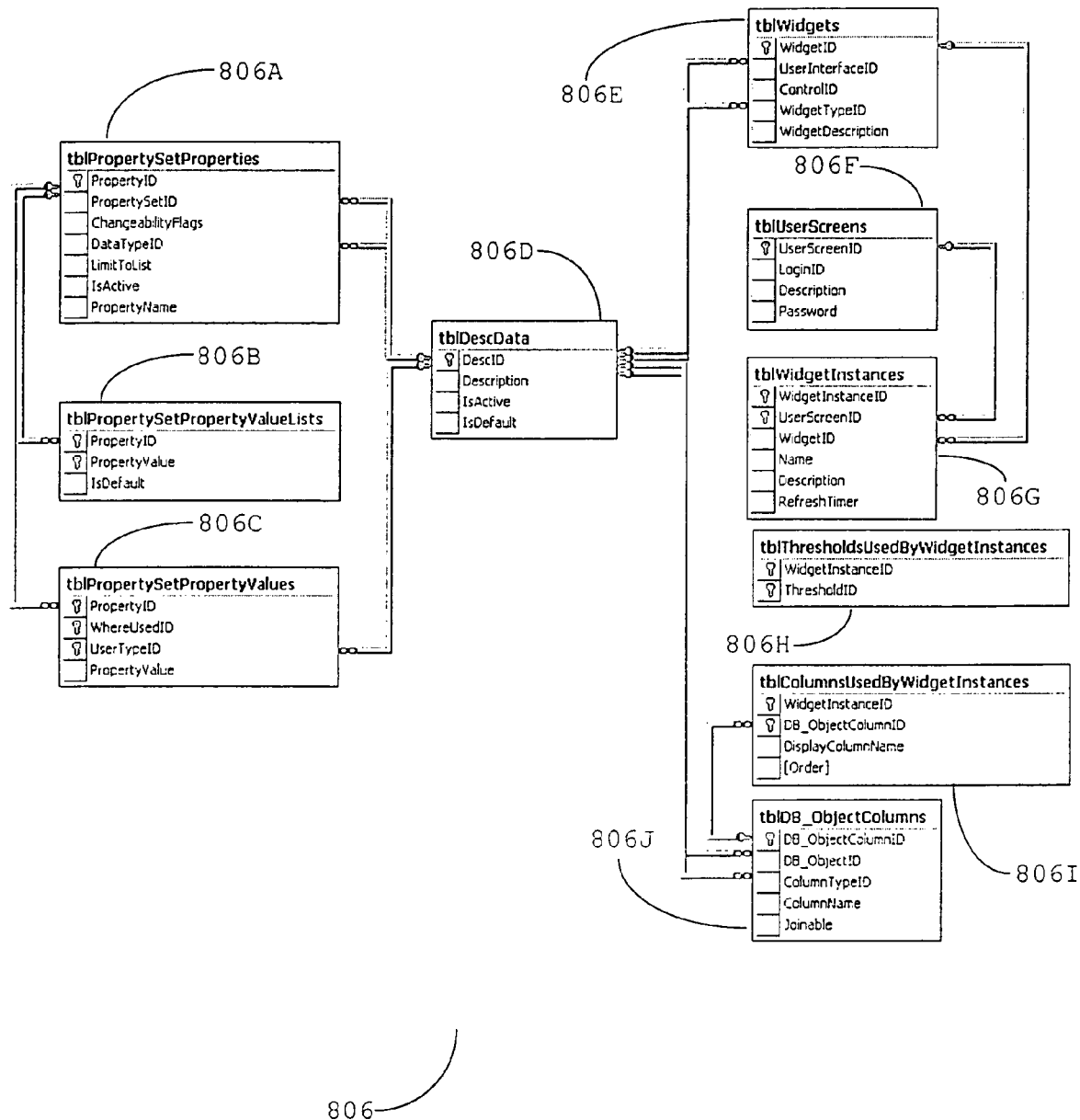
FIG. 8F shows table property sets for widget instances, according to one aspect of the present invention.
Figure 8G:
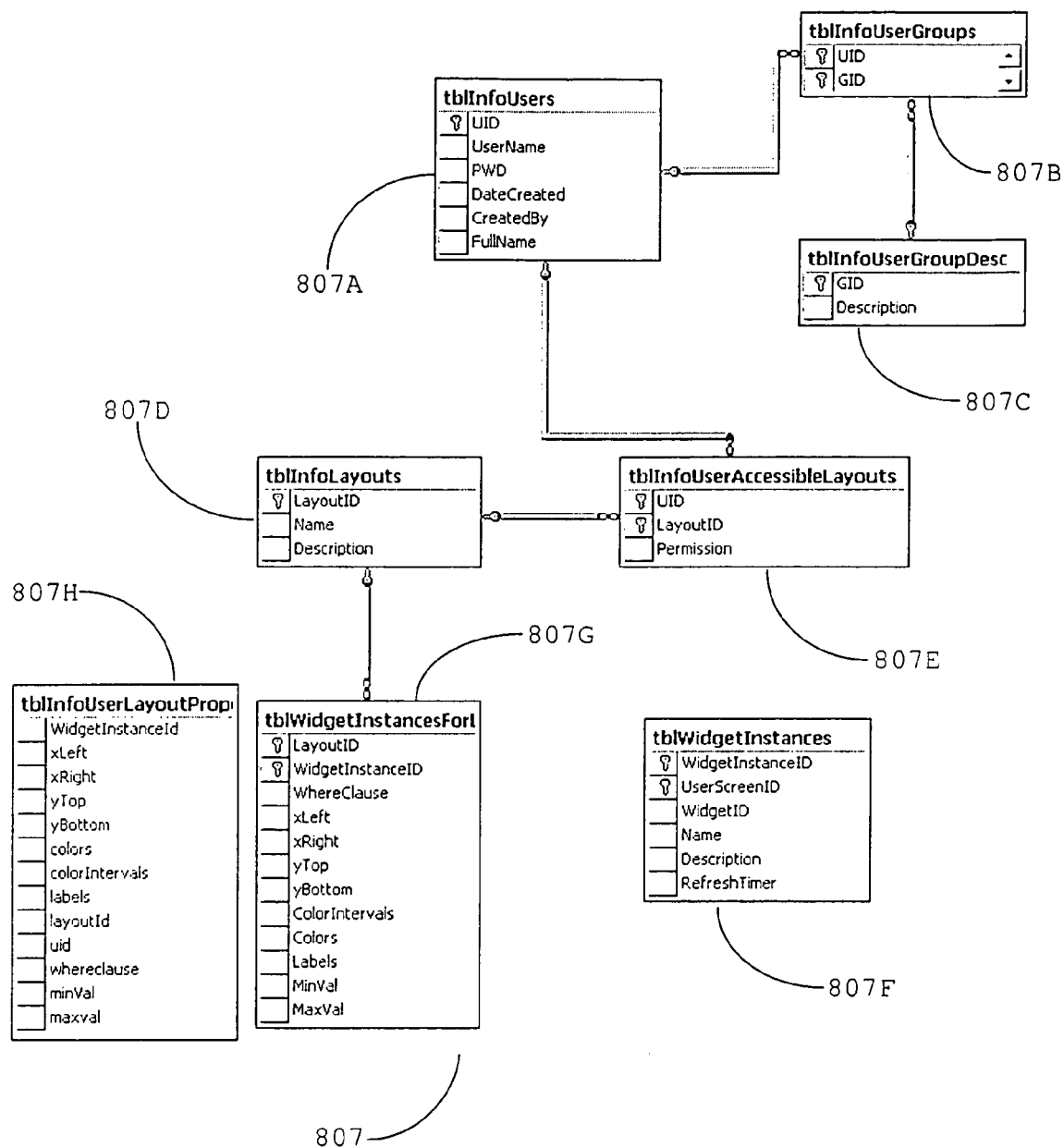
FIG. 8G shows tables as used by InfoUsers, according to one aspect of the present invention.
Figure 8H:
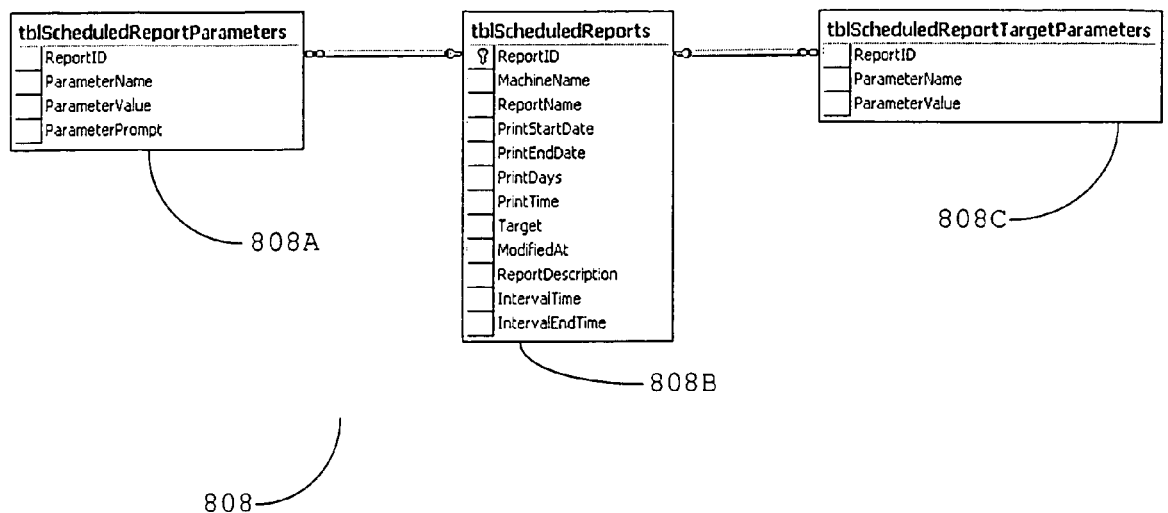
FIG. 8H shows tables for scheduling reports, according to one aspect of the present invention.
Figure 8I:
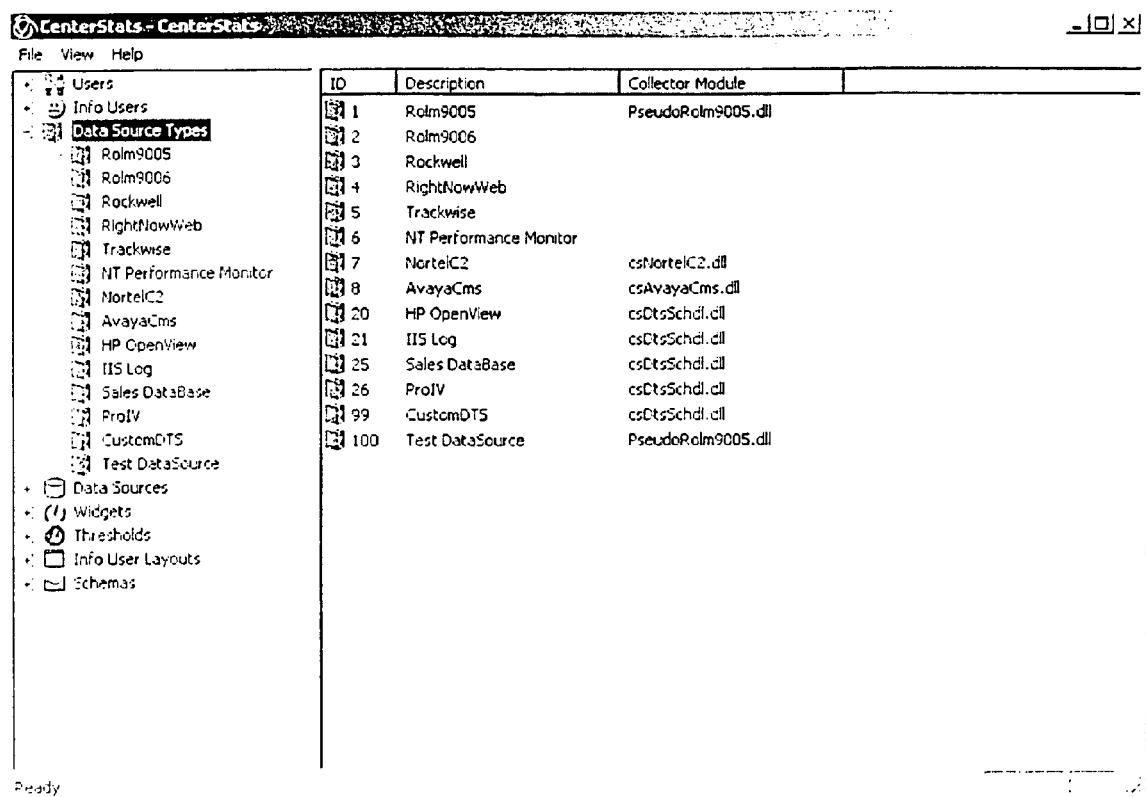
Figure 8J:
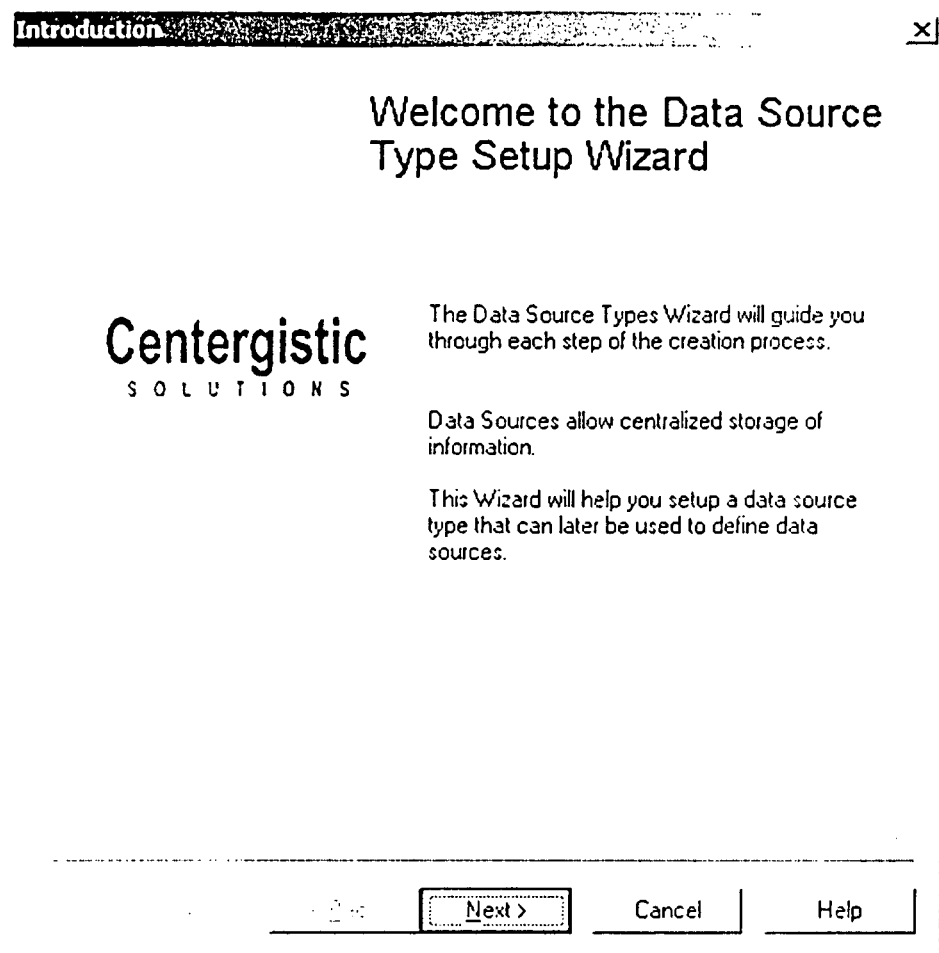
Figure 8K:
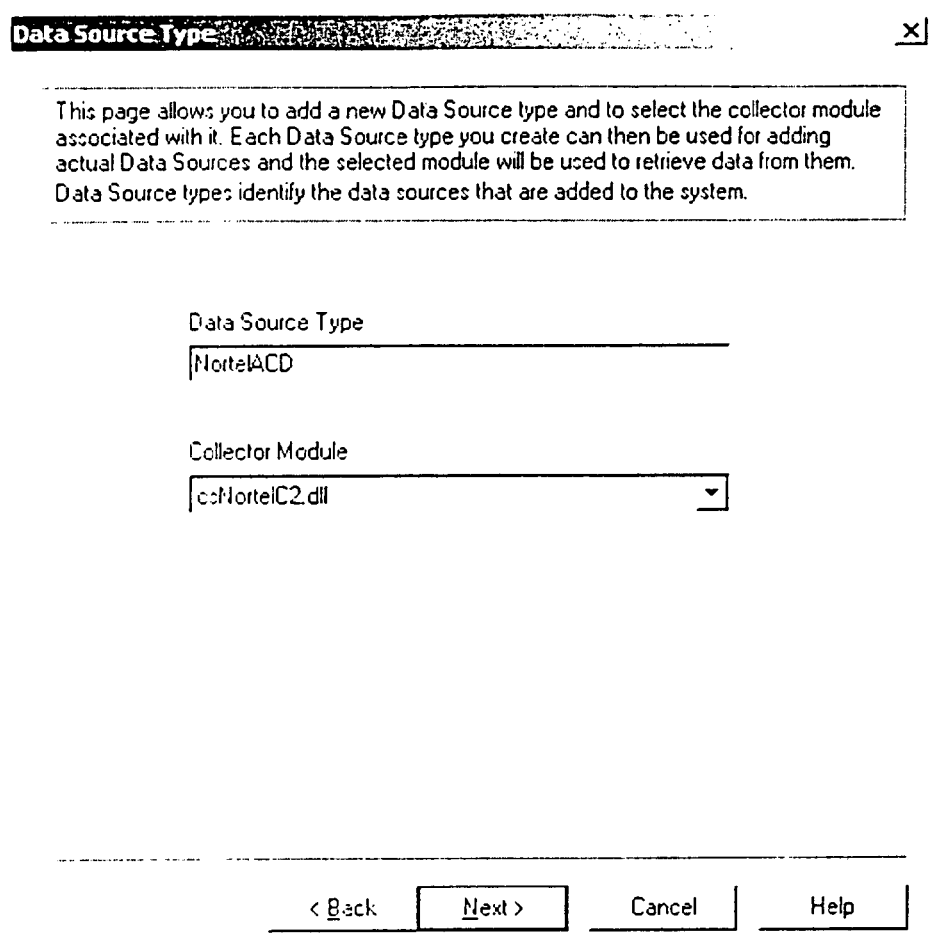

FIGS. 8I to 8P provide screen shots of the process in creating and defining a data source type. Each data source type created can then be used for adding actual data sources. FIG. 8I shows the system 104 tree-control module. To create a new data source type, right click on the data source type icon 809A in the left window pane 809B and select "New". This will launch the Data Source Type Setup Wizard shown in FIG. 8J.

The first step in the wizard is to name the data source type and select a collector module. This is done in FIG. 8K. Data source types will be used in defining actual data sources while the collector module is used to retrieve data from them.

Figure 8L:
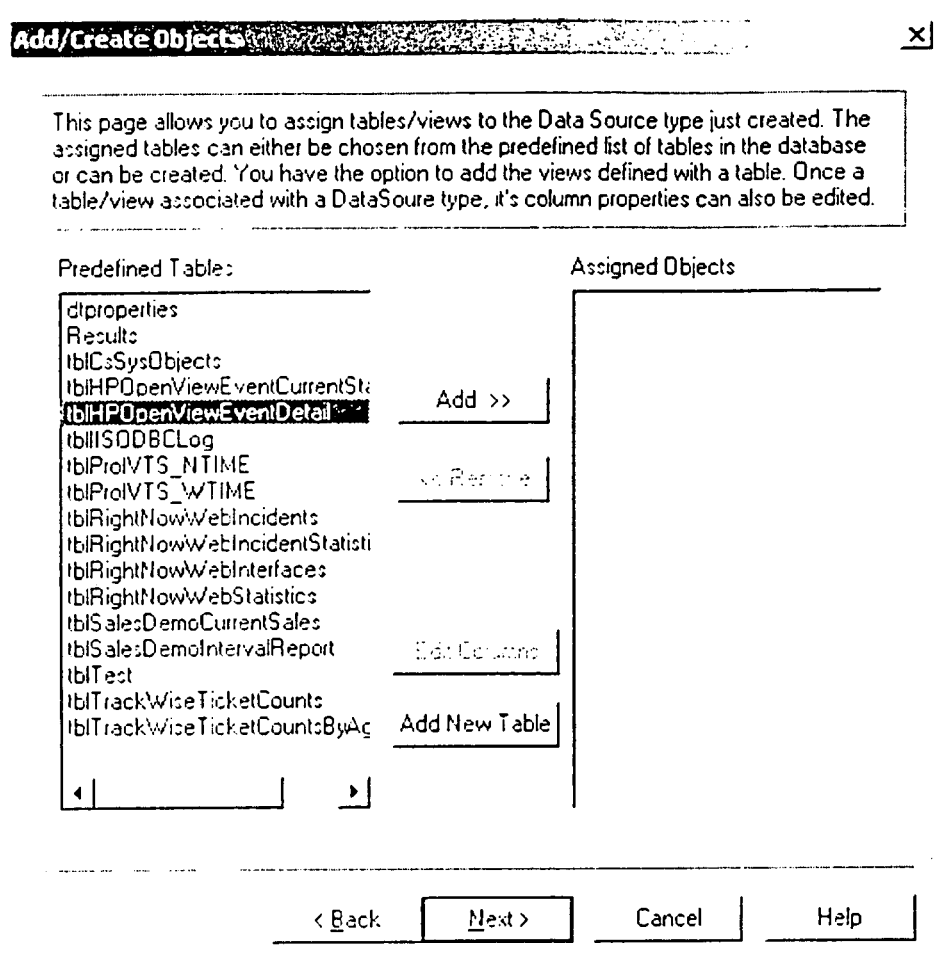

The second step in the wizard is the Add/Create Objects dialog (FIG. 8L). This dialog allows assigning tables/views to the data source type being created. The assigned tables can either be chosen from the predefined list of tables in the database or can be created. Custom views may be defined with a table. Once a table/view is associated with a data source type, its column properties can also be edited.

Figure 8M:
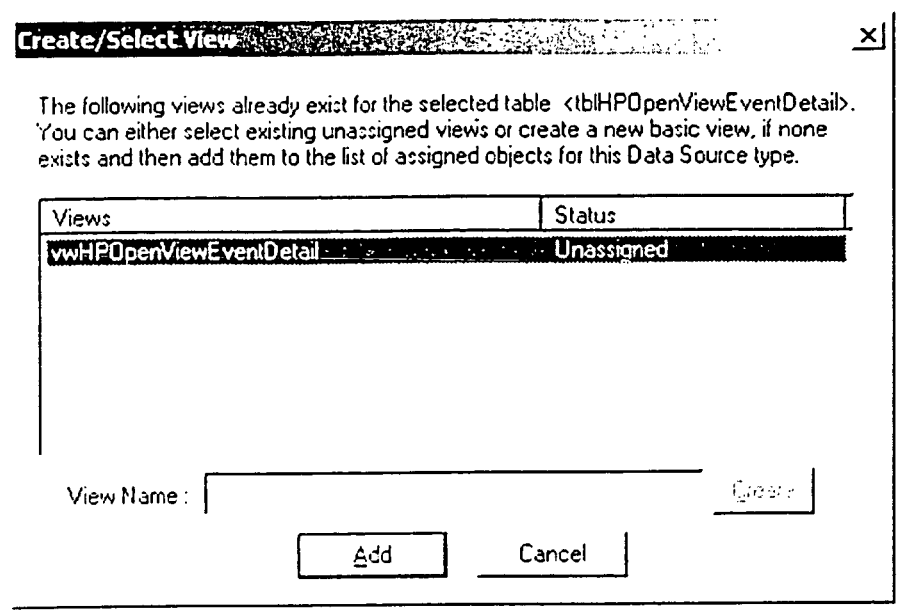
Figure 8N:
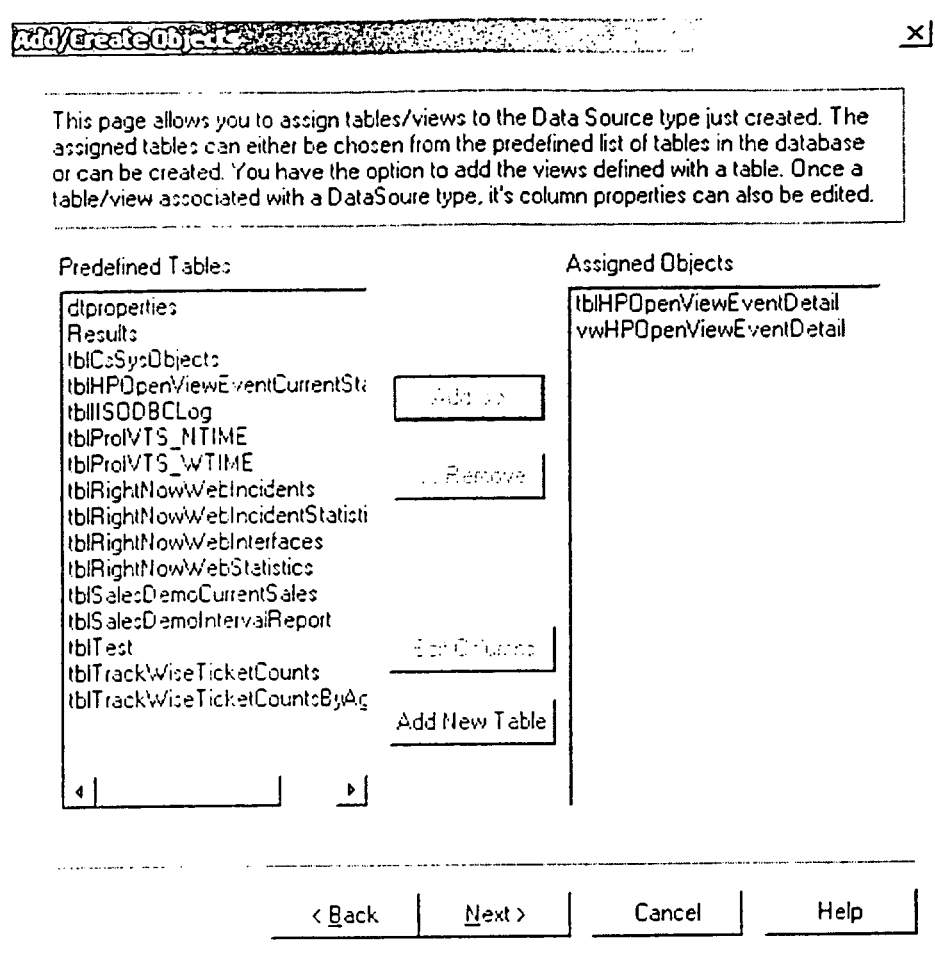

When a table is selected to be assigned to the data source type, a list of views of that table will be displayed (FIG. 8M). From the Create/Select View dialog the user can select a pre-existing view or create a new one.

All selected predefined tables and views are displayed in the Assigned Objects area of the Add/Create Objects dialog. (See Assigned Objects area of FIG. 8N).

The next dialog in the wizard is the Add Object Properties dialog (FIG. 8O). This dialog allows a user to specify a user friendly name and the object type for the objects assigned to this data source type. This data is used for configuring users, data sources, widgets, thresholds and schemas.

The Specify Access Columns dialog (FIG. 8P) is the final step in the Data Source Type Setup Wizard. This dialog allows the user to specify the access columns associated with each of the assigned objects of this data source type. The access columns are actually the columns on which the different levels of drill down capability the PowerUser depends on. The data may be grouped at different levels based on the specified access columns.

Once the user clicks on the Finish button, the data source type is created. A data source can now be defined using this data source type.

Widget/Instances:

A base display item is called a widget or a widget type, for example, a gage is a widget (type). An instantiation of a widget is called a widget instance. A widget instance is a particular display format of a particular set of information.

FIG. 8F shows table property sets for widget instances.

"tblWidgets" 806E contains the widget types available for all widgets, the name of widget types. "tblPropertySetPropertyValues" 806A contains basic information on properties for widget type. By using "tblPropertySetProperties" and "tblWhereUsedIDGenerator" (not shown) any of the properties in "tblPropertySetProperties" 806A can be expressed for a widget.

In tblWidgetInstances 806G, a display item is associated with a widget type which determines how information is displayed in terms of format. It is also linked to tblPropertySetProperties 806A, so that each individual login (and subset) can have its own set of property values defined for the widget instance.

InfoUser Tables:

FIG. 8G provides plural tables as used by InfoUsers. InfoUsers are defined in tblInfoUsers 807A and are associated with a numeric ID. Username and Password are unique, but this is enforced through stored procedures rather than database structure. Interaction with database 204 is through stored procedures in configuration module 204B.

InfoUser application 105B users share a set of SQL logins rather than each individual having a SQL login. There is a login for the InfoUser Application 105B rather than for its users, and all users of the application share that connection (or pool of connections). An InfoUser layout is defined in tblInfoLayouts 807D with an associated name and description. TblWidgetInstancesForLayouts 807E specifies which WidgetInstances are defined for a layout, including the location, color, label, and other configuration information for a display item. These are specific to a display item in a specific layout. The same item may be in a different layout with a different position or color.

Further individual users may define their own properties, which allow different users to have different properties for the same display item in the same layout. Whether a user has this right is specified in tblInfoUserAccessibleLayouts 807E, Report Printing:

Report Scheduler 213, described below, stores its schedule and configuration information in configuration module 204B. Schedules are based on machine name in tblScheduledReports 808B (FIG. 8H) which define when and how to produce a report, and parameters necessary to produce the report. Table 808B is linked to table 808C and 808A for generating reports.

Table 808A provides a listing of Report ID with parameter names.

PowerUser Interface 106:

PowerUser Interface 106 is designed for a user who views and analyzes information. PowerUser Interface 106 may be a computing system described above with respect to FIG. 1A. PowerUser Interface 106 may connect to database 204 using direct ODBC connections 106A. Real time information is delivered using ODBC queries.

PowerUser Interface 106 can retrieve defined widgets from database 204 and group them under data sources, as well as, widget types. On selecting a particular widget, predefined properties of that specific widget is retrieved and displayed on a display screen.

PowerUser Interface 106 supports plural types of widgets, including gauges, graphs, billboards and charts. Threshold analysis is performed on the retrieved data before it is displayed by the widgets. The threshold violations may be displayed as change of colors on the screen.

Figure 9:
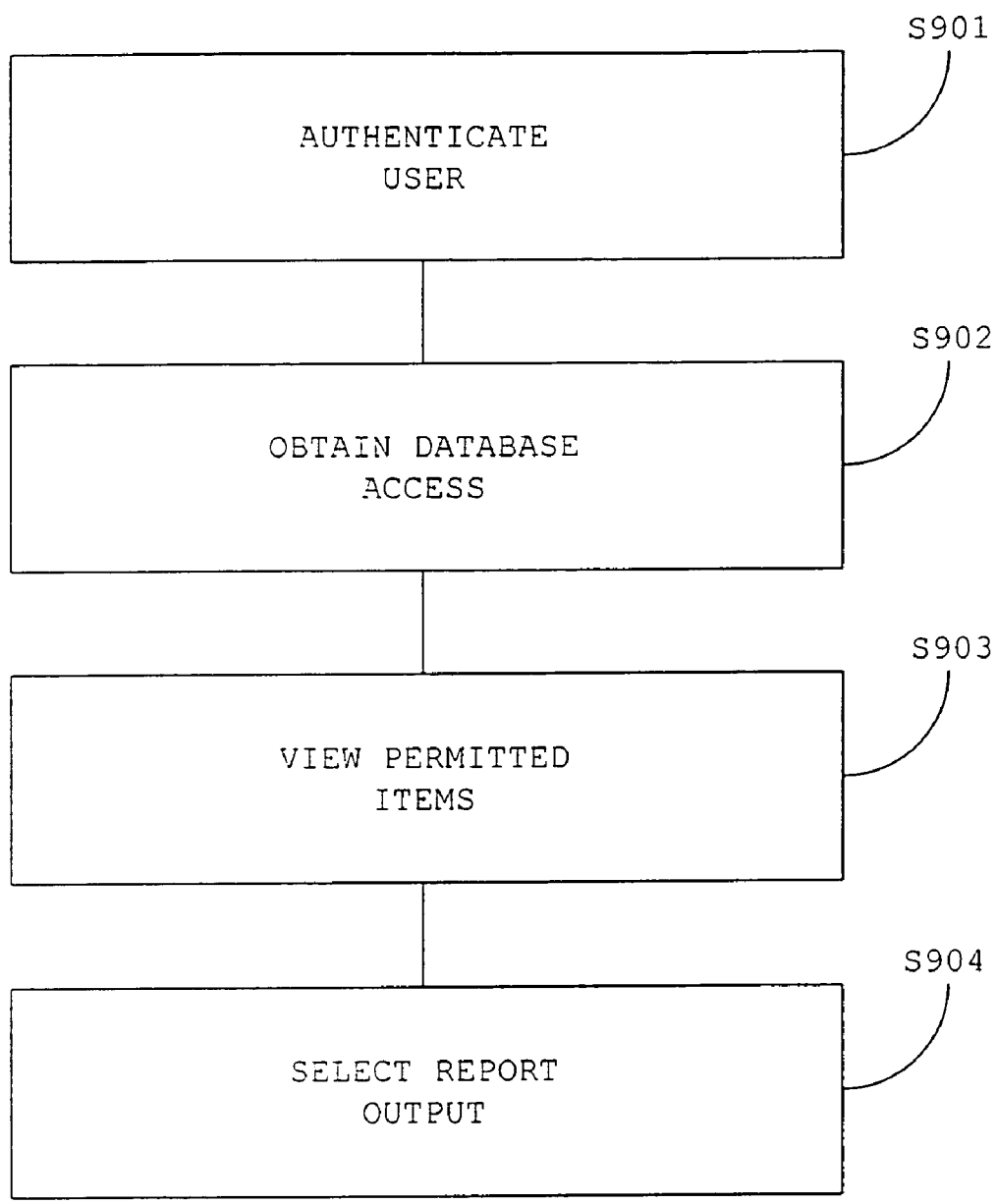
FIG. 9 is a flow diagram that allows a Poweruser access to the system, according to one aspect of the present invention.
Figure 9A:
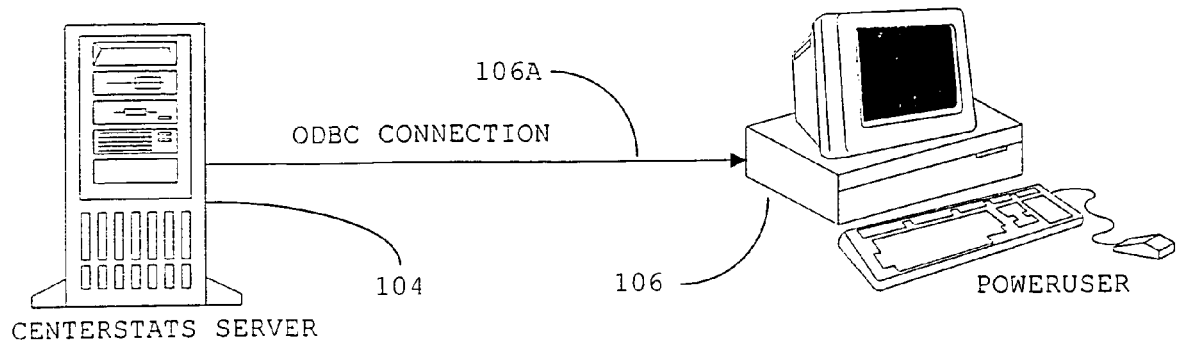

FIG. 9 is a block diagram showing process steps for retrieving data information from database 204 by a PowerUser through PowerUser Interface Server 106A, as shown in FIG. 9A.

Figure 9B:
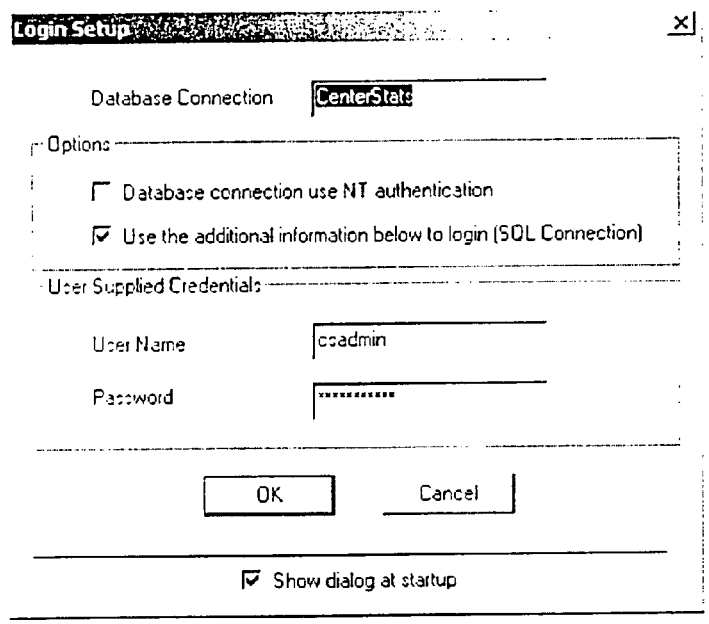

In step S901, a login window authenticates the user before providing access to database 204. An example of a login window is provided in FIG. 9B. A user can login using SQL Server profile or Domain information.

In step S902, database access is obtained through a series of predefined stored procedures using ODBC (Open Database Connectivity). This is achieved through the Microsoft® Foundation Classes (MFC) wrapper classes, CDatabase and CRecordset. In one aspect, a CDatabase object is constructed and a valid connection is established at startup. Then a CRecordset object is created to operate on the connected data source and retrieve the required data.

In step S903, a user is allowed to view items on a display device in PowerUser Interface 106. The number of displayed items depends on user permissions. The user is allowed to view only those display items that are linked to permitted tables.

In step 904 a report layout is selected and saved. The permitted items can be viewed and the options for selecting report output include printable reports, screen layouts including real time display. Static reports may also be viewed in step 904A after gaining access to the central database 204.

FIG. 9C, shows a tree structure 900 that provides a list of viewable components. The components include, printable reports, real time display items sorted by data sources, critical indicators, and screen layouts.

User permissions allow a user to view information from a sub-section of any data-source. These permissions also restrict a user's ability to drill-down (view more details) or drill-up (view less of details).

Figure 9D:
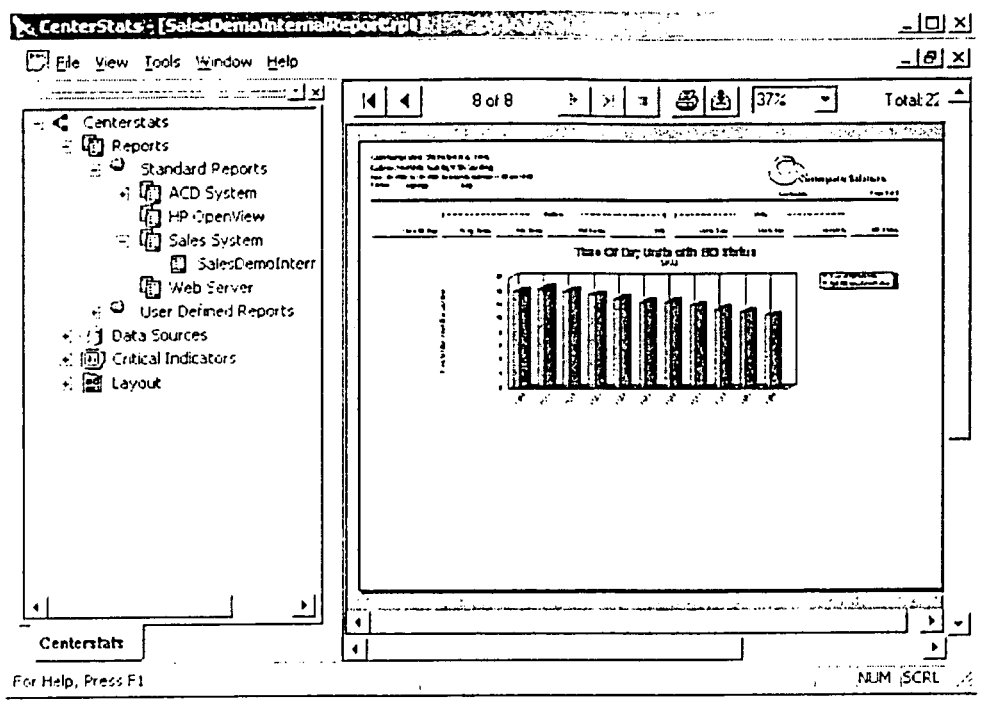

Printable static reports may be displayed on PowerUser Interface 106. Reports may be created and displayed using proprietary formats, e.g., the Seagate Crystal® component, which allows users to drill down and view details. PowerUse Interface 106 allows for saving a copy of the report in a variety of formats. FIG. 9D is an example of such a format.

Figure 9E:
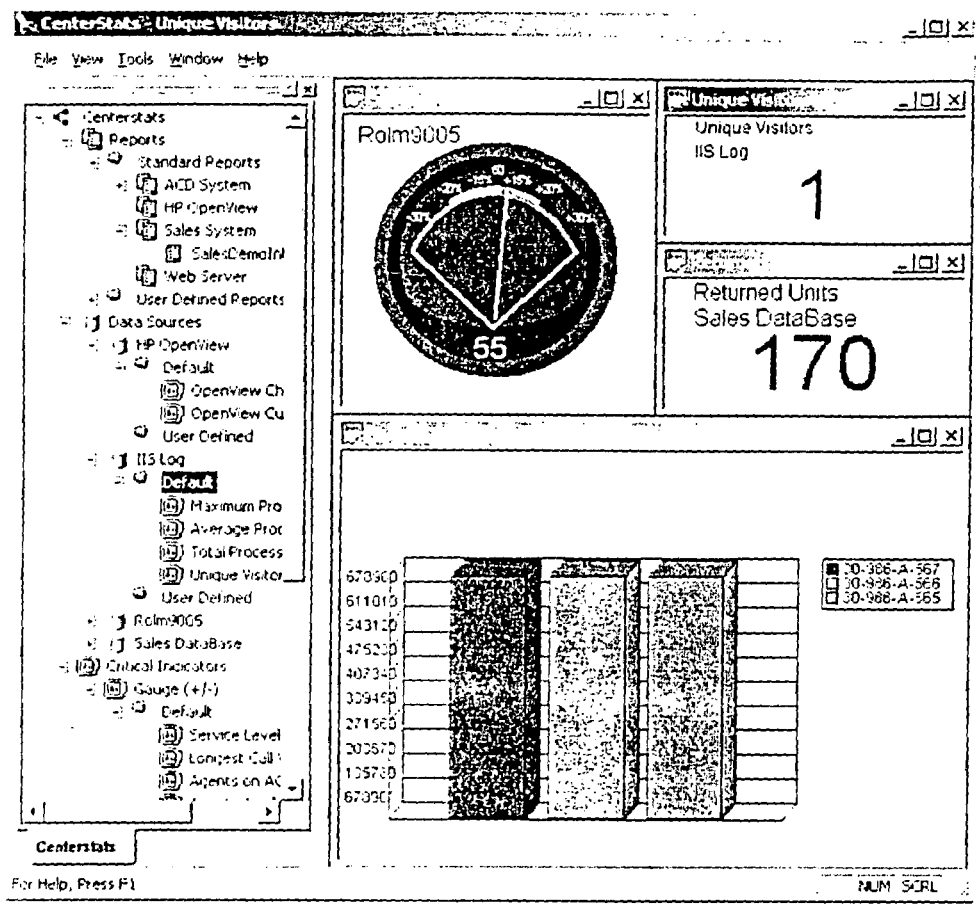

A user can select any display item from tree structure 900 and the corresponding data item will be displayed as a floating window. The display item and the corresponding gauge type may be predefined. New display items can be created and & saved (See FIG. 9E).

Figure 9F:
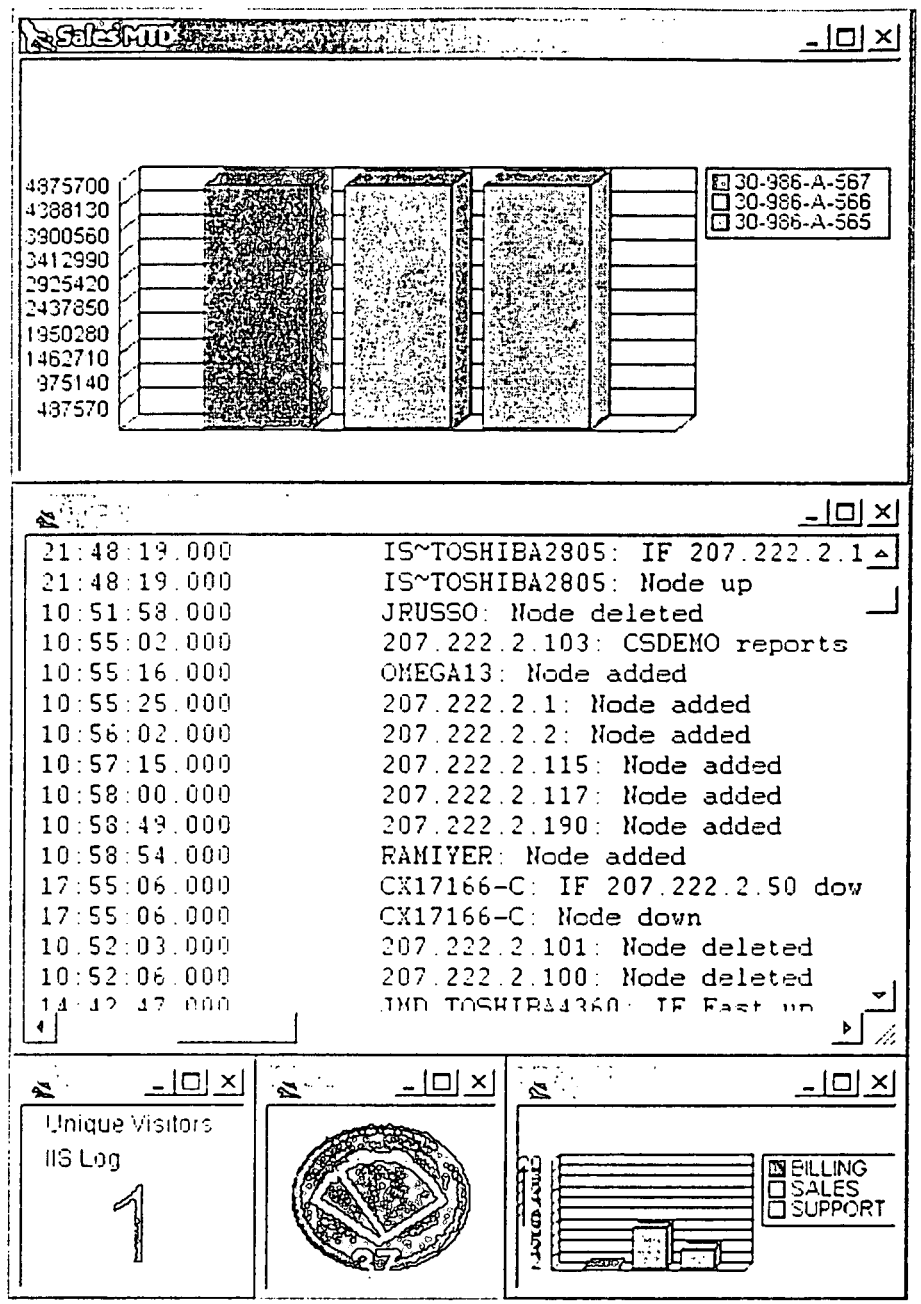

Screen Layouts can be stored and users can define new Layouts. For example, each layout may be a representation of a business profile. A user can define custom display items and thresholds for those display items. FIG. 9F is an example of a user defined custom layout.

PowerUser Interface Application 106B:

GUI Widgets:

As discussed above, PowerUser Interface 106 supports plural widget types. For example, gauges, graphs, billboards and charts. These widgets are defined by clases, for example, "CSpeedo, CGraph, CBillBoard and CChart" respectively. All the classes are derived from a base class, CGUIWidget. The main functionality of the CGUIWidget class is to provide a base set of functionality for each available (or future) display widget. The base functionality includes such things as requesting data, updating data on the display item, evaluating thresholds, and display related functionality. The main functionality of each of the display item specific classes is to create and display the widgets.

Thresholds and Schemas:

PowerUser Interface application 106B can analyze thresholds on retrieved data before it is displayed by widgets. Thresholds specify a criterion for a widget. The sensitivity of threshold violations is increased by sequences and comparisons. Each sequence can be associated with one or more set of comparisons, between a field and a value. Instead of specifying that a threshold has reached an optimal value, a user can specify whether it is lower than a minimum value, higher than a maximum value or falls within a range.

Sequences are evaluated in order. Sequence 'one' is considered to be most restrictive by PowerUser Interface application 106B. Each sequence is associated with a schema that takes effect when that threshold is violated. The schema can be composed of actions and properties, such as change background color or sending email. The threshold violations are then displayed as change of colors on the screen. The colors displayed are defined using schemas and hence can differ from one GUI widget to another.

Drill Down Capability:

PowerUser Interface application 106B allows a user to view details of a widget by selecting one of the displayed widgets. This provides a menu listing different levels of details that may be available for viewing depending on a defined data source. For example a user can drill down from the corporate level to an individual agent. The values displayed by the selected widget will also change accordingly, to reflect the result.

Proprietary Reports:

PowerUser Interface application 106B, displays historic data in proprietary report formats. A set of predefined report formats are installed on a client's computer by an installation process. PowerUser Interface application 106B searches the system disk based on the report path entered by the user and loads the report formats and displays them in the same hierarchy level as installed in the disk. Selecting a specific report format will retrieve the defined parameters in it, from the database and prompts the user for their values. Then based on the user input, it the retrieves the actual data to display the report.

When application 106B starts, lists of widget instances categorized under widgets and data sources are loaded from database 204. These lists are used to populate the widget instances in a tree structure 900 under the parent items "Data Sources" and "Critical Indicators". Similarly the layouts are also retrieved from database 204, stored locally. The report formats are loaded from the system disk (e.g. disk 15) and the tree is populated in the same hierarchy level as installed in the disk. Application 106B also launches the data collection thread in the background, which when notified retrieves updated property values of the active widget instances from database 204. The widget instances are then redrawn to reflect the changes.

Figure 8Q:
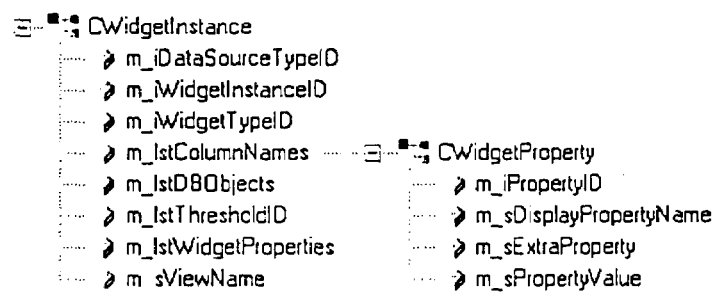
FIG. 8Q shows an example of an object to display a widget, according to one aspect of the present invention.

Creating Widgets:

Shown below are the steps in creating a widget and the relevant objects used to hold widget properties and data:

Step 1:CHierarchyTree::DisplayWidgetWindow (long nWidgetInstanceID) function is called when a widget instance is selected from tree 900, passing its unique ID. This function retrieves the widget name and the data source type via a call of the stored procedure spGetAllWidgetInstances. Then a CWidgetInstance object is created and the above values are used to get the specific properties required to display the widget, as shown in FIG. 8Q.

Step 2: Using the stored procedure call of spGetWidgetInstanceProperties passing in ID_Type as 0, InstanceID, ResultsetOption as step 4, as seen in the example below, CWidgetInstance::m_1stColumnNames is populated with CWidgetProperty objects, each representing a row in the result set.

Step 3: CHierarchyTree creates a CPowerUserDoc object and passes in a reference to the CWidgetInstance object updated in step 2. CPowerUserDoc::m_1stColumnNames is set a reference to the updated property list, CWidgetInstance::m_1stColumnNames.

Step 4: The application's document, CPowerUserDoc::Initialize( ) function creates a CTableAccessAuthoritiesObject object. Necessary attributes of this object are set. Also CTableAccessAuthoritiesObject::m_1stColumnNames is set to reference a CPowerUserDoc::m_1stColumnNames.

Step 5: Using the CTableAccessAuthoritiesObject object created in step 4, a CDatabaseRequest object is created by a call to the function CPowerUser::AddDatabaseRequest( ) and added to the list maintained by the application. The CDatabaseRequest::m_1stColumnNames is set to CTableAccessAuthoritiesObject::m_1stColumnNames. The CPowerUserDoc::m_pDatabaseRequest member is set reference to this newly created CDatabaseRequest object.

Step 6: The threshold and schema properties of the widget instance, if existing, are then updated by calling the functions CPowerUserDoc::GetThreshold( ) and CPowerUserDoc::GetSchema( ).

Step 7: The CDatabaseRequest object is used to construct a query. This query is executed every n seconds, where n is the refresh rate chosen by the user. The result set that is returned by the query is placed into a new CReturnedList object. The CReturnedList::m_1stColumnValues member is populated with the new CReturnedValues objects. If the column represents an aggregate type, the m_sColumnName is populated with the column name from the result set, which is the display column name, not the actual column name. This is due to using the display column name for the "AS" value in the query.

Step 8: Next the application's view, CPowerUserView::Initialize( ) function is called, passing the Widget type ID and the list of all properties (m_1stColumnNames) specific to the widget instance. Depending on the widget type ID, the specific GUI (graphical user interface) Widget is created and it's Initialize( ) function called, passing in all its properties.

Step 9: The Initialize( ) function of the individual GUI Widgets updates all the property variables from the list of properties passed. Then the drawing function of the GUI Widgets is called to display it on the screen according to the specified properties.

Step 10: For an active GUI widget, the data collection thread running in the background is signaled. This process calls the handler function CMainFrame::DataRefreshed( ), which iterates through each of the open document and calls the function CPowerUserDoc::AcceptData( ) for each of them.

Step 11: CPowerUserDoc::AcceptData( ) deletes the existing list of CReturnedList object maintained for each of the open documents and recreates it from the CDatabaseRequest object associated with it. A change in the document triggers the framework to refresh its view.

Step 12: Any number of GUI widgets can be instantiated. For each active GUI widget, the property values are updated from database 204 at regular intervals depending on the refresh rate, which can be specified by the user. Adjusting the refresh rate can optimize database 204 traffic.

The widgets can be arranged in any layout on the screen and layouts can be saved with a unique name, by clicking the "Save Layout" toolbar/menu.

Clicking on a previously saved layout closes all the currently active child windows and draws the windows corresponding to the GUI Widgets saved in the layout, in their respective positions. These widgets now become the currently active ones and they are updated accordingly at the specified refresh rate. A predefined layout can be either updated or deleted.

Clicking on a Report format prompts the user for the parameter values as discussed, and depending on the user input, the actual report is generated.

Infouser Application Server 105A:

InfoUser Application server 105A is a scalable data server used by InfoUser Interface 105 to operationally couple with database 204. It may be written using Java 2.0 standards. Data information may be aggregated by Java Servlets. Industry standard XML (http/https) server may be used to conduct the InfoUser interactions. Server 105A validates, aggregates and delivers information to a browser-based user interface.

Figure 10A:
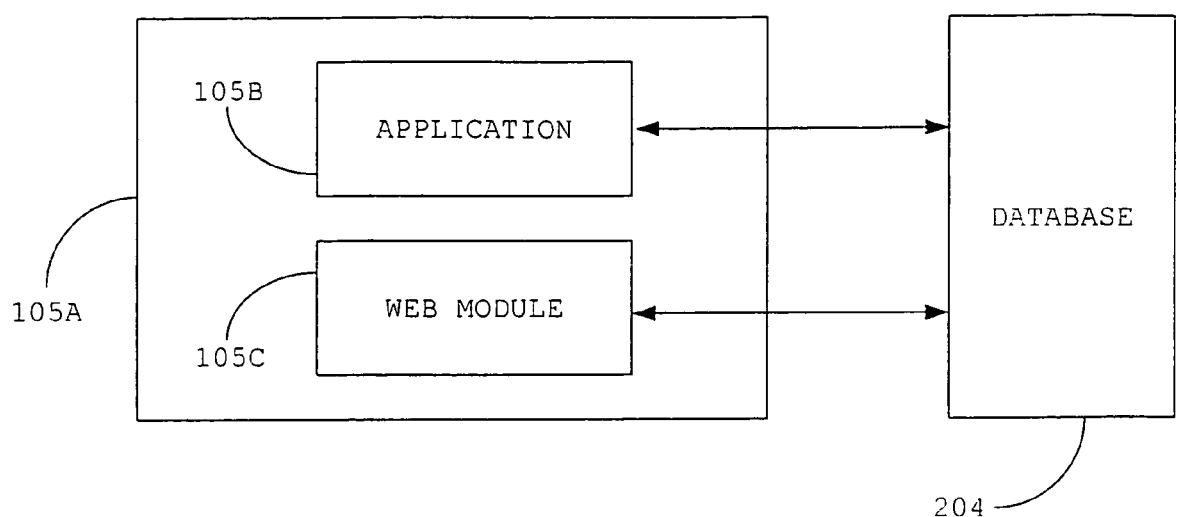
FIG. 10A is a block diagram of an InfoUser interface, according to one aspect of the present invention.

InfoUser Application server 105A consists of two parts, as shown in FIG. 10A:

1. Web module(s) 105C is used for publishing information; and

2. InfoUser application 105B used for viewing information.

InfoUser Application 105B:

An end-user client to view information on a proprietary user interface application uses InfoUser Interface 105. Application 105B is cross-platform compatible and allows users to perform the following functions:

Login to system 104;
Request user viewing rights;
Define display data and position them on a window;
Save layout(s); and
Make requests for the information Web Modules 105C:

Web modules 105C responds to requests from InfoUser application 105B, web-browsers and other devices. Depending on browser type, a suitable response is sent back. Web module 105C performs the following functions:

Allows users to login and validate them on database 204;
Generate and deliver an InfoUser Interface 105 configuration document;
Allow InfoUser's to store display profile at database 204; and
Process InfoUser queries and deliver data.

XML Protocol Fragments:

Following are some XML protocol fragments describing communication between an InfoUser Interface 105 and the web delivery system 105C.

Login Request (FIG. 10B):

```
<centerStats>
    <infoUser>
        <login>
            <userName>UserName</userName>
            <password>Password</password>
        </login>
    </infoUser>
</centerStats>
```

Login request allows users to login to a web-server and be validated. If this is a valid user for System 104, an acknowledgement is sent back to the user.

Acknowledgement may be of the form:

```
<centerStats>
  <infoUser>
    <loginAck>
      <userName>UserName</userName>
      <Status>LOGIN_OK</status>
    </loginAck>
  </infoUser>
</centerStats>
```

Once a user is acknowledged as LOGIN_OK (LOGIN_FAILED for failure), the user may make requests for layout configuration information.

```
<centerStats>
  <infoUser>
    <requestLayoutConfig/>
  </infoUser>
</centerStats>
```

Upon receiving layout configuration information, the InfoUser application 105B set's up the user interface with the items to display.

Layout configuration response may be as below:

```
<centerStats>
<infoUser>
  <refreshTimer>timerValueInSeconds</refreshTimer>
  <layoutConfig>
    <displayItem>
      <label>LabelName</label>
      <type>DisplayItemType</type>
   <position x=xpos y=ypos width=width height=height isTitle=true/>
      <query>Query Statement</query>
      <threshold>
   <Range id=1 low=lowLimit high=highLimit color=rangeColor/>
       <Range id=2 low=lowLimit high=highLimit color=rangeColor />
       <Range id=3 low=lowLimit high=highLimit color=rangeColor />
       <Range id=4 low=lowLimit high=highLimit color=rangeColor />
       <Range id=5 low=lowLimit high=highLimit color=rangeColor /></threshold>
    </displayItem>
    <displayItem>
    </displayItem>
  </layoutConfig>
</infoUser>
</centerStats>
```

Based on a timer value an InfoUser requests for new data. This request may be made as:

```
<centerStats>
  <infoUser>
    <requestData>
      <requestDataValue \>
    </requestData>
  </infoUser>
</centerStats>
```

And the corresponding reply is of the form:

```
<centerStats>
  <infoUser>
    <requestData>
      <displayItem>
        <label>LabelName</label>
        <value>dataValue</value>
      </displayItem>
      <displayItem>
        . . .
      </displayItem>
    </requestData>
  </infoUser>
</centerStats>
```

Once the InfoUser application 105B gets the response, it updates the displays to reflect the new values. The display items also perform threshold analysis to show appropriate colors in display device.

InfoUser maintains an internal timer to make repeating queries.

In addition InfoUser is able to create display items and save the layouts.

The following fragments show those interactions.

Request User Rights:

```
<centerStats>
  <infoUser>
    <requestUserRights/>
  </infoUser>
</centerStats>
```

Response to User Rights:

```
<CenterStats>
<infoUser>
  <userRights>
    <source>
      <sourceName>SourceName</sourceName>
      <table>
        <tableName>TableName</tableName>
        <keyColumn>KeyColumn</keyColumn>
        <keyValue>KeyValue</KeyValue>
        <column>ColumnName</column>
      </table>
    </source>
    <source>
    . . .
    . . .
    . . .
    </source>
  </userRights>
</infoUser>
</CenterStats>
```

Layout Definition:

```
<centerStats>
<infoUser>
  <refreshTimer>timerValueInSeconds</refreshTimer>
  <layoutConfig>
    <displayItem>
      <label>LabelName</label>
      <type>DisplayItemType</type>
```

-continued

```
            <position x=xpos y=ypos width=width height=height
isTitle=true/>
            <query>Query Statement</query>
            <threshold>
                    <Range  id=1   low=lowLimit   high=highLimit
color=rangeColor />
                    <Range  id=2   low=lowLimit   high=highLimit
color=rangeColor />
                    <Range  id=3   low=lowLimit   high=highLimit
color=rangeColor />
                    <Range  id=4   low=lowLimit   high=highLimit
color=rangeColor />
                    <Range  id=5   low=lowLimit   high=highLimit
color=rangeColor />
            </threshold>
        </displayItem>
        <displayItem>
            . . .
            . . .
            . . .
        </displayItem>
    </layoutConfig>
  </infoUser>
</centerStats>
```

XML DTDs:

```
            <?xml version="1.0"?>
<!DOCTYPE CenterStats [
    <!ELEMENT infoUser (login, loginAck, requestLayoutConfig,
layoutConfig, requestData, requestUserRights, userRights)>
    <!ELEMENT login (userName, password)>
    <!ELEMENT userName (#CDATA)>
    <!ELEMENT password (#CDATA)>
    <!ELEMENT loginAck (userName, status)>
    <!ELEMENT userName (#CDATA)>
    <!ELEMENT status (LOGIN_OK | LOGIN_FAILED)>
    <!ELEMENT requestLayoutConfig (EMPTY)>
    <!ELEMENT layoutConfig (refreshTimer, displayItem+)>
    <!ELEMENT refreshTimer (#CDATA)>
    <!ELEMENT displayItem (label, type, position, threshold)>
    <!ELEMENT label (#CDATA)>
    <!ELEMENT type (#CDATA)>
    <!ELEMENT position EMPTY>
    <!ATTLIST position x CDATA "0">
    <!ATTLIST position y CDATA "0">
    <!ATTLIST position width CDATA "0">
    <!ATTLIST position height CDATA "0">
    <!ATTLIST position isTitle (0 | 1) "1">
    <!ELEMENT threshold (range+)>
    <!ELEMENT range EMPTY>
    <!ATTLIST range id (1 | 2 | 3 | 4 | 5) "1">
    <!ATTLIST range low CDATA "0">
    <!ATTLIST range high CDATA "0">
    <<ATTLIST range color CDATA "Default">
    <!ELEMENT requestData (displayItem+)>
    <!ELEMENT displayItem (label, query, value)>
    <!ELEMENT label #CDATA>
    <!ELEMENT query #CDATA>
    <!ELEMENT value #CDATA>
    <!ELEMENT requestUserRights EMPTY>
    <!ELEMENT userRights (source+)>
    <!ELEMENT source (sourceName, table+)>
    <!ELEMENT sourceName #CDATA>
    <!ELEMENT table (tableName, keyColumn, keyValue*,
columnName+)>
    <!ELEMENT tableName #CDATA>
    <!ELEMENT keyColumn #CDATA>
    <!ELEMENT keyValue #CDATA>
    <!ELEMENT columnName #CDATA>
]>
```

InfoUser Interface 105:

InfoUser Interface 105 is a web-based interface that presents analytical data to a user through graphical real-time displays. The delivery of information is not limited to only desktops but any web enabled PDA or phone may receive the information delivered through InfoUser Interface 105.

InfoUser Interface 105 may use:

HTML—for formatting and displaying purposes;

JavaScript—to update the SVG and manipulate the user interface; and SVG.

Figure 10B:
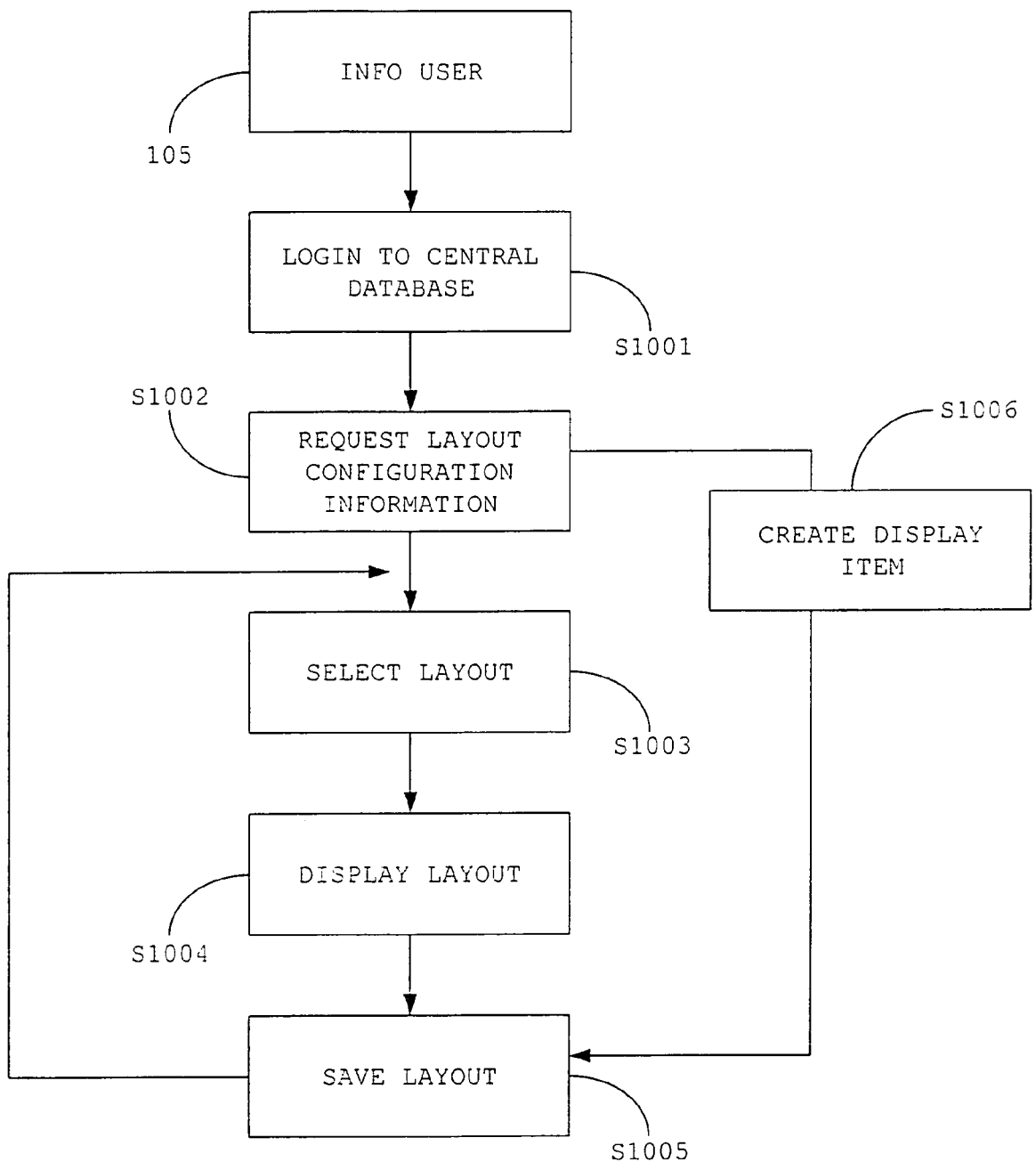
FIG. 10B–10C show process flow diagrams allowing InfoUser access, according to one aspect of the present invention.

FIG. 10B is a block diagram showing various steps for retrieving information by an InfoUser from the central database 204.

In step S1001 an InfoUser logins to the central database 204.

In step S1002 the request for layout configuration information is made which if permitted leads to selection of the layout in step S1003. In step S1004 the layout selected is displayed and in step S1005 the layout displayed is saved. The InfoUser can also create a display instead of requesting the available layouts. This is shown in step S1006.

Figure 10C:
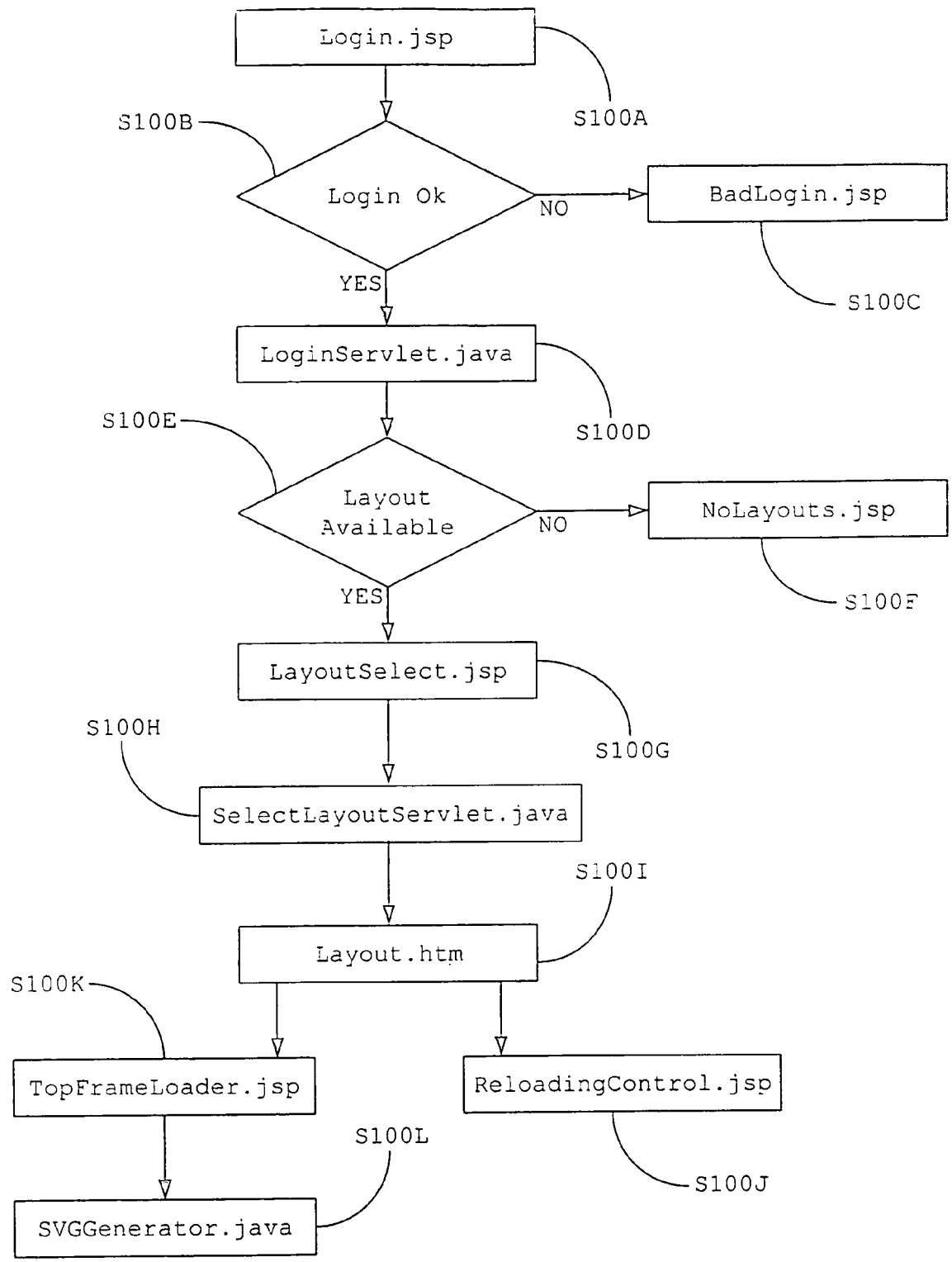

FIG. 10C illustrates various commands to execute the FIG. 10B process steps. FIG. 10C flow diagram is explained below with respect to InfoUser Interface 105 and the following components:

1. Login.jsp
2. TopFrameLoader.jsp
3. ReloadingControl.jsp
4. BadLogin.jsp
5. ErrorPage.jsp
6. LayoutSelect.jsp
7. NoLayout.jsp
8. SVGGenerator.java 1) Login.jsp (S100A)

Login.jsp is the login screen that accepts a user id, password for user authentication. The login and password are passed over to LoginServlet.java (S100D) that does the actual authentication. If authentication fails then badlogin.jsp (S100C) is called to display an error message.

2) TopFrameLoader.jsp (S100K)

TopPageLoader initializes all the widgets and loads the page corresponding to a given layout identification, as described below:

(a) S100K reads a configuration file and checks the parameter 'save'. If save is set to auto then the save button is not displayed or else the save button is displayed.

(b) It first retrieves a session object. If the session object or UserBean object is null then it asks the user to login again.

(c) It fetches the layout ID and uses it to get the list of widgets being used by the layout using widgetsLoader.java.

(d) It builds a SQL query for updating widget values using SQLBuilder.java and stores the query in a session. The queries are stored in a session so that database 204 is not invoked to fetch the properties of the widgets every time there is an update.

(e) Builds the rest of the page using SVGGenerator.java (S100L).

(f) Stores widgets in the session so that they can be used during the updates.

(g) Uses a JavaScript function reloadData( ) to reload the bottom frames and update them at regular intervals. This function reloads ReloadingControl.jsp S100J.

3) ReloadingControl.jsp (S100J)

The "ReloadingControl" is called whenever the values in SVG objects in the top frame have to be updated. It builds the bottom frame dynamically with new values for the widgets in the layout. The JavaScript function updates the contents of the top frame. The page uses UpdatesHandler.java to communicate with database 204 and fetch the updated values of the widgets.

4) BadLogin.jsp (S100C)

This file tells the user that the login was invalid and prompts to try again.

5) ErrorPage.jsp

The ErrorPage is used to catch all errors that occur during processing of jsp files.

6) LayoutSelect.jsp (S100H)

The LayoutSelect calls the SelectLayoutServlet.jsp once the user selects a layout. Depending on what the user selects from the list of layouts the SelectLayoutServlet builds the layout.htm, which uses the TopFrameLoader.jsp S100K to display its top Frame and ReloadingControl.jsp to display the bottom frame.

7) NoLayout.jsp

Tells the user that there are no layouts available.

8) SVGGenerator.java (S100L)

This class extends the HTTPServlet and takes the WidgetInfo bean from the session and creates the proper SVG widget. Each public member function corresponds to a widget type. They are called by the doGet( ) function according to the WidgetID requested. It's more of a collection of methods for generating a SVG than an object.

The types of widgets that can be generated with the SVGGenerator include:

270° Angular gauge

XY Graph

Bill Board (plain text label and number)

Chart (yellow notepad)

D Graph

Thermometer

Figure 11A:
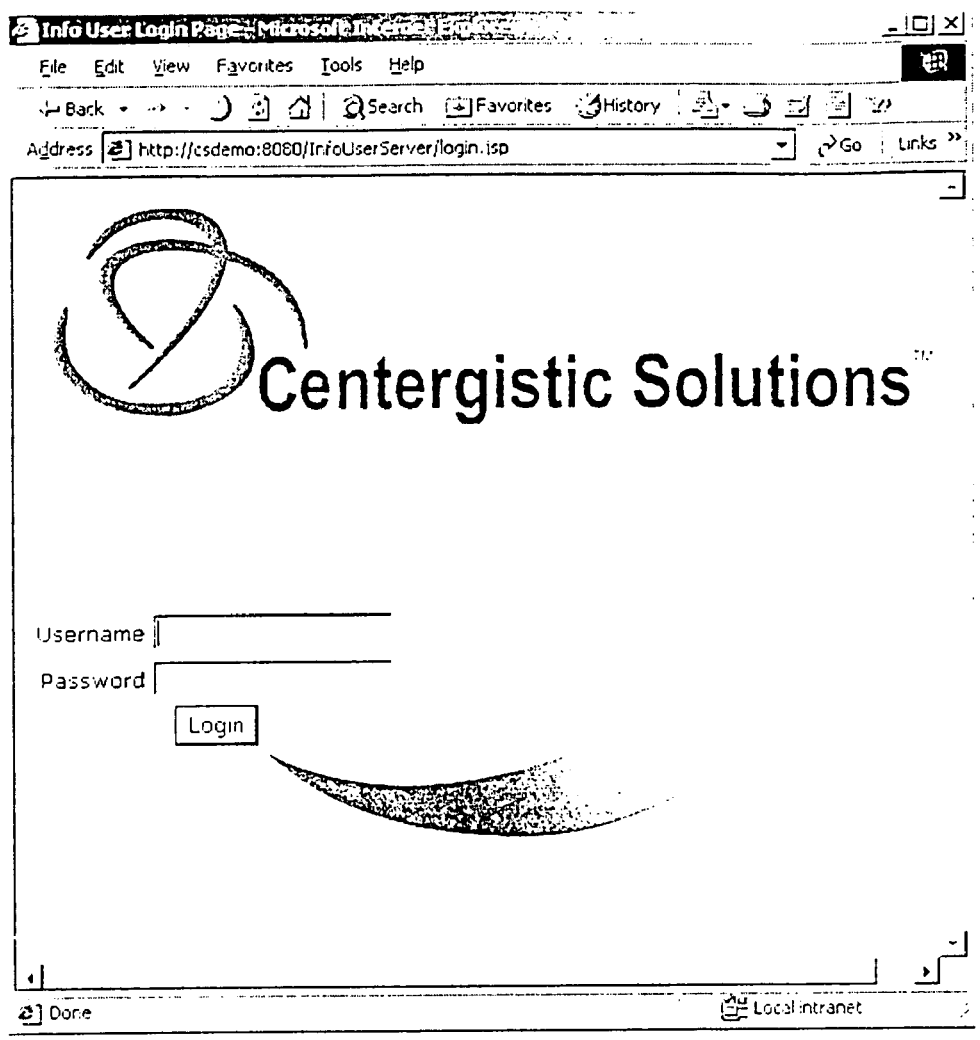
FIGS. 11A–11C provides an example of an InfoUser access, according to one aspect of the present invention.
Figure 11B:
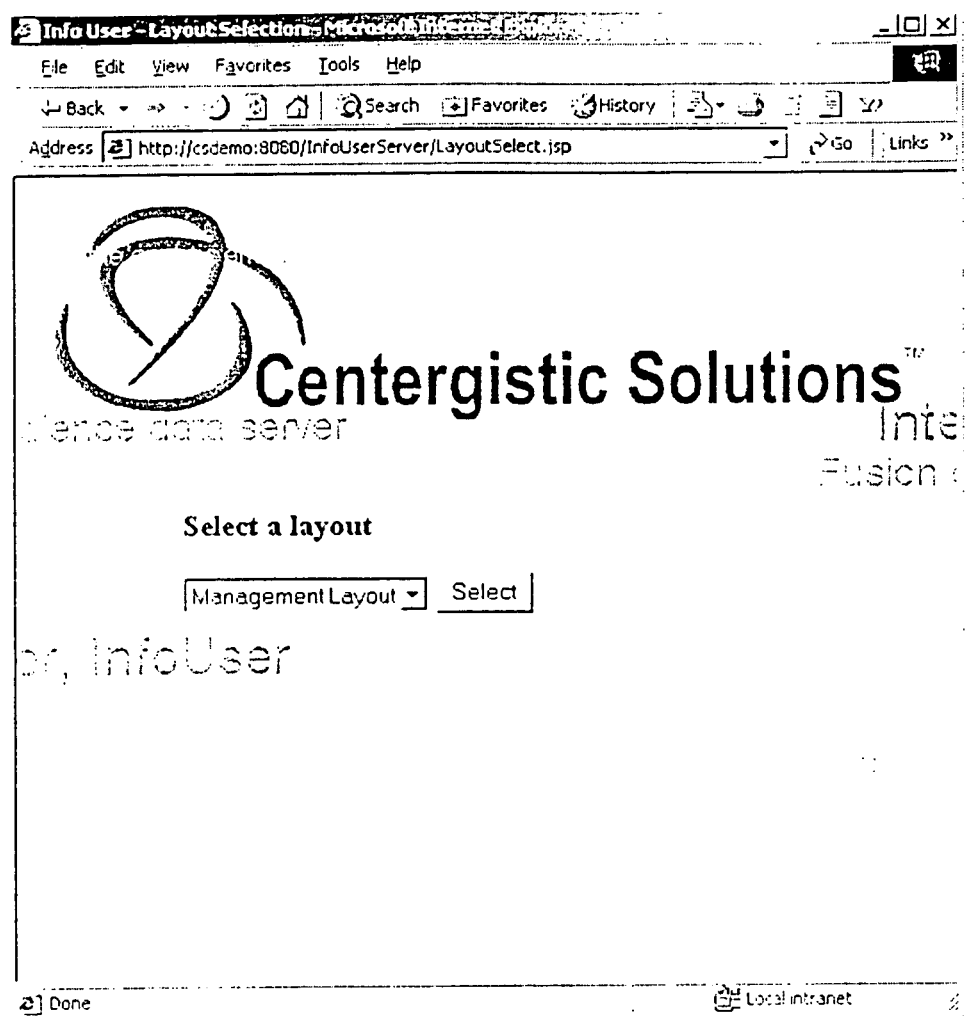
Figure 11C:
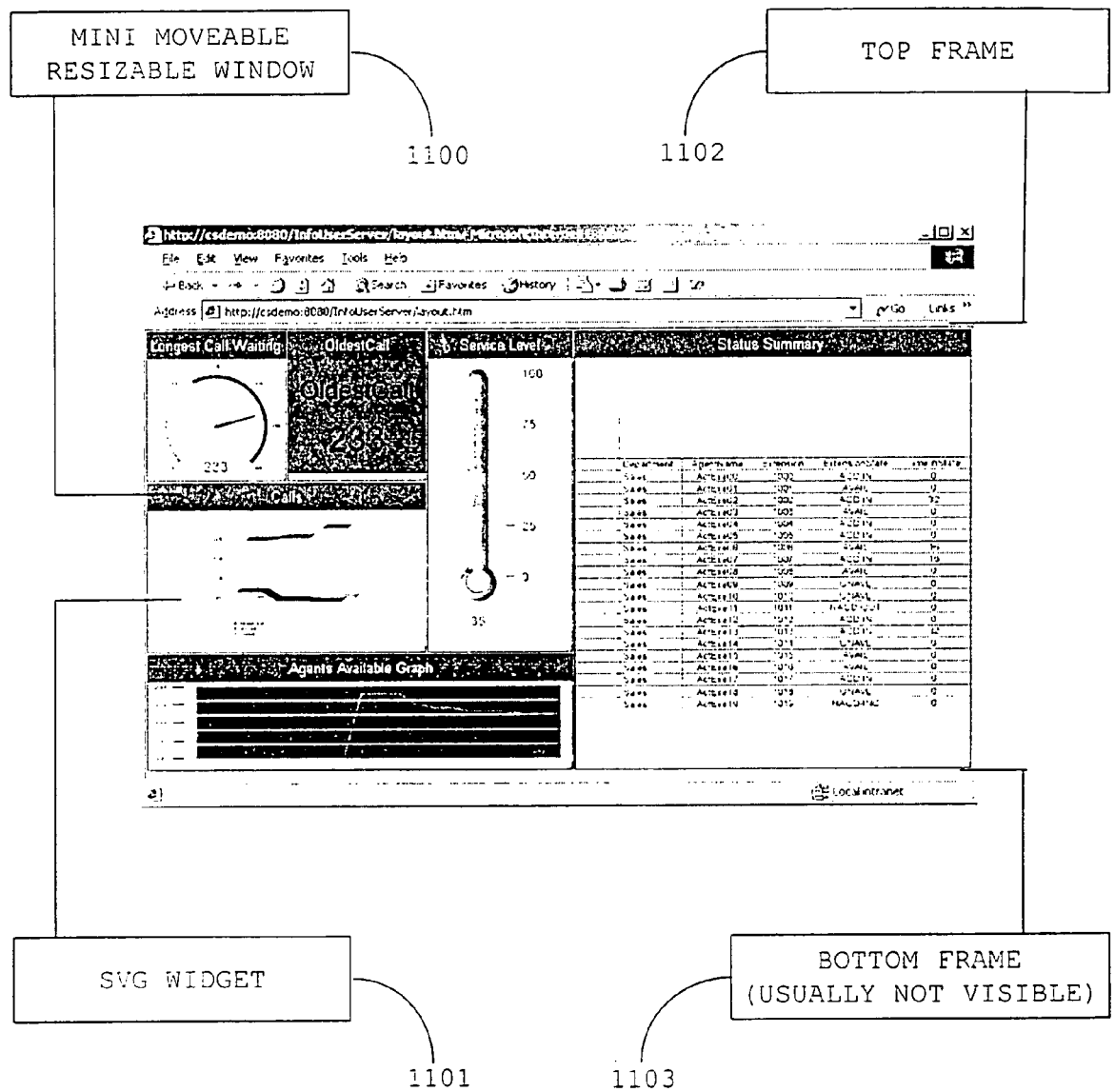

FIGS. 11A–11C shows an example of using InfoUser Interface 105, according to one aspect of the present invention, as discussed above.

Login page (FIG. 11A):

Users start at this page typing in user name and password, and if the username and password is valid then the user proceeds to the layout selection page, otherwise the user is denied entry.

Layout Selection (FIG. 11B):

This page consists of a simple pull down menu to allow a user to pick available layouts, for example, the "Management Layout" of FIG. 11B.

Layout Page (FIG. 11C):

This is the final page of InfoUser interface 105. The graphics on this page use SVG format wrapped in a moveable resizable mini window 1100 handled by JavaScript code. The bottom frame 1103 is used to refresh at a steady interval to provide new updating data InfoUser Interface 105 package includes a Web browser viewer (HTML including Java Applet) (thin clients), Wireless browser viewer 211 (WAP), Interactive Telephone Response System 210 (VoiceXML) and stand-alone application viewer (thick client), The stand-alone application viewer may be written in Java 2.0 and Java Swing. Other interfaces use XSL, WSL and VoiceXSL style sheets.

Scalable Vector Graphics (SVG) output—SVG output produces quality graphic output on a variety of SVG viewers.

HTML View—Pure HTML output is available for viewing on a Web Browser.

WML View—WML 3.0 output is available for viewing on a phone (mobile) browser.

Windows viewer—a standalone viewer lets users view their layouts on windows native application viewer. This technology uses "COM" Objects to connect to backend system.

Native Java viewer—A standalone Java viewer

Integrated InfoUser Viewer—Combines the outputs of SVG, HTML and Web Reports under a single login. Users have the option of viewing either the SVG output or the HTML output (no graphics) or the static reports.

Reporting Options:

Reporting module 206 includes Web Report option 212 and Report Scheduler 213. Web reports module 212 allows users to select and view reports over the Internet. Reports can be delivered in HTML, Java applet or ActiveX formats. Report Scheduler 213 may be built using Visual C++ environment and allows users to email or print reports on a schedule. The distributed architecture allows easy configuration and control of the reporting option.

Web Reports:

Web Reports is a unique way to combine the convenience of Internet access with System 104. With Web Reports module 212 as a medium, reports are configured using parameters set by the user. The resulting report is then displayed using one of the plural formatting choices and can be printed or emailed.

Web reports module 212 allows users to view printable static reports in a browser. Users have a choice of various formats, including—ActiveX, Java Applet, HTML and HTML Frames.

Web reports module 212 allows users the ability to view and print reports from anywhere within their defined network. A report server delivers reports through Microsoft Internet Information Server 302 and proprietary web components.

Figure 12:
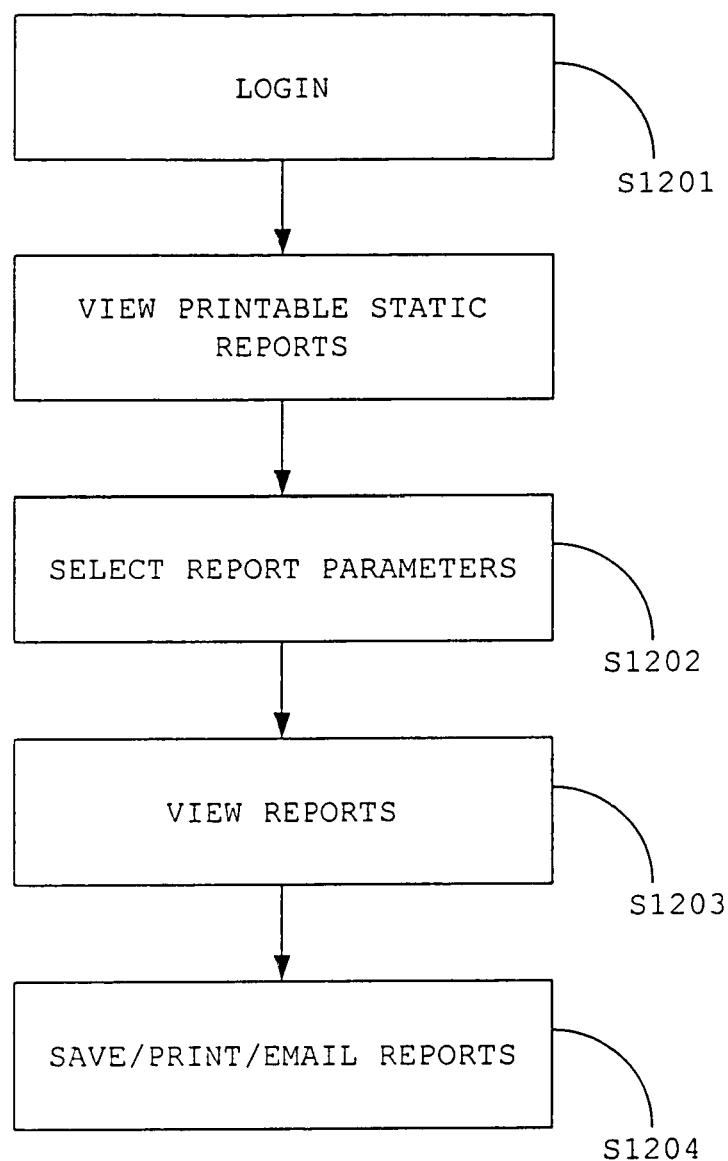
FIG. 12 shows a process flow diagram for printing reports, according to one aspect of the present invention.
Figure 13A:
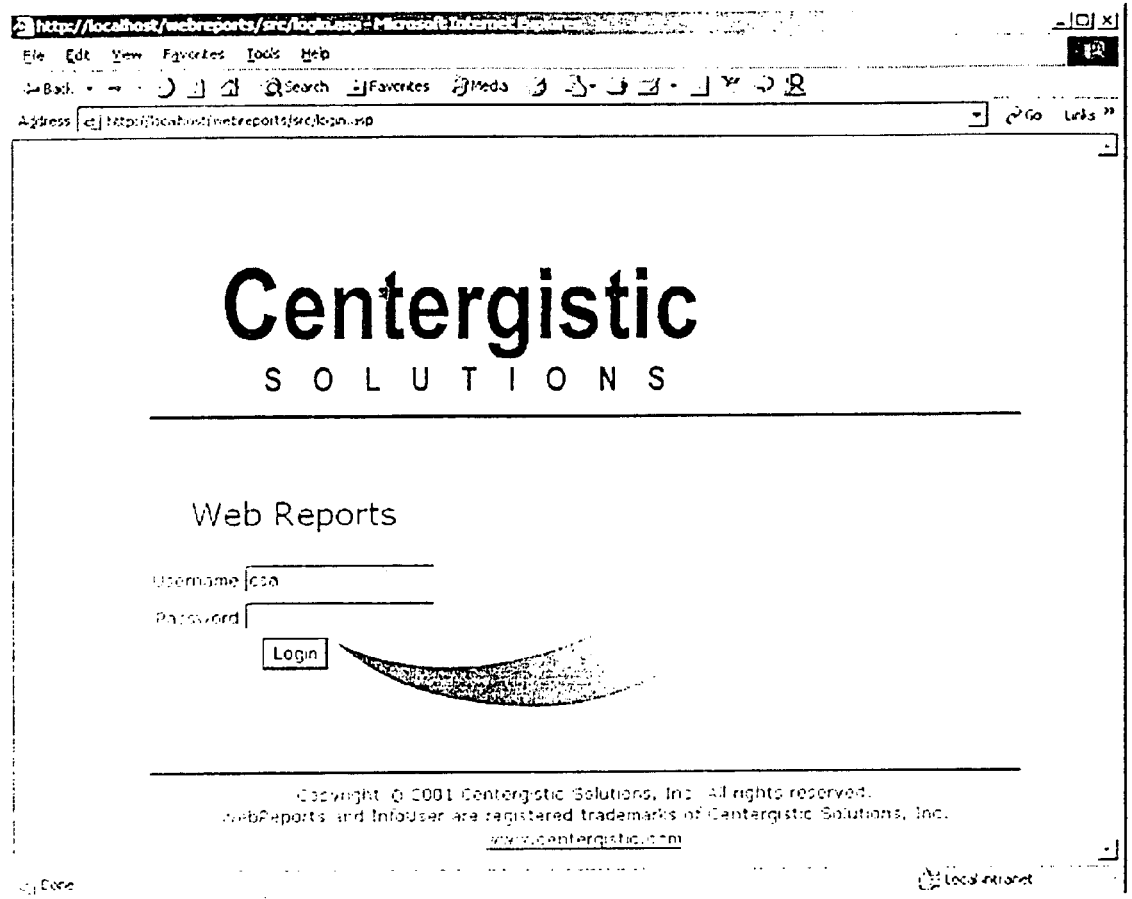
Figure 13B:
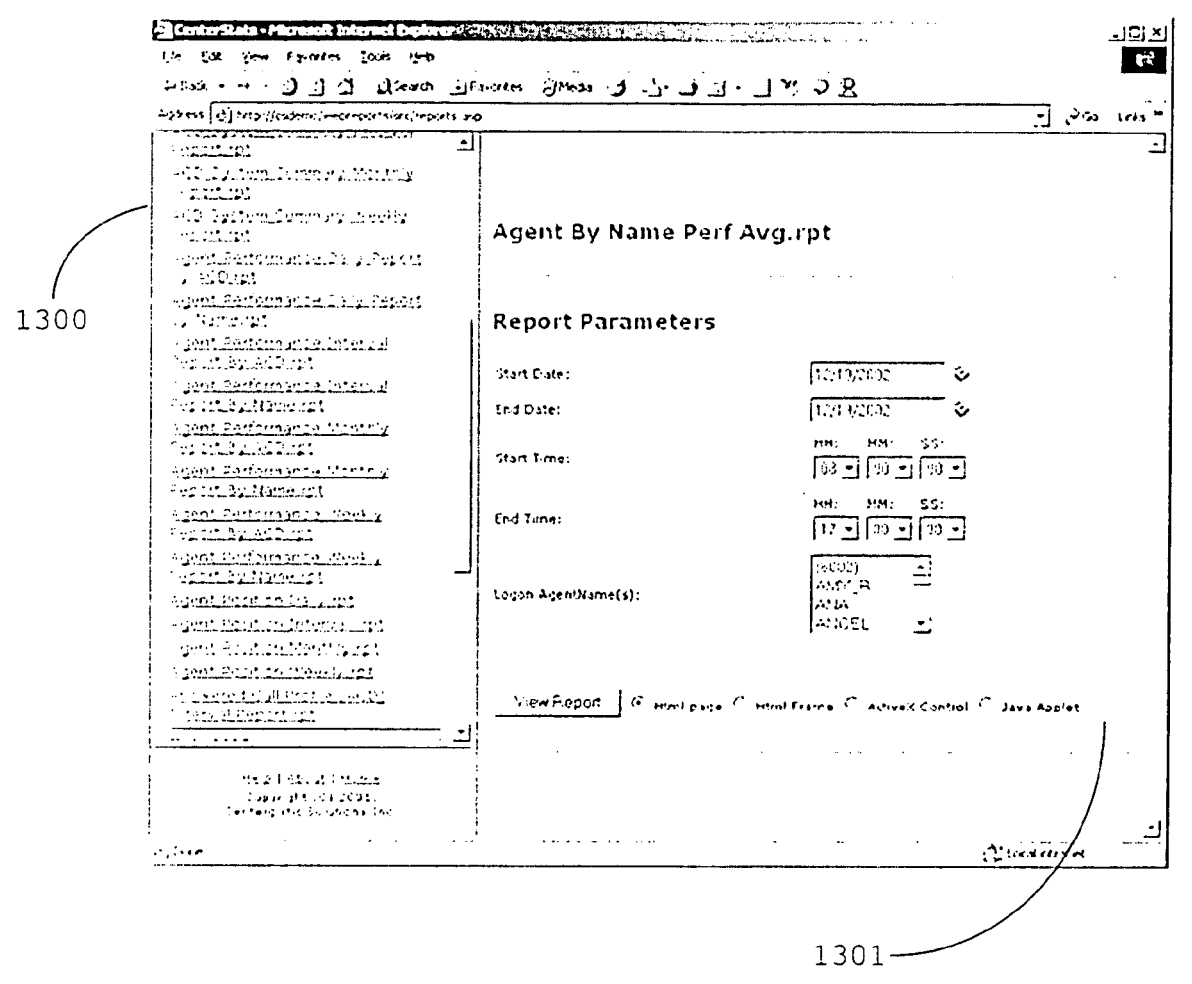

FIG. 12 shows a block diagram of executable steps for generating a Web report by an end user. In step S1201, a user (or users) login to web reports module 212 and is presented with a list of report names as shown in FIGS. 13A and 13B. Report parameters are selected in step S1202.

The generated reports are viewed in step S1203. The report is then saved, printed or emailed as per the requirements of the user in step S1204.

Figure 12A:
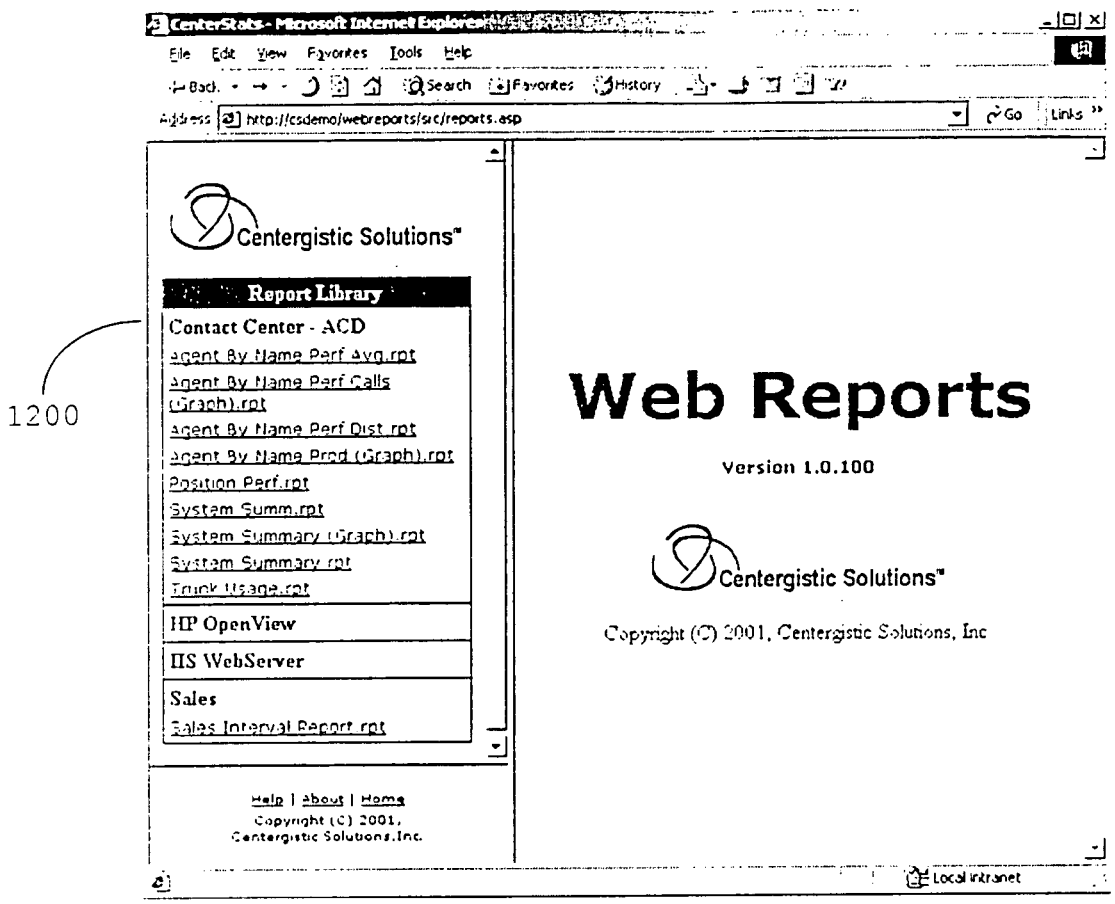
Figure 12B:
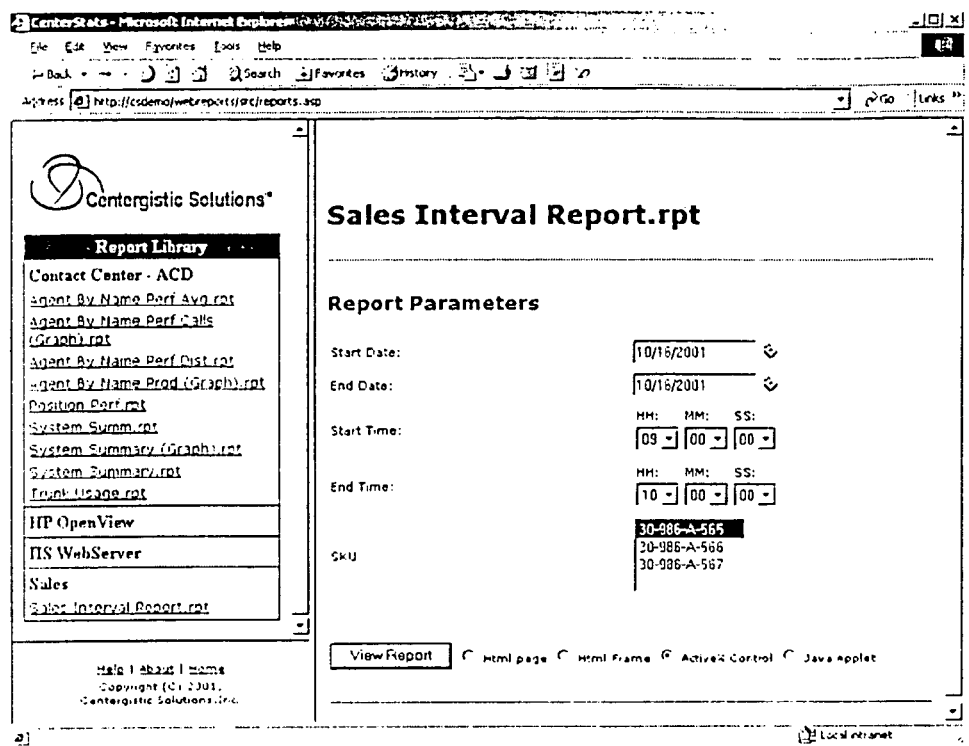
Figure 12C:
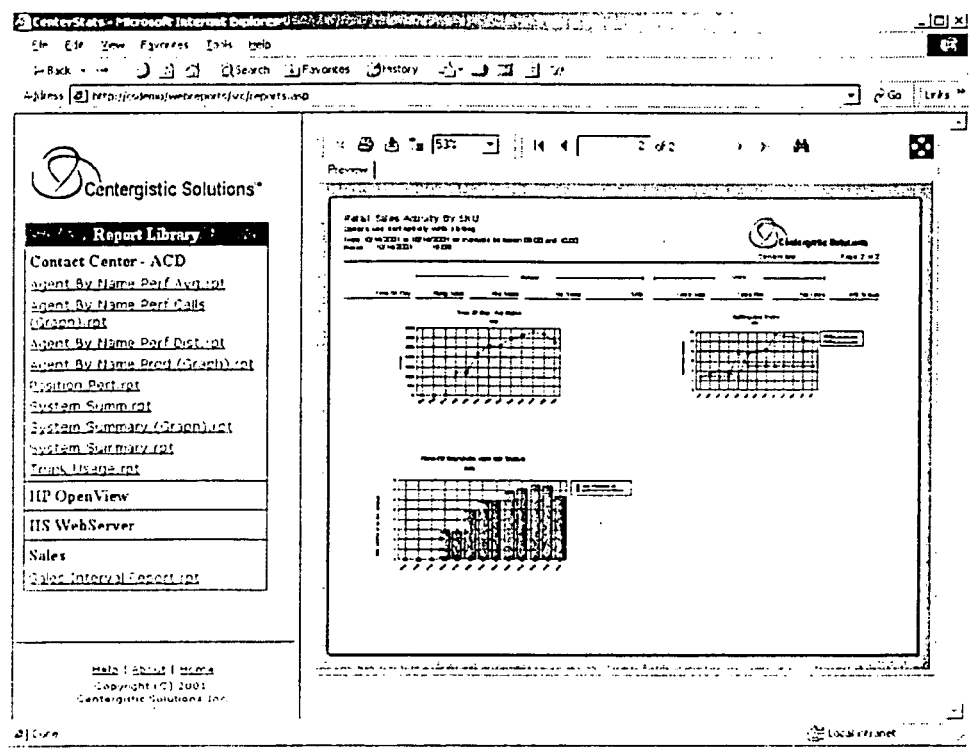
Figure 13C:
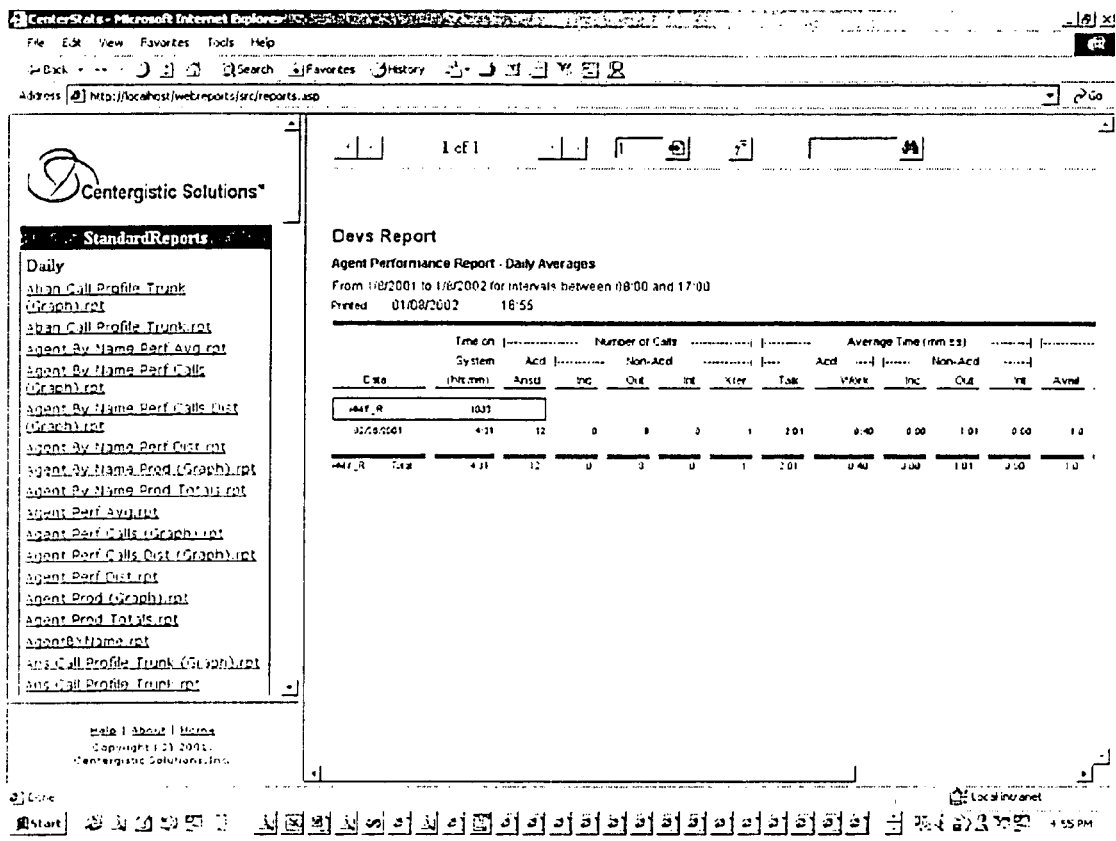

A web reports main console 1200 is shown in FIG. 12A. Users select the report to view and enter the report parameters. These parameters produce the report on a browser window in one of plural formats. It is possible for users to print and email the reports from the browser window. FIGS. 12B–12C and 13C shows other examples of web reports.

Web Reports Command: The following commands may be used to generate user defined web reports as discussed above:

Logon.asp

Reports. Asp

XMLUtil.asp

Directory. Asp

Details.xsl

Listing.xsl

UserRequestManager.asp

In one aspect of the present invention, a user logs in and then Reports.Asp builds the different frames. A left side directory frame 1300 (FIG. 13B) is built by Directory. asp which browses through a reports directory and gets the report file names and converts them into a XML format which is converted to a HTML page at the front end using listing.xsl and XMLUtil.asp. A right side frame 1301 (FIG. 13B) is dynamically built when the user selects a report hyperlink using UserRequestManager.asp,details.xsl and XMLUtil.asp. Once the user feeds all required data and clicks on submit the requestProcesser.asp processes the request and then the report is displayed using rptserver.asp Report Scheduler 213

Figure 15A:
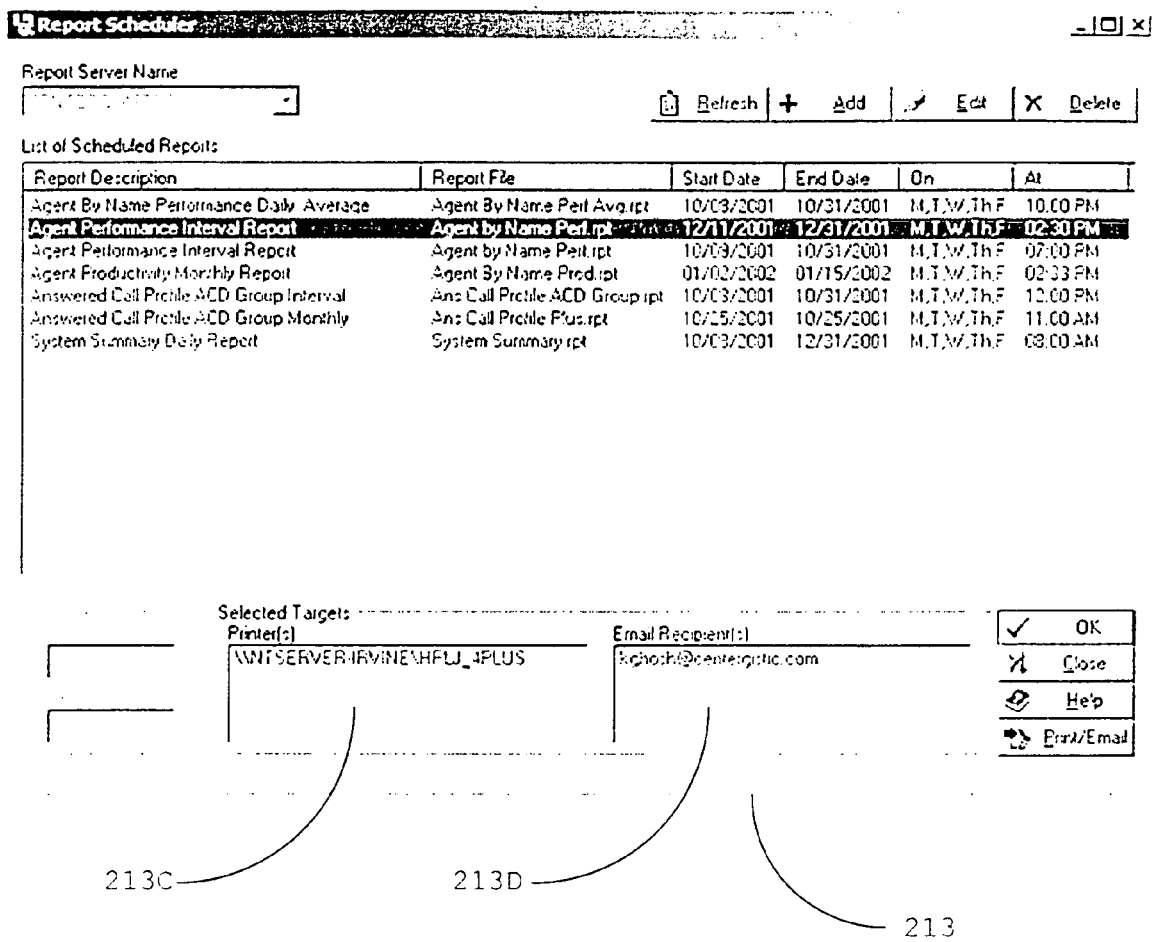
FIG. 15A is yet another example of a report scheduler, according to one aspect of the present invention.

Report Scheduler 213 is used for automated delivery of printable reports. Users can schedule reports to be delivered to printers 213C or email boxes 213D (See FIG. 15A). Administrators can schedule reports to be delivered to a printer and to a group of mail recipients.

Report Scheduler 213 is designed to define report schedules and print them on multiple printers and/or send them as an email attachment to multiple recipients. A report schedule sends reports to specified destinations from the 'Start Date' to the 'End Date' on pre-defined days and time of the week. A predefined schedule can either be edited or deleted.

Figure 14:
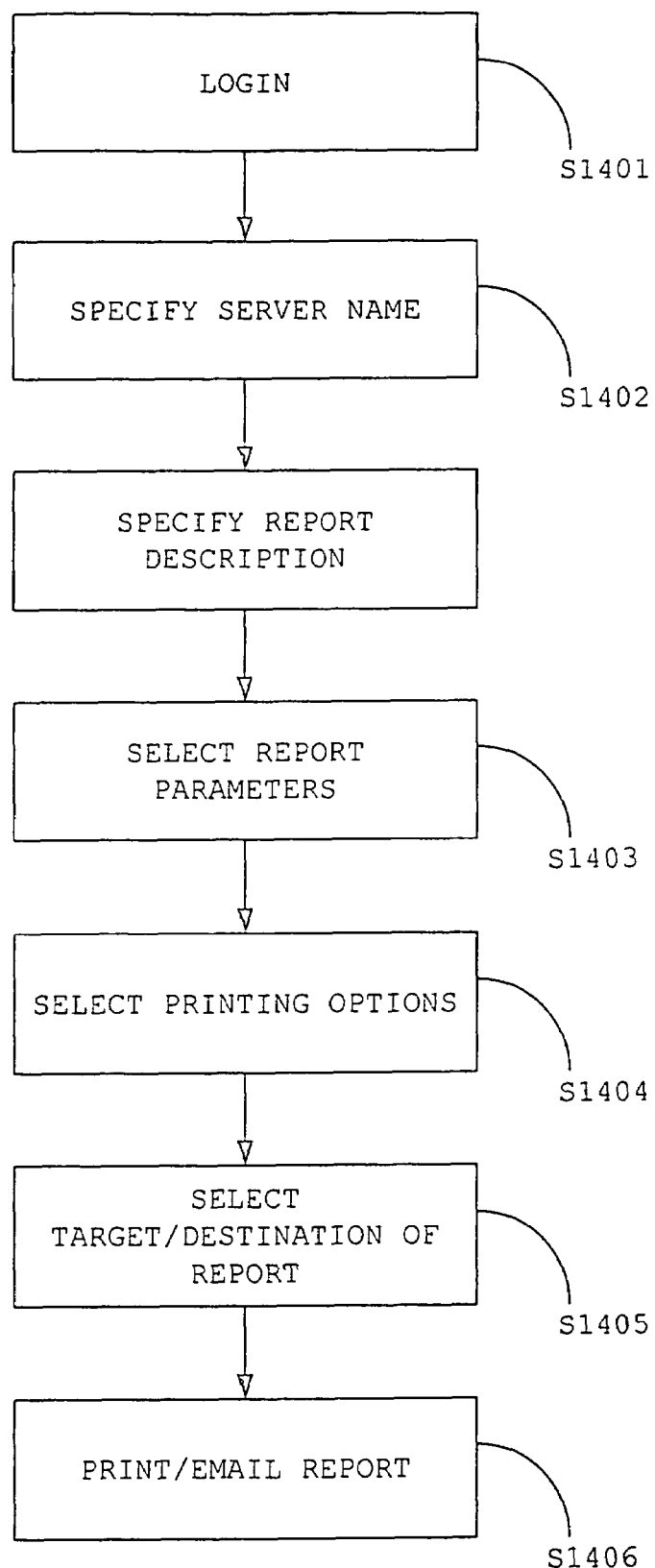
FIG. 14 is a flow diagram for setting up report options, according to one aspect of the present invention.

FIG. 14 is a block diagram showing process steps for generating a desired report by report scheduler 213, according to one aspect of the present invention.

Figure 14A:
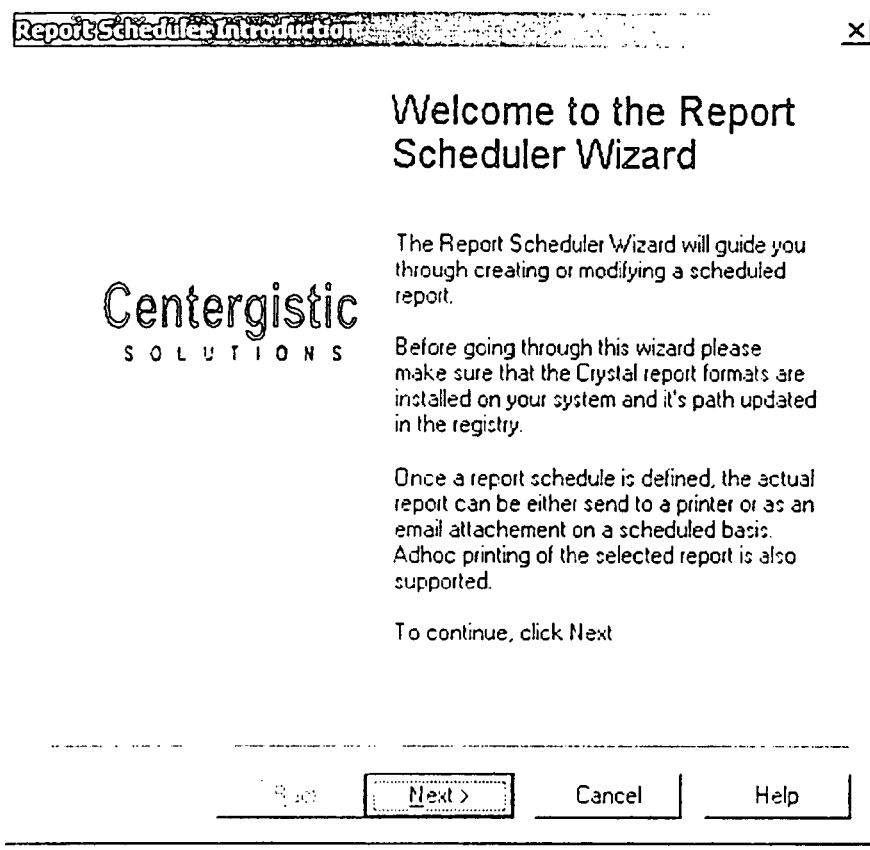

In step S1401, a user logs into system 104 after navigating through a scheduler wizard as shown in FIG. 14A.

Figure 14B:
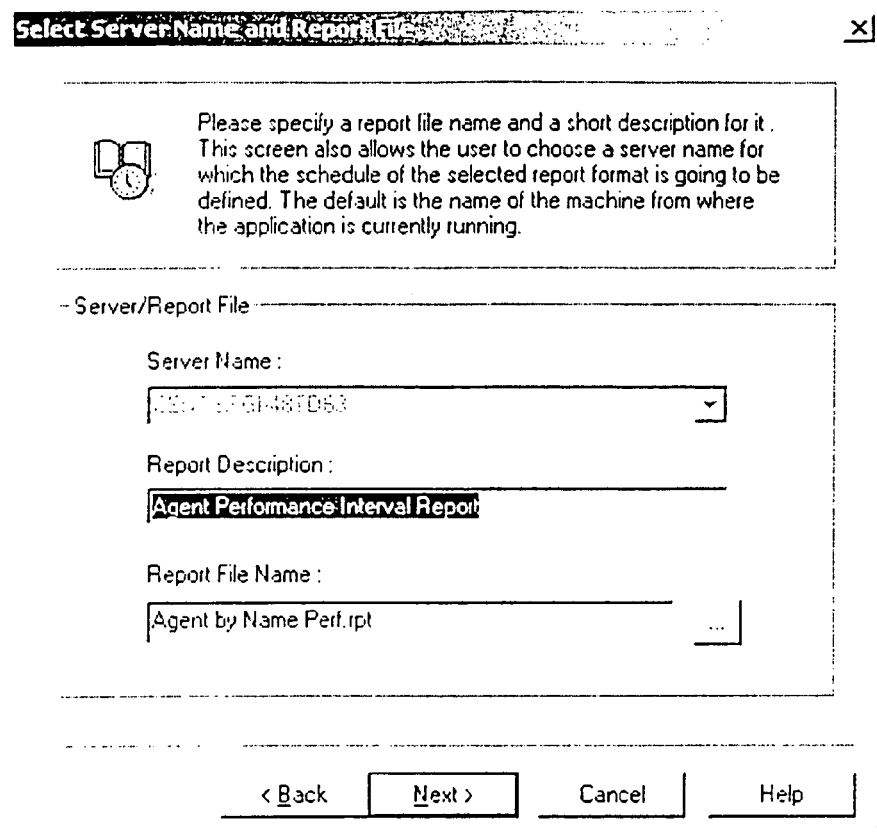
Figure 14C:
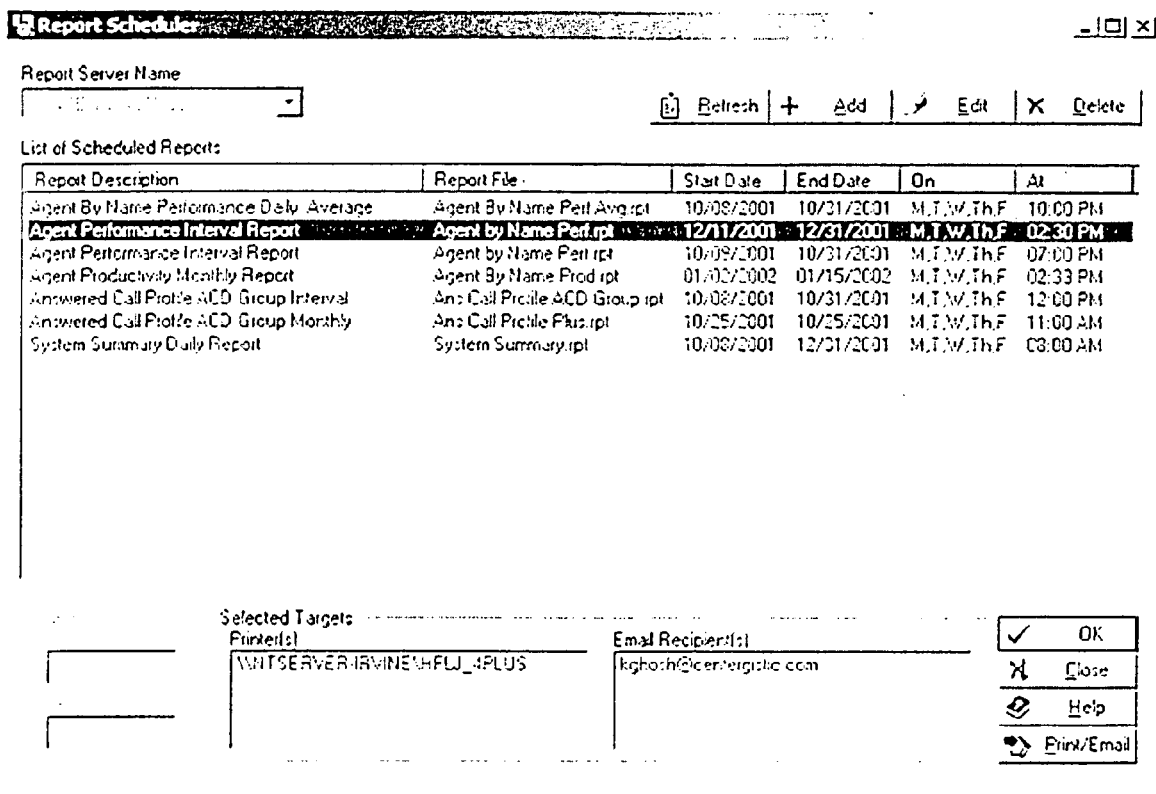

In step S1402, the user specifies a server name as shown in FIG. 14B. Once a server is selected the user specifies a report description in step S1403, as shown in FIG. 14C.

Figure 14E:
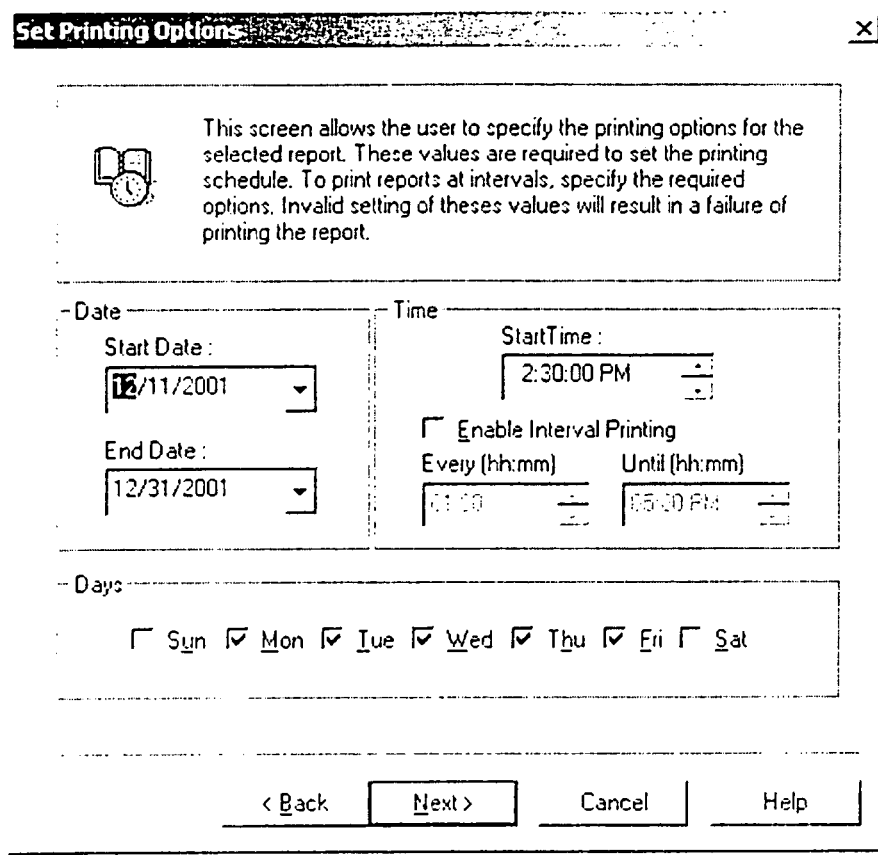

In step S1403, user selects report parameters, as shown in FIG. 14D. On viewing the desired report and the report parameters the user selects printing options for the selected report in step 1404. An example of that is provided in FIG. 14E.

Figure 14F:
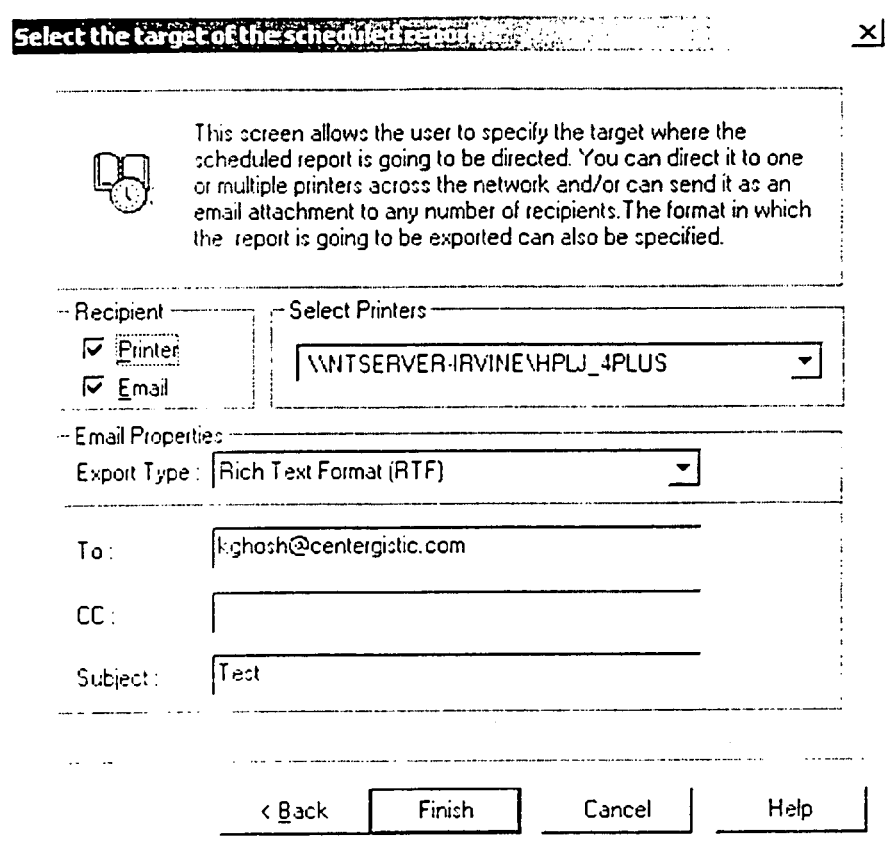

In step S1405, user selects targets and destinations for delivering the selected report in step 1404. An example of that is provided in FIG. 14F. The reports are then printed or emailed to the selected targets/destinations in step 1406. Report scheduler 213 can output reports in a wide variety of formats including Microsoft Word, Microsoft Excel, Adobe PDF, Rich text Format, or any other format.

It is noteworthy that once a schedule is defined, system 104 monitors the schedules for execution.

Report Scheduler 213 is designed to define report schedules and print them on multiple printers and/or send them as an email attachment to multiple recipients. This is achieved, both on a scheduled basis as well as at a specific time. All report schedules are stored in database 204.

Report Scheduler 213 may be designed to run as a NT service, invoking a Report Printer Dll, which will go through available scheduled reports specific to a data source and send them to specific destinations on a chosen day at a specified time and interval. Report scheduler 213 may be configured to operate other schedulers running on a network.

Figure 15B:
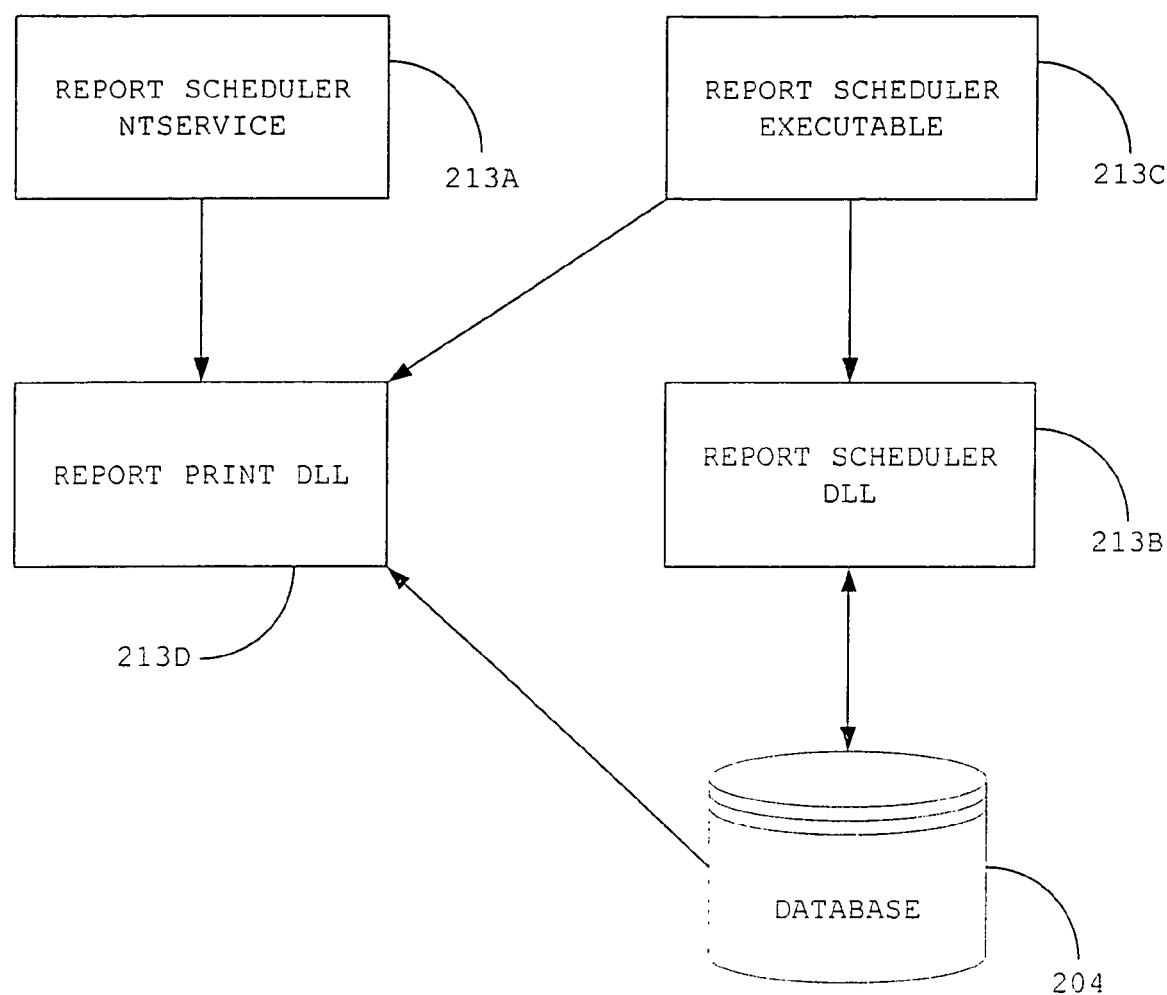
FIG. 15B is a block diagram of the report scheduler, according to one aspect of the present invention.

FIG. 15B shows a block diagram for scheduling reports for report scheduler 213. The following provides a brief description of various report scheduler 213 components.

Report Scheduler Executable 213C:

This module displays a collection of predefined report schedules, which are updated from database 204. It allows a user to add new schedules as well as edit or delete an existing one. If a new report schedule is added or an existing one modified independently in database 204, the module has the ability to refresh the displayed collection. It also has the capability to schedule the collection of report schedules and send them to their defined targets at the specified time. Adhoc printing/sending as an email attachment, of a selected report schedule is also supported.

Report Scheduler Dll 213B:

This Dll can be invoked from Report Scheduler executable 213C by selecting "Add/Edit" function to define a new report schedule or allow editing of an existing one. In case a user wants to edit a predefined schedule, the wizard fields (FIG. 14A) are populated with the respective values of the selected report schedule for editing. Otherwise, a list of the predefined report templates is provided to the user. Once an existing template is selected, the user will be provided with the option to set parameters specific to that report, specify the Start Date and End Date of the report-printing period, time at when it will be printed.

Report schedules can also be defined to be printed at any interval within a particular day. A user will have the option of sending the report to a specific printer and/or email it to anyone number of recipients.

Report Printer Dll 213D:

ReportPrinter Dll 213D retrieves scheduled reports from database 204, creates a collection of CSScheduledReport objects, iterates through it to schedule them and prints them at a specified time. The scheduling functionality of both Report Scheduler executable 213A and Report Scheduler 213 service is achieved through this Dll.

Report Scheduler Service:

Report Scheduler Service 213A is designed to run as a NT service, invoking the ReportPrinter Dll 213D which goes through the available scheduled reports specific to a machine and prints them at a specified time.

Database Access:

Database access may be achieved through ODBC (Open Database Connectivity) using Microsoft ActiveX Data Objects (ADO), which is wrapped by the CCenterStatsDb class. An object of the above class is constructed and a valid connection is established at startup. Then required queries are constructed and executed to retrieve or save the data.

Reports in Proprietary Formats:

Report Scheduler 213 may distribute reports in proprietary report formats. A set of predefined report formats 213E is installed on a user's computer by an installation process. While defining a schedule, a user has to select one of the pre-designed report formats. Clicking the 'browse' button will browse the installed report folder. Selecting a specific report format will retrieve the defined parameters in it, from database 204 and prompts the user for their values. Then based on the user input, the actual data is retrieved when the report is later on distributed.

Figure 15C:
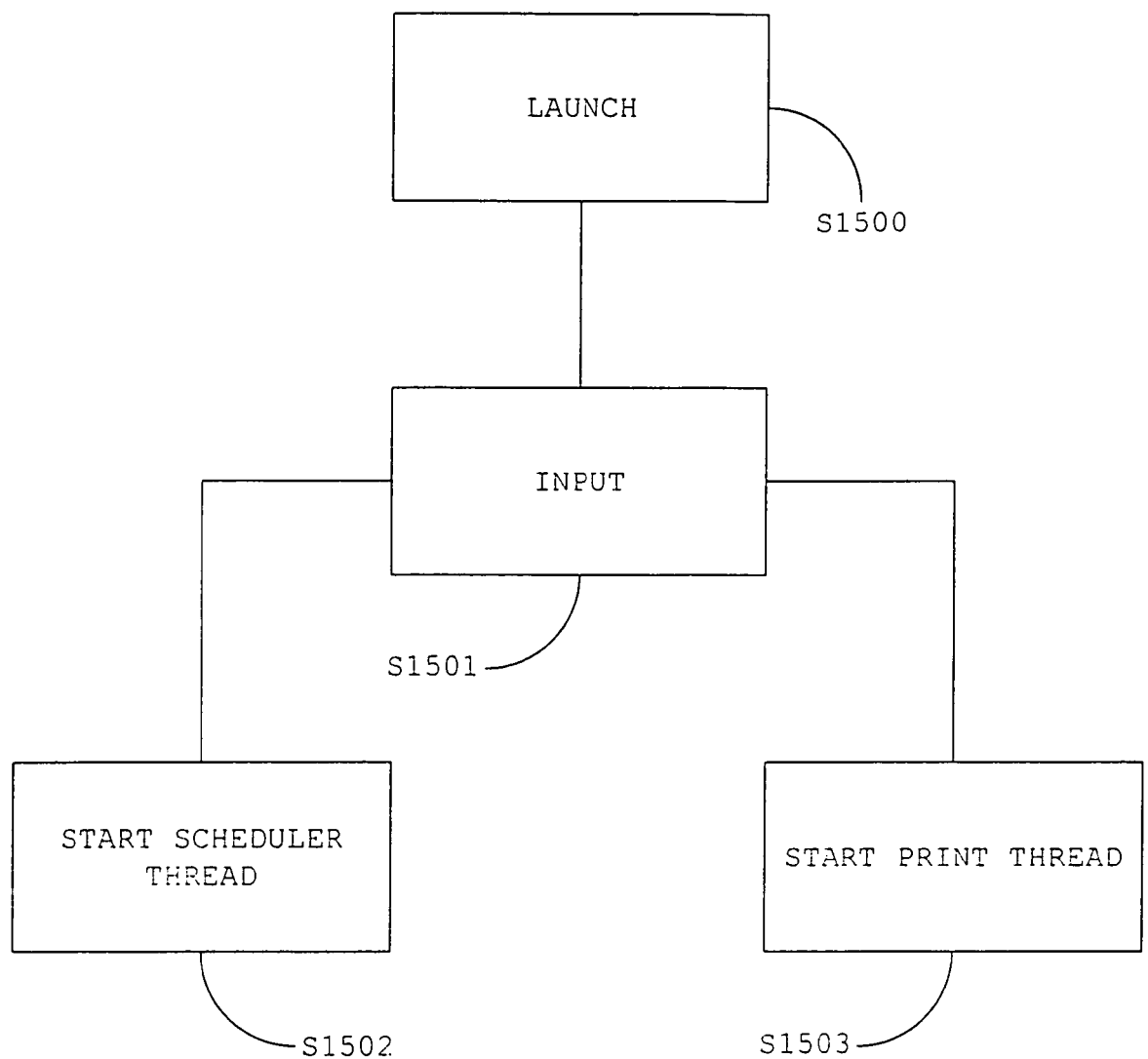
FIG. 15C is a block diagram showing the start of a printing thread, according to one aspect of the present invention.

Process Flow:

FIG. 15C shows executable process steps according to one aspect of the present invention. In step S1500, a login dialog is launched, which takes the necessary input from a user to connect to a data source. Depending on the machine name report scheduler 213 retrieves the data to populate a collection of scheduled reports and displays them in form of a list. As soon as the application starts, the export function Schedule ( ) of ReportPrinter Dll 213B is invoked. This starts two separate threads in the background named as the Scheduler and the PrintThread.

In step S1502, Scheduler thread loads the report collection at a pre-set time interval from database 204, deleting the existing one and sets a flag for the CSScheduledReport objects scheduled. If any report is scheduled for that minute, it triggers an event to activate the printer thread, which then waits on a loop.

In step S1503, the printer thread responds to that event by iterating through the report collection and distributing only those reports that have a flag set.

A report schedule can be defined or modified using Report Scheduler Dll 213B. It will guide the user through some simple pages and will prompt for their input. Some fields are initialized with default values, which can be changed. If a mandatory field is left out, the user is again prompted to re enter its value. In case the user wants to edit a predefined schedule, the wizard fields will be populated with the respective values of the selected report schedule and thus giving a chance to edit them. Clicking the "FINISH" button on the last page of the wizard will finally update the database. In the next refresh, the "Scheduler thread" will collect the newly added or updated schedule.

Figure 16:
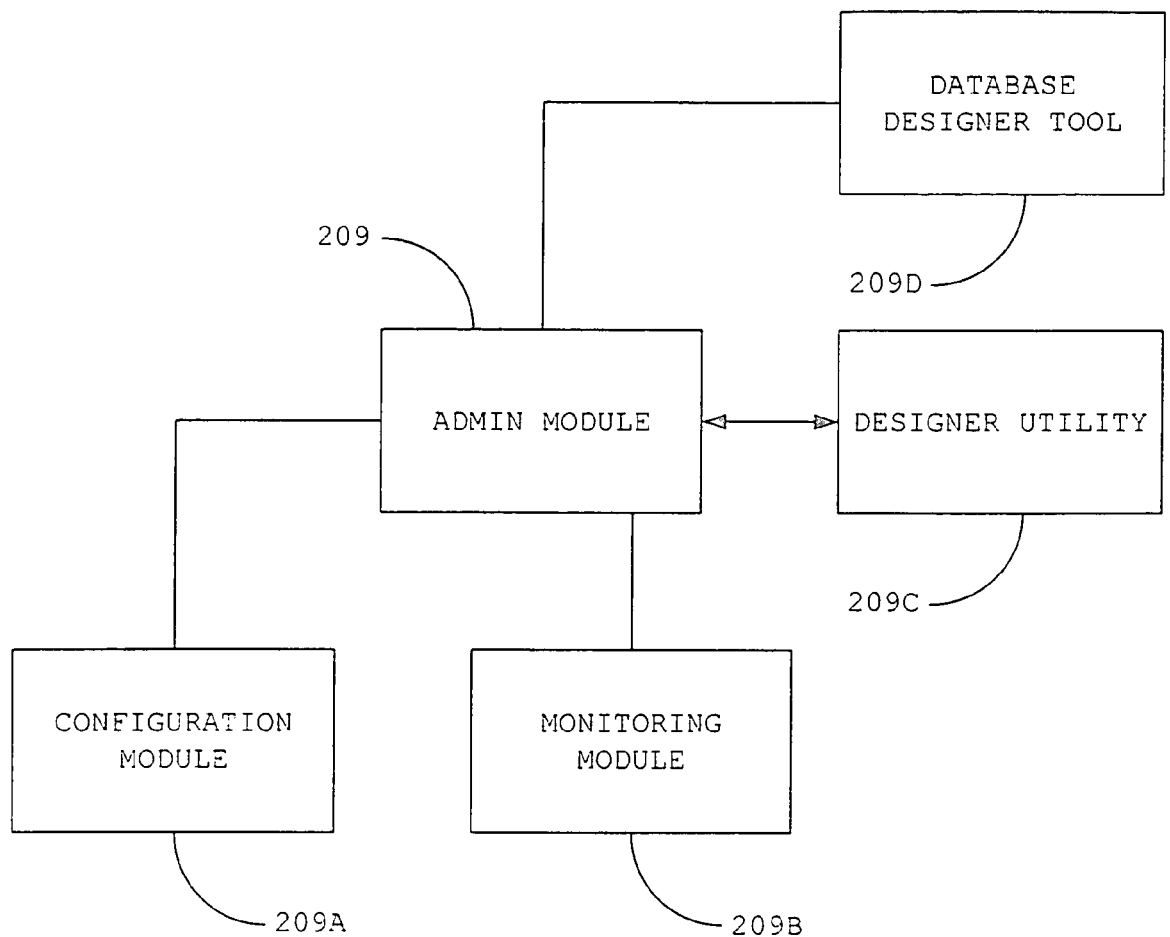
FIG. 16 is a block diagram of an administrator module, according to one aspect of the present invention.

Administrator Module 209:

In one aspect, the present invention provides an administrator module 209 for configuring the various components of System 104. FIG. 16 shows a block diagram of the various components of the administrator module 209.

Administrator module 209 includes a configuration utility 209A, also referred to as Config utility 209A that is used to setup up data collector information, data collector collection schedules, Front-end Alerts, User-Interface Thresholds, Threshold schemas, PowerUser and InfoUser user accounts and permissions, and display item widgets.

Administrator module 209 also includes monitor utility 209B used to monitor data collectors and their performance in real time; Designer utility 209C to design DTS packages and to generate backend tables, stored procedures and trigger procedures; and database designer utility 209D to design database 204 components for any data source.

Config Utility 209A:

Config utility 209A allows a user to configure System 104. The utility is used by system administrators for setting up data sources, collection schedules, user rights, display items, thresholds, threshold schemas and InfoUser layouts.

The modular design of the Config utility 209A allows for easy administration of System 104. Administrators can add new configuration information or modify existing ones.

Figure 16A:
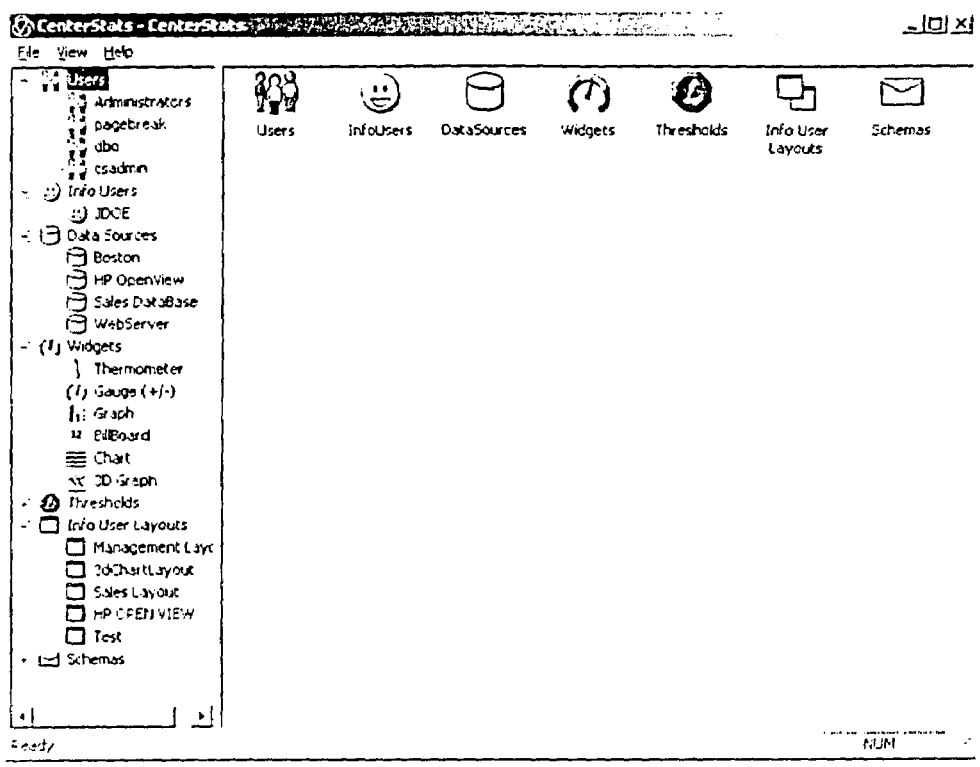
FIG. 16A–16E show examples of how the administrator module may be used, according to one aspect of the present invention.

Below is a brief description of the available options in Config utility 209A, as illustrated in the screen shot of FIG. 16A.

| | |
|---|---|
| Users | Allows addition of Users to System 104. Also provides assigning users rights for various tables and views. |
| InfoUsers | Allows addition and modification of InfoUsers. |
| Data Sources | Allows addition and configuration of data source interfaces. Administrators can set up data source connections, collection schedules and collection objects. |
| Widgets | Allows creation and modification of display items. These are display items available to PowerUsers and InfoUsers. |
| Thresholds | Allows creation and modification of thresholds. Administrators can create Alerts and display thresholds. Threshold outcomes may also be defined in this section |
| InfoUser Layouts | Allows creation of InfoUser layouts. |
| Alerts | Allows creation of alerts. |

Figure 16B:
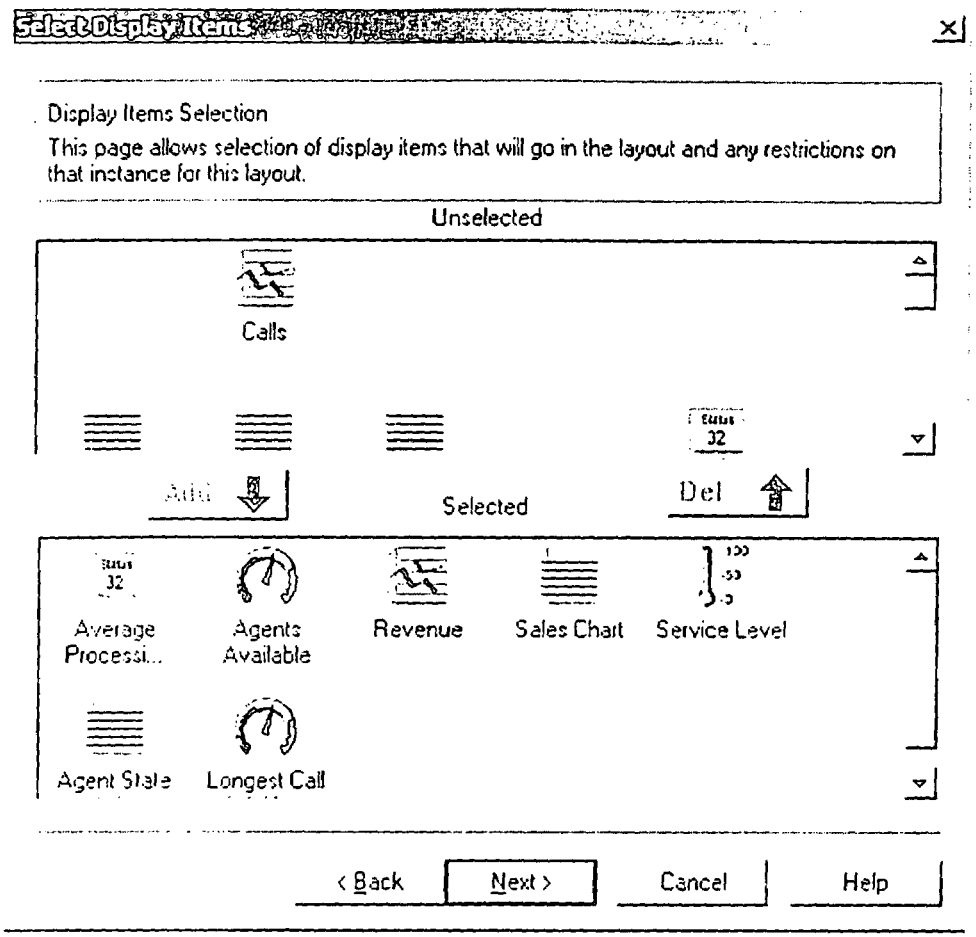

Depending on an administrator's needs as little or as much of config utility 209A functionality can be made available. Because of the modular structure of config module 209A availability is controlled dynamically as shown in the screen shot of FIG. 16B.

Configuration:

This section outlines the configuration process for the various modules, according to one aspect of the present invention. FIGS. 17A–17I, 17K–17Z, and FIGS. 18A and 18B illustrate the various configuration routines.

Figure 17A:
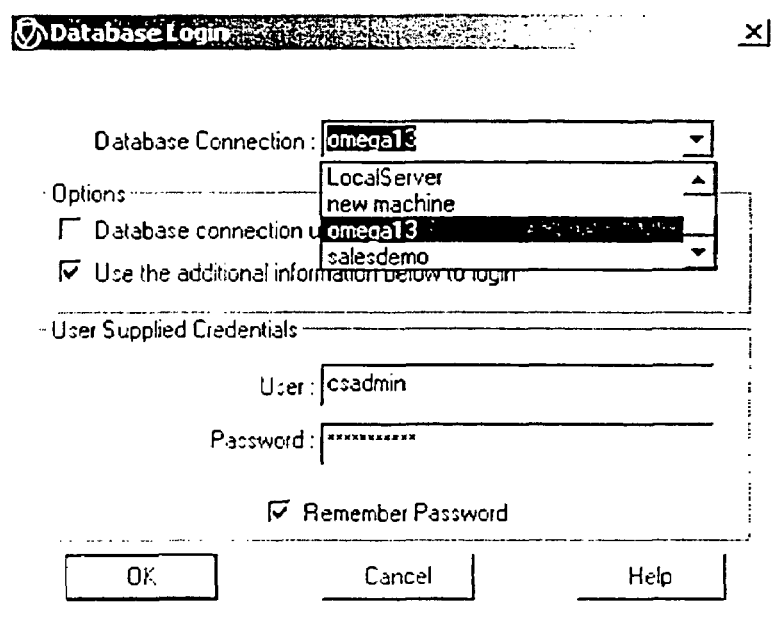
FIGS. 17A–17I and 17K–17Z illustrate the various configuration routines, according to one aspect of the present invention.

Login:

Figure 17Q:
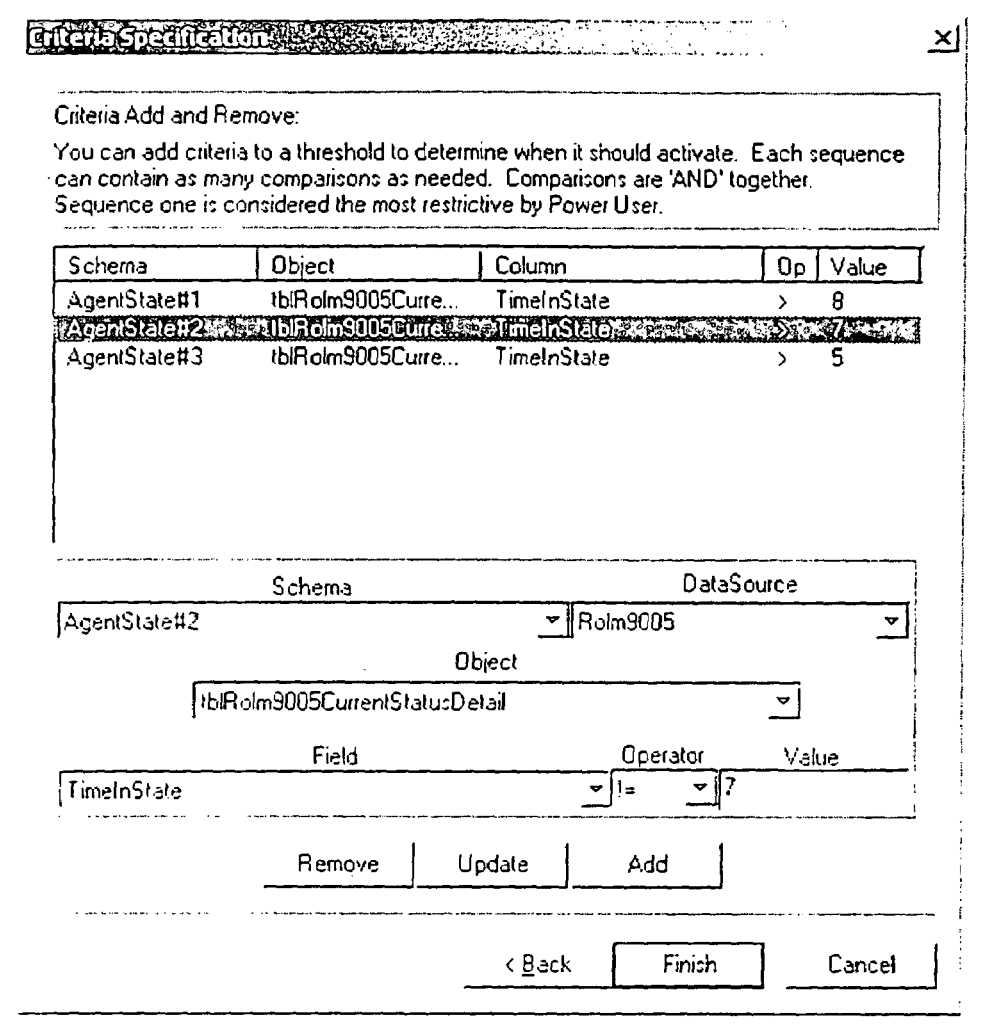
Figure 17Y:
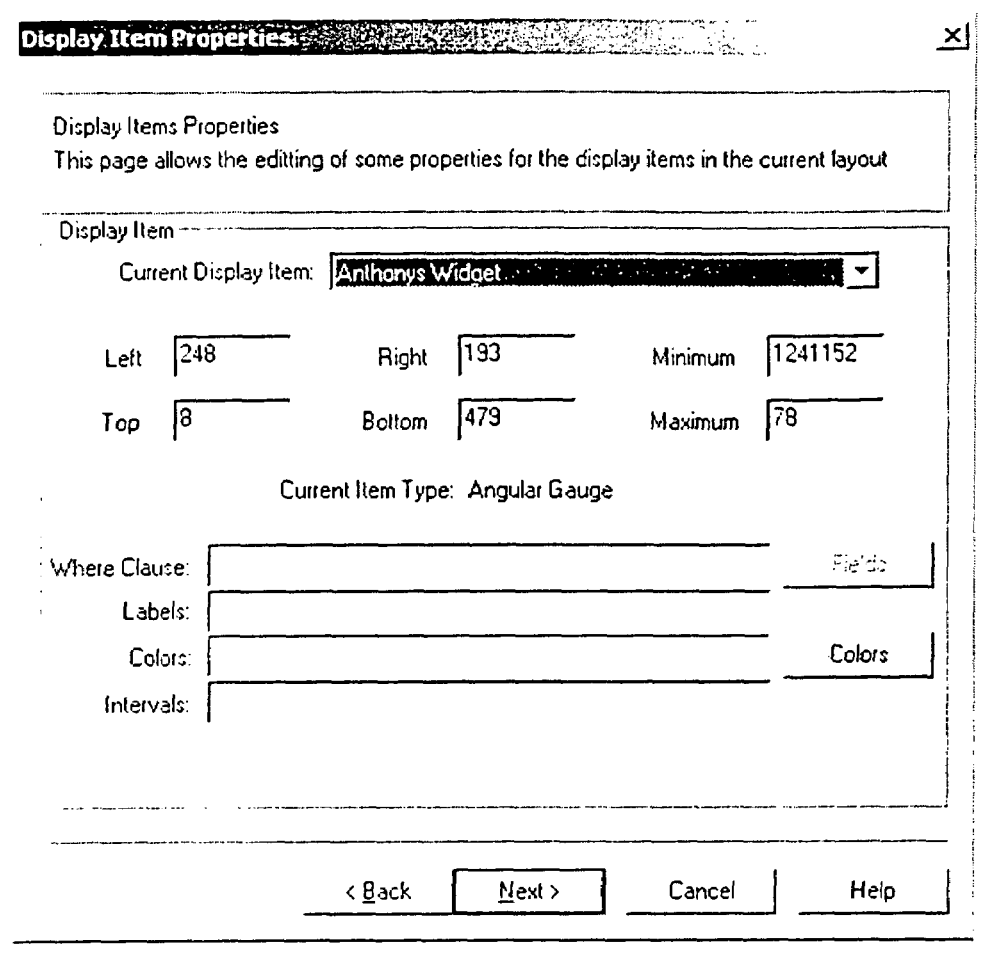

FIG. 17A shows the login screen for configuration purposes. Login information is stored on a user basis with encryption based on application name and or other features such as username allowing user specific encrypted values. The last DSN used can be stored in a registry, with the last username and password. The SQL server pointed to by a particular connection provides authentication. Connections listed are taken from a list of data sources maintained by windows systems themselves.

Component Access:

System 104 components may be accessed selectively. Config module 209A controls this function. This is controlled by a single string value stored in a registry. The string is composed of a dword that is split in two parts. The first part contains information on the encryption method used, and maybe a single digit. The second portion is the value for the access level. The ultimate form of the value is an integer value in the range from $0-2^{32}$. Each feature controlled by the configuration utility 209A is a one bit in value. Depending on the method of encryption used this value may first have to be decoded and decrypted. Errors in the process force it to default to no features. FIG. 18B shows system 1806 that allows selective access to various systems 104 component via config module 209A.

Figure 17B:
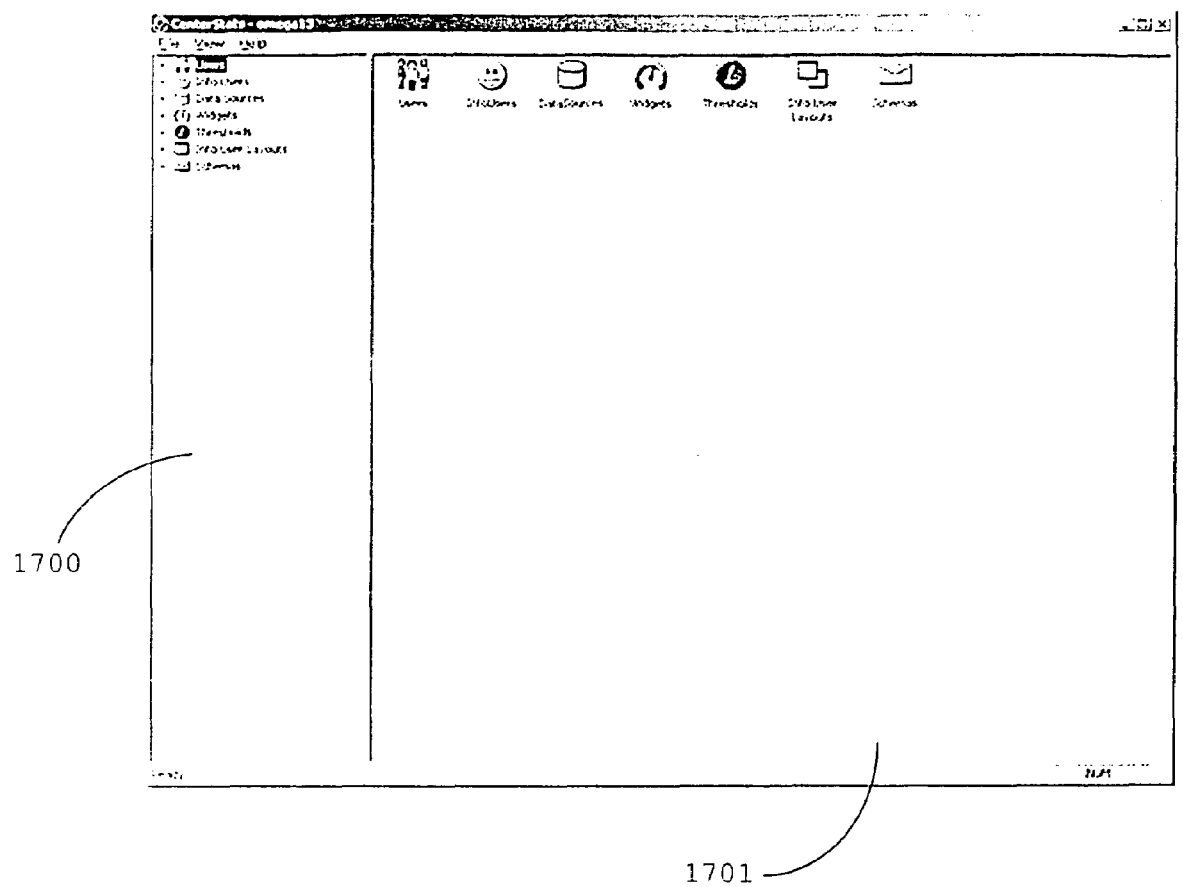

Overall Look:

In one aspect of the present invention, the configuration utility 209A uses an explorer style interface, as shown in FIG. 17B, with a tree control on one side 1700 and a list view on the other side 1701. Clicking on 1700 produces changes in 1701.

Figure 17C:
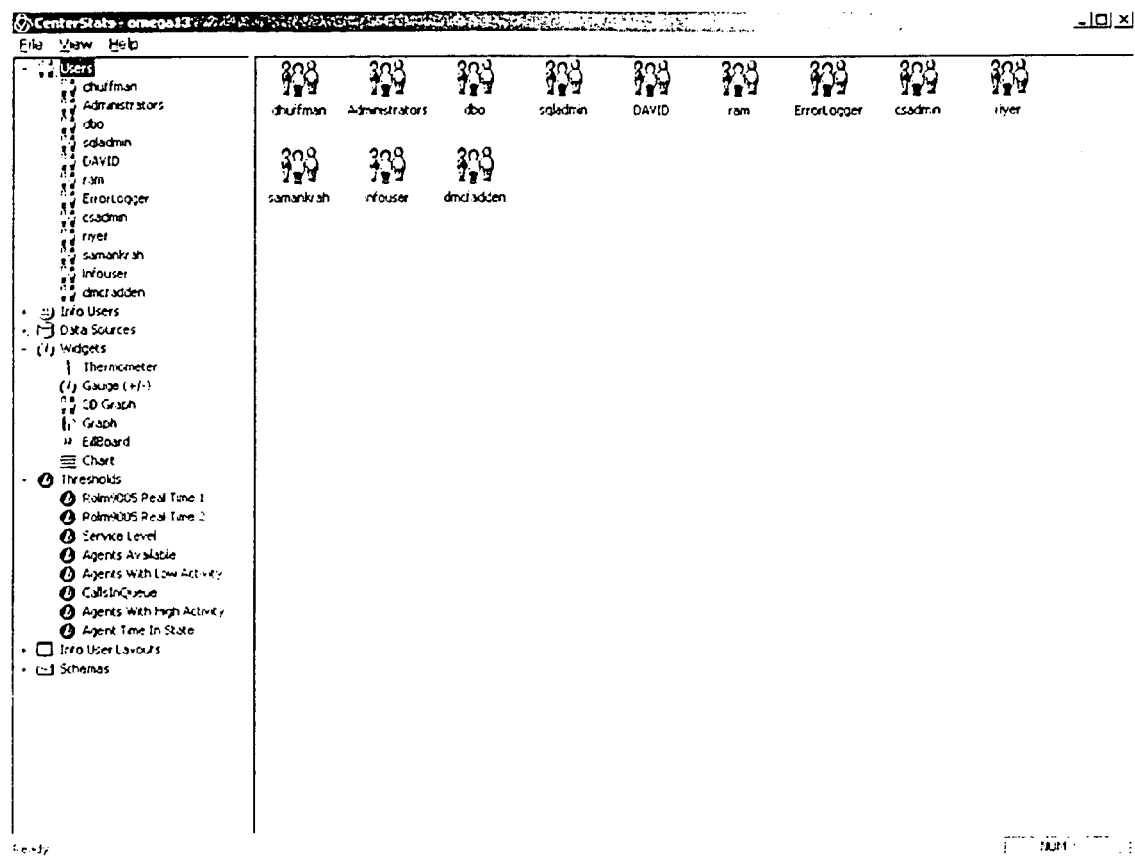
Figure 17D:
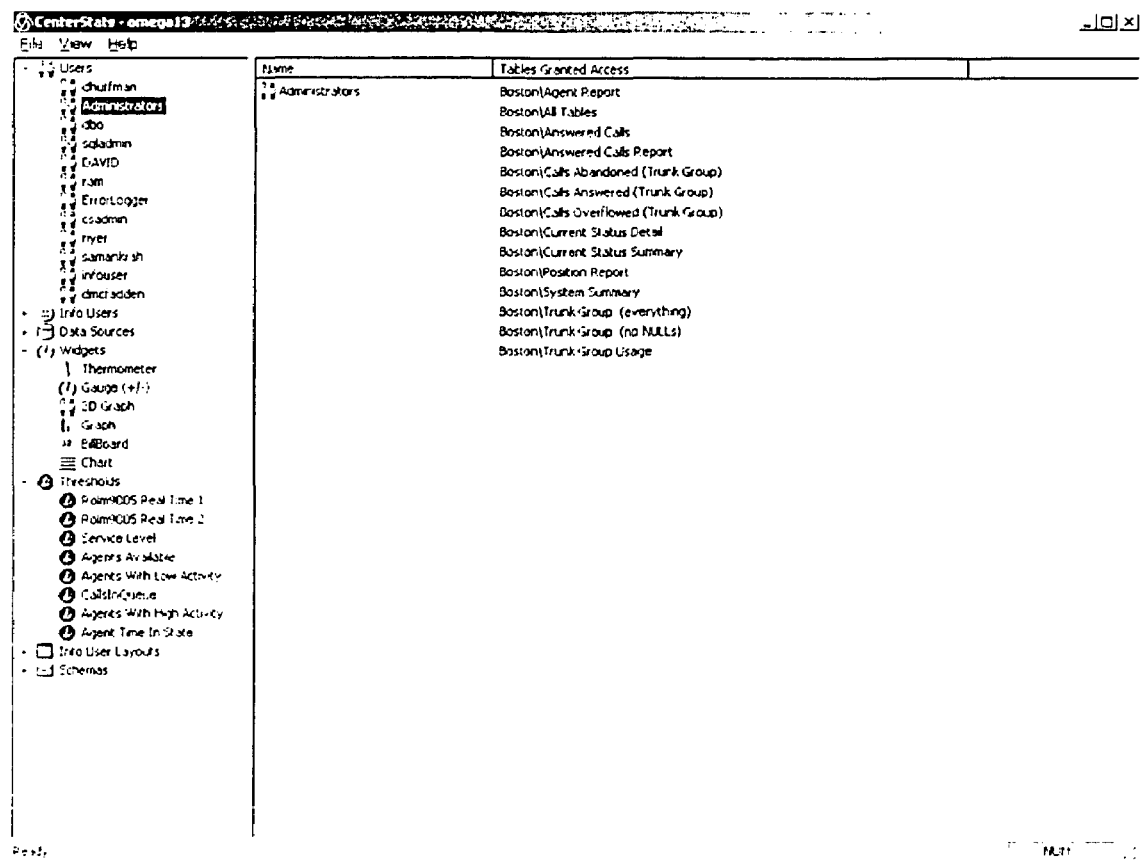

User List: FIG. 17C shows a list of users that may be obtained by config utility 209A from MS SQL table of users. Permissions if contained in the database are read and displayed. A list of administrators may be shown by activating the administrators' icon in FIG. 17C. A list of administrators is shown in FIG. 17D.

Changing Permissions:

Permissions are based on the level of access to information in database 204. Permissions are changed through a DLL function call 1811. The DLL call is passed to a database connection 1810 and that identifies a user and reads all the tables that a user has access too.

As discussed above, every column of accessible data in storage module 204A is identified by a column identifier, and every object in a column is identified by an object identifier. Restrictions can be placed on not only a column but also on values within a column. For instance "tblRolm9005TrunkGroupKeyMaster" contains a column contained data source ID. System 104 can restrict access to only rows of data where a column contains, e.g., an arbitrary number/character.

Figure 17E:
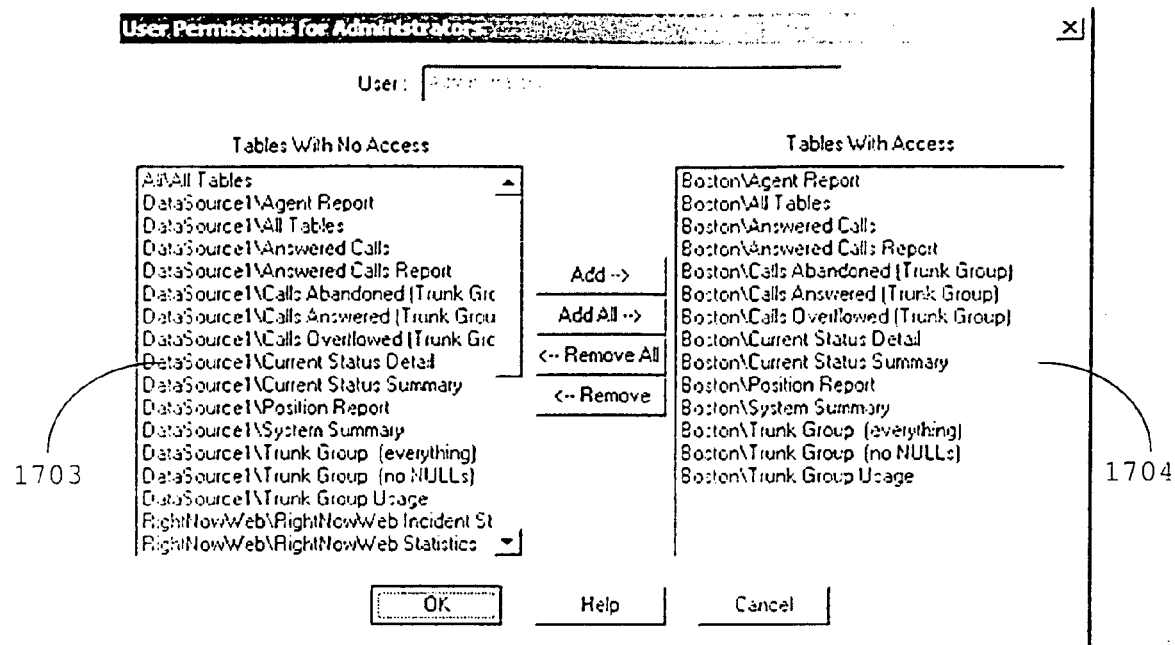

FIG. 17E shows a table 1703 with a listing of tables with access and 1704 with a listing of tables with access.

Figure 17F:
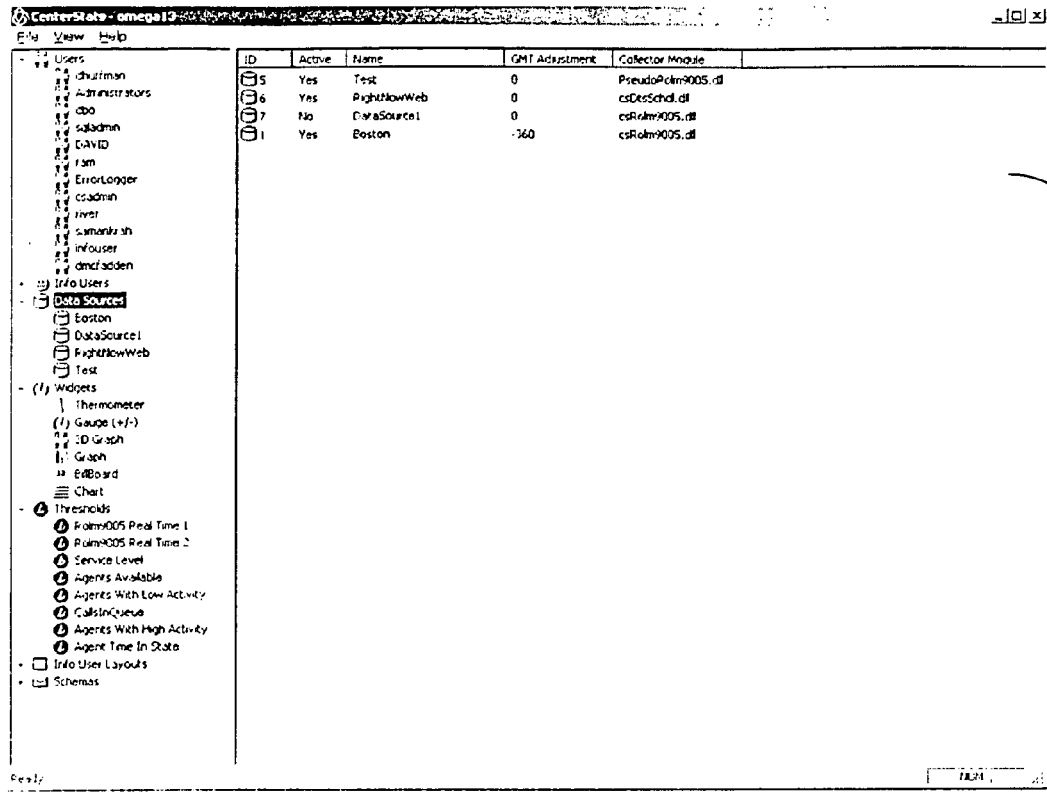

FIG. 17F shows the details 1705 of various permissions that may be provided.

Data Sources:

Methods of Defining A Data Source:

Data sources 203A can be deleted by passing a DLL numeric identifier. A data source 203A can also be deactivated (meaning it will not perform any operations) by passing a DLL with the data source identifier. A data source 203A is defined in database 204 with a name, a module (a string identifier of what module to load to perform collection functions), the amount of time adjustment from the data source to GMT to allow for multiple time-zone data servers to operate synchronously and if this module is active. A connection is defined with a name, a generated ID, a vendor number, and a number of optional features such as username, password, and login script [List of functions to execute after connection is made], and connection specific information such as IP, port, port initialization string, and filename.

Figure 17G:
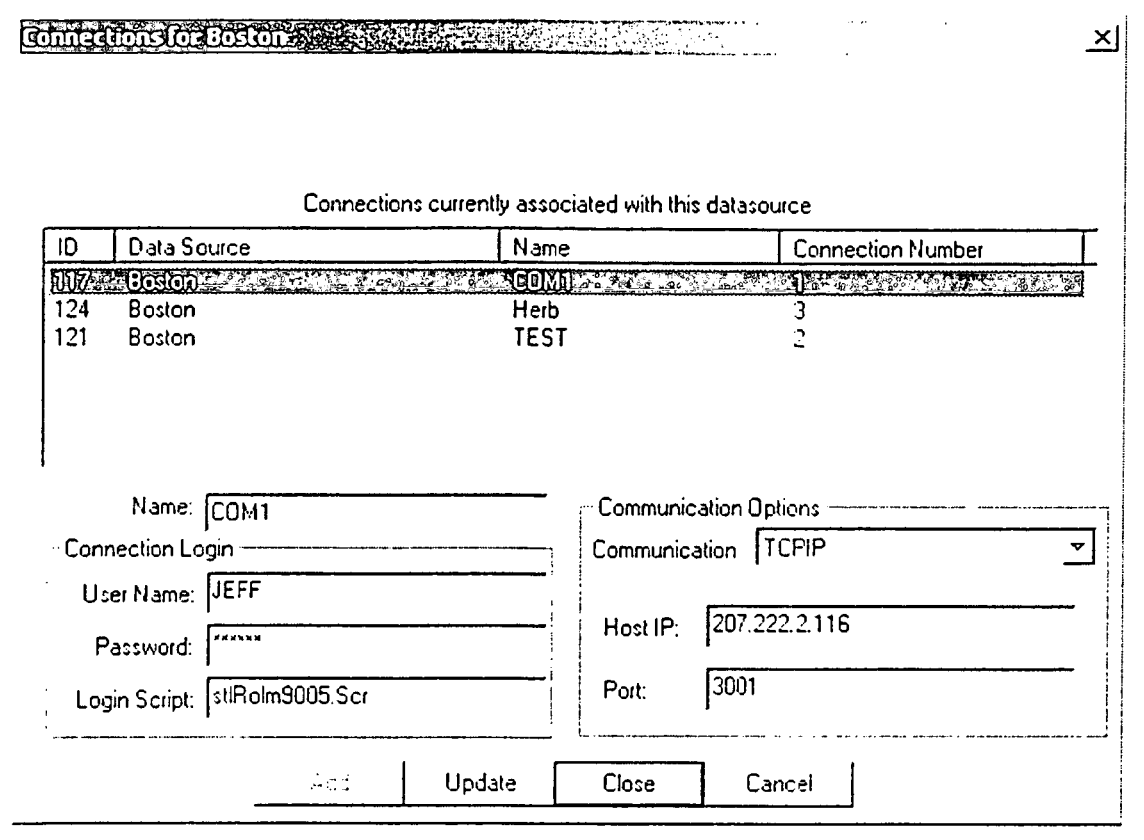

A data source can have multiple connections associated with it, as shown in FIG. 17G. This allows slow reports to be collected from one connection while faster reports can be collected on another connection. The login script file is a text file on the machine running the collection service.

Figure 17H:
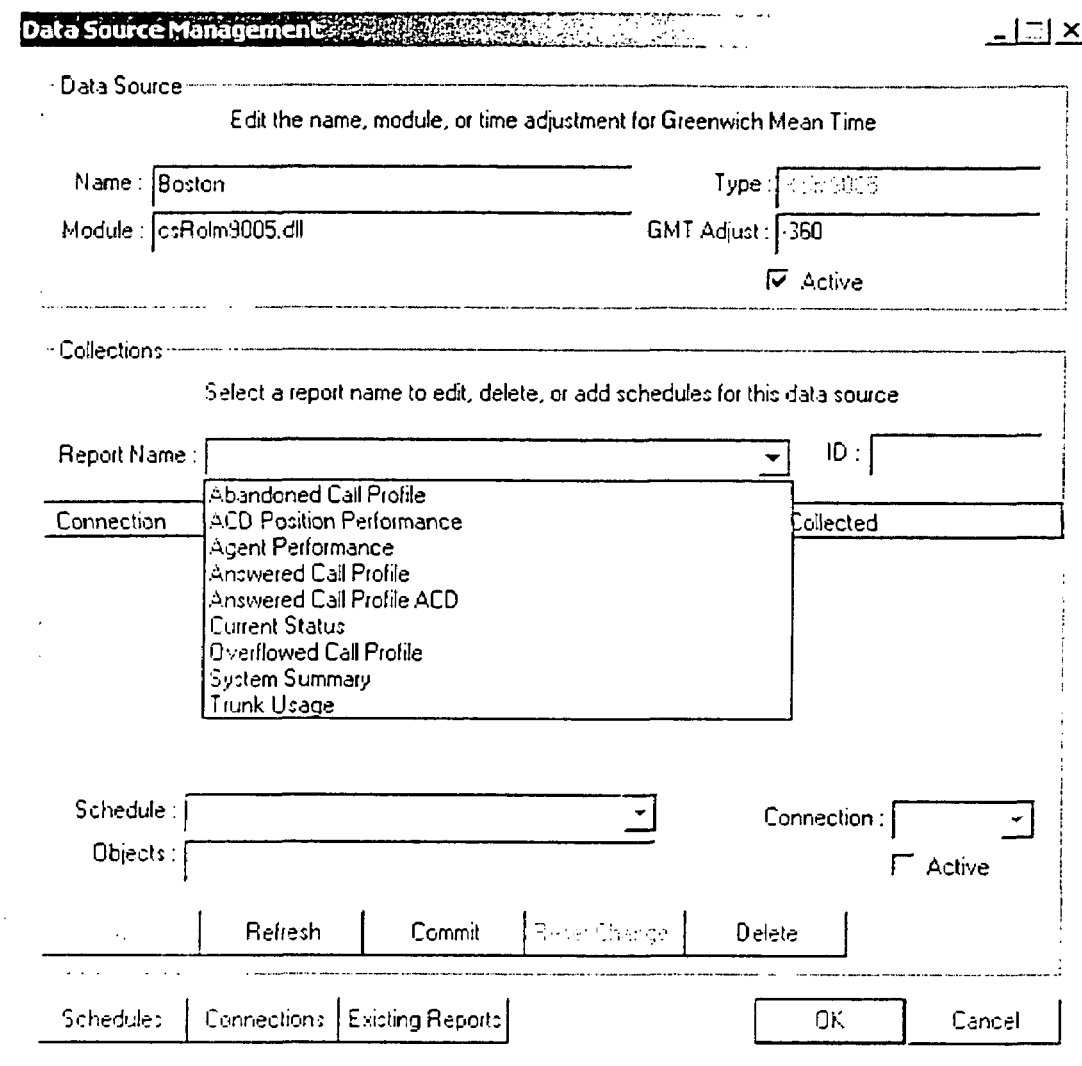

As shown in FIG. 17H, a list of all reports collected on the system is maintained in database 204, and collection schedules can be created to collected information from any of the reports.

Figure 17I:
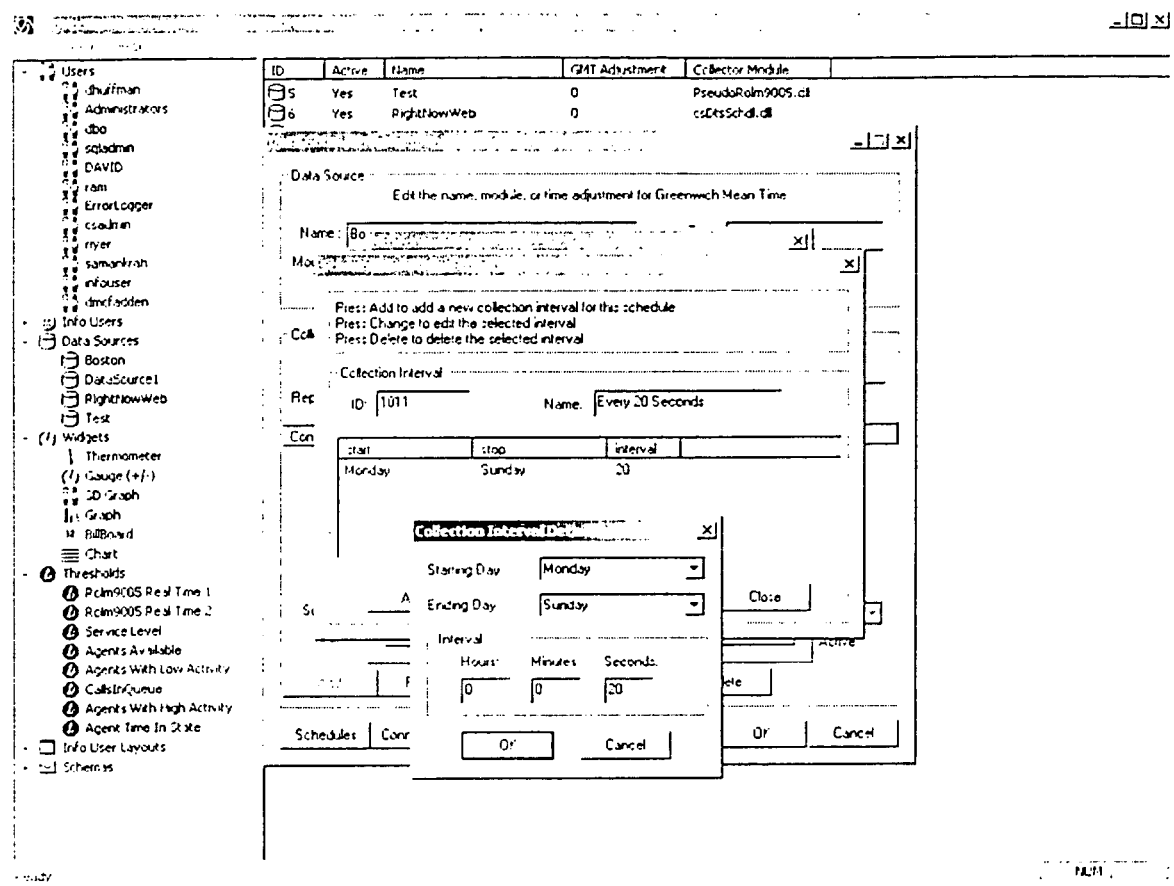
Figure 17K:
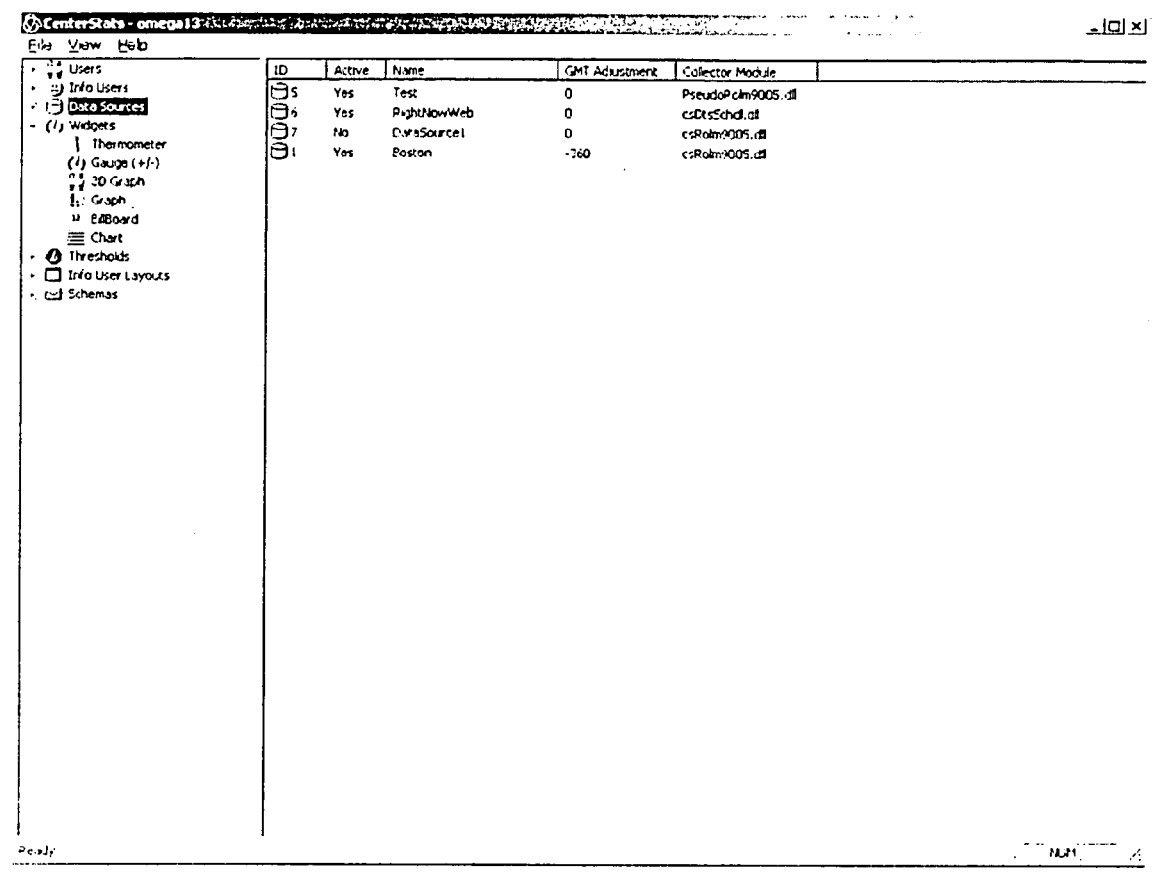

As shown in FIG. 17I, data collection schedules can be both shipped with database 204 or user defined with a start time and an interval. These schedules can have a meaningful name associated with them such as "every 20 seconds". All existing collection schedules can be listed and double clicking on a schedule brings it up for editing/display in the main window. This functionality is performed from a DLL that can be accessed by other programs as well.

Figure 17L:
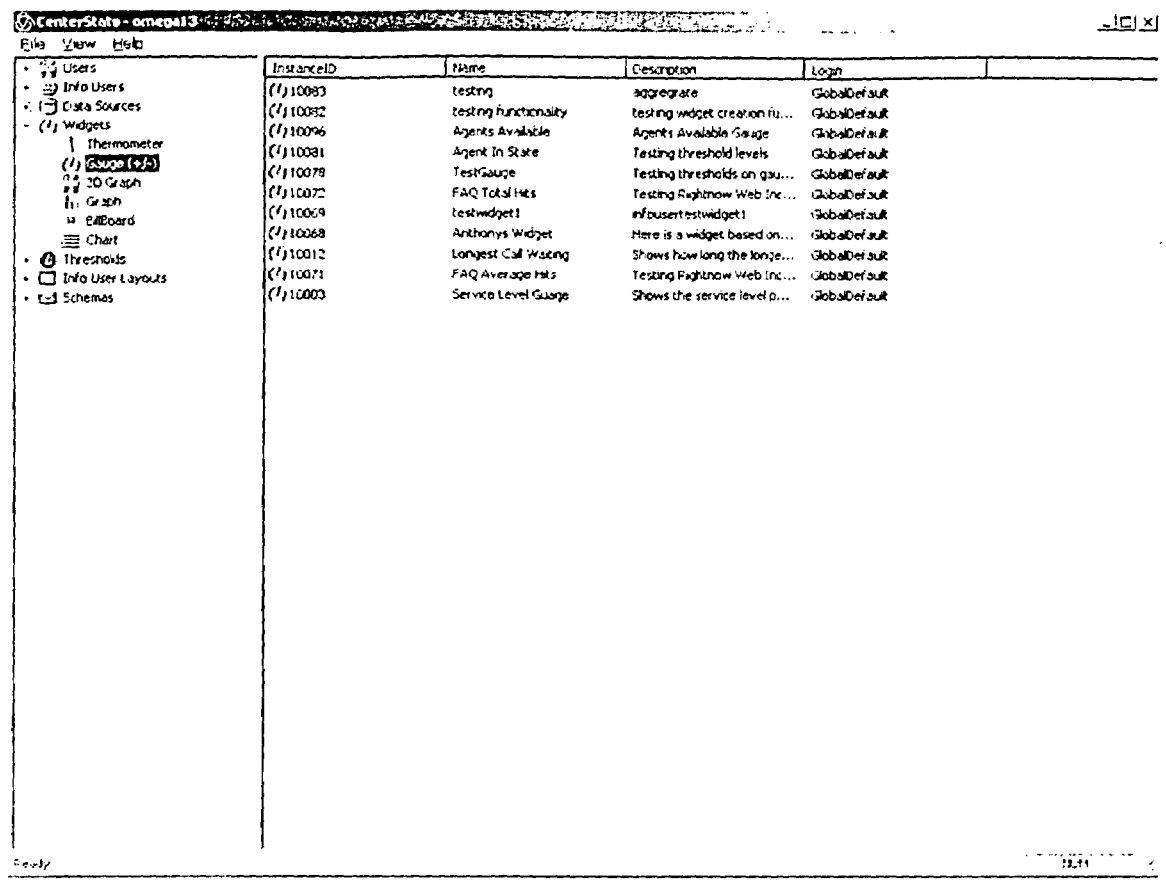
Figure 17N:
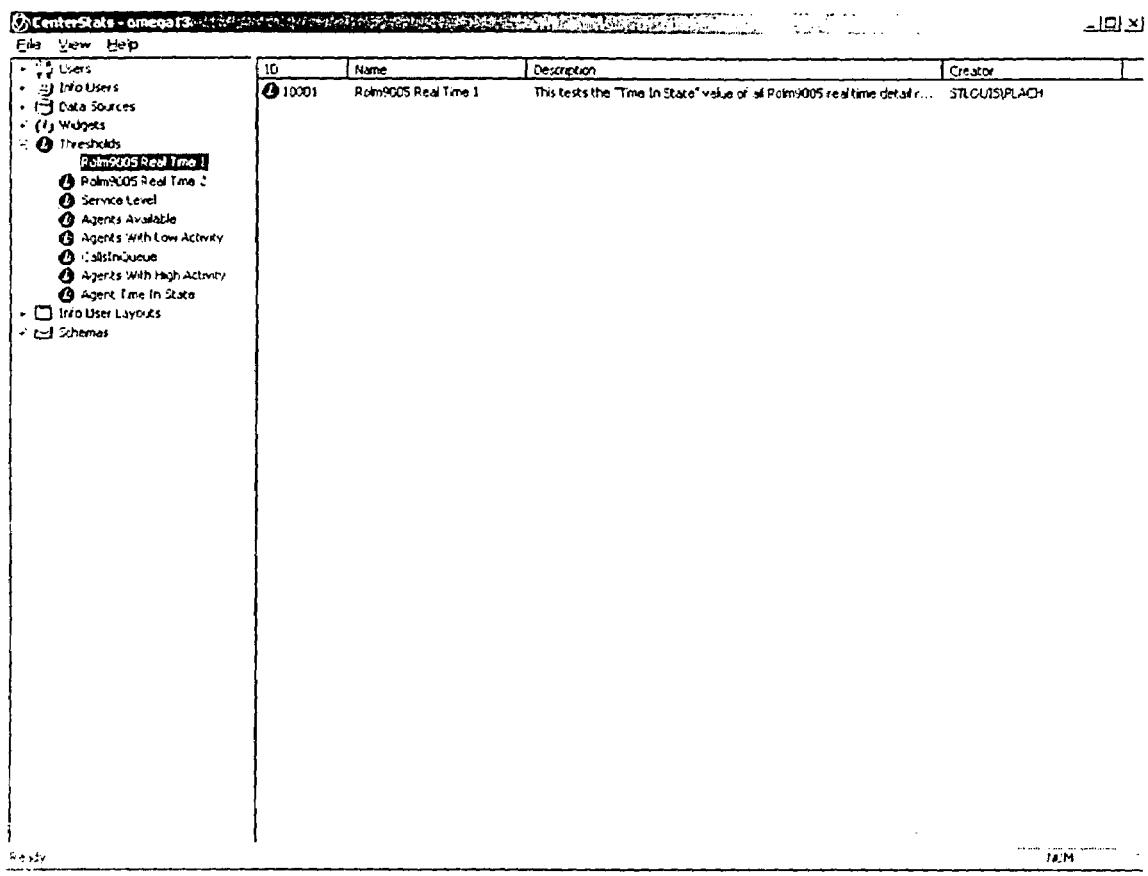
Figure 17P:
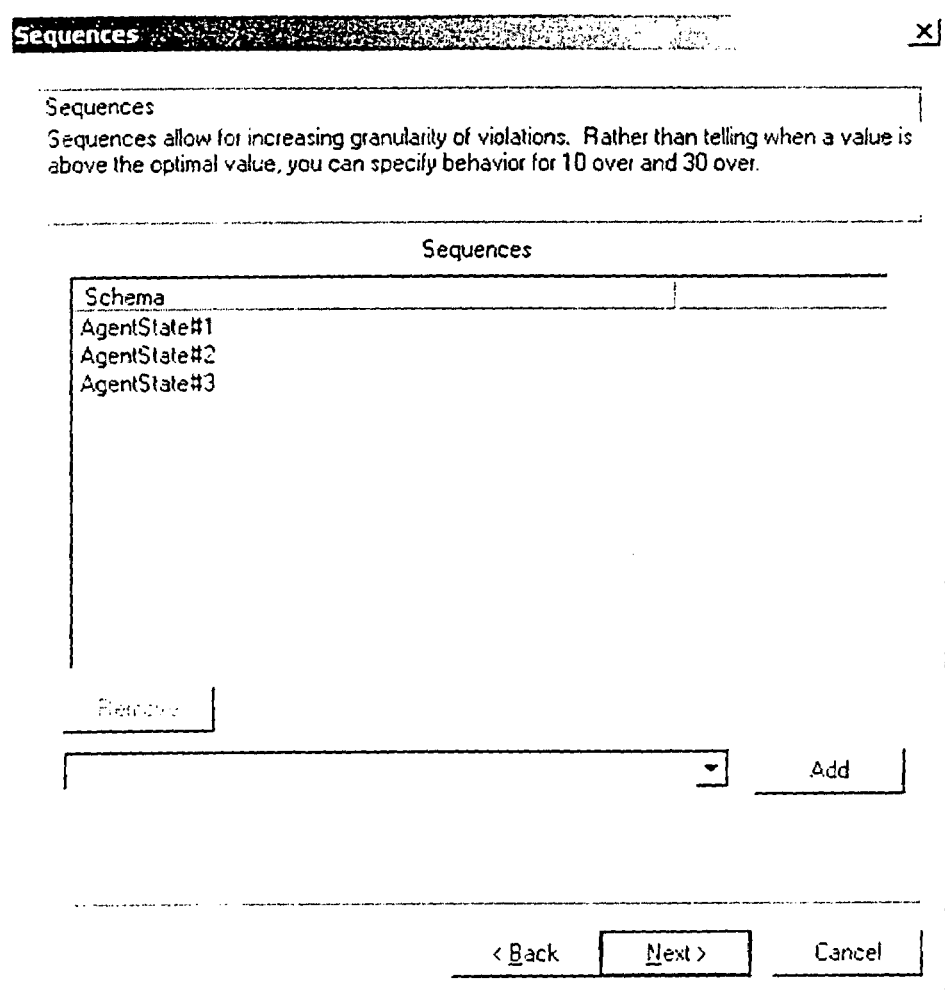
Figure 17R:
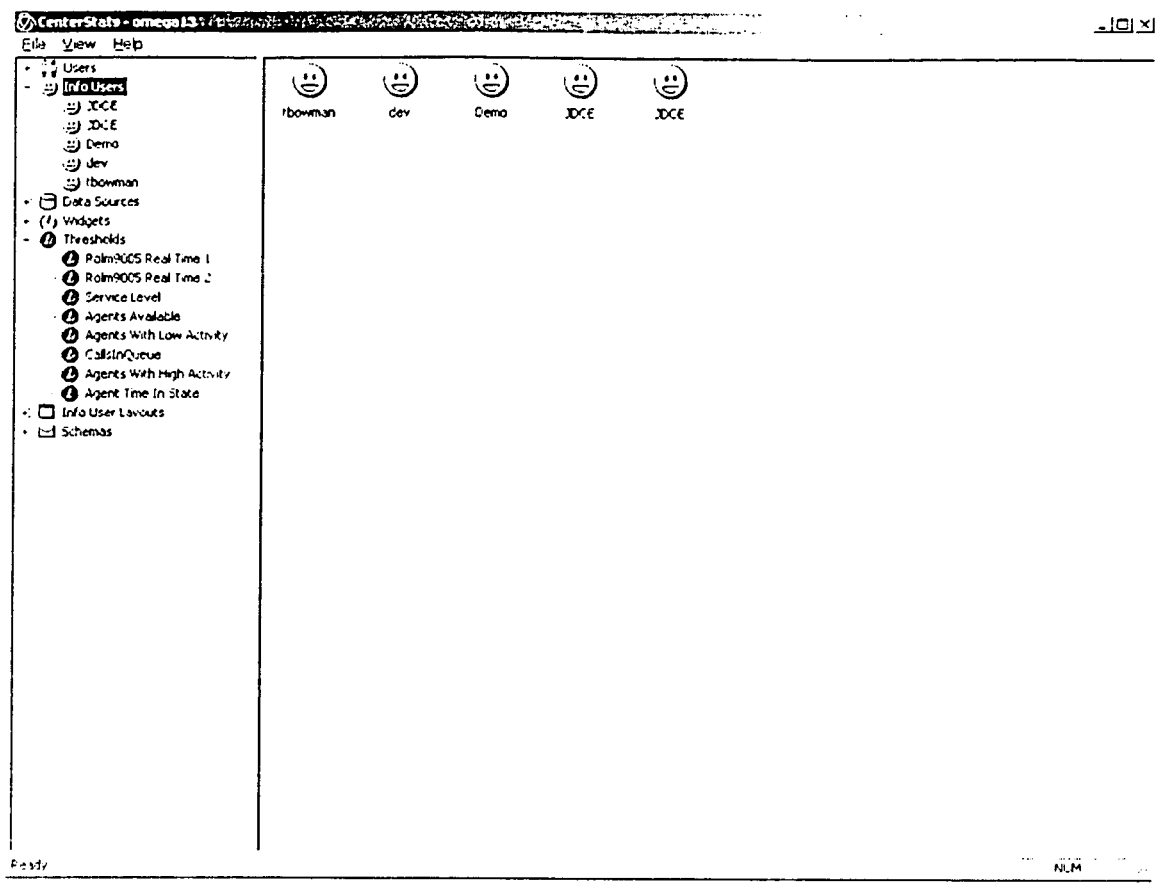
Figure 17S:
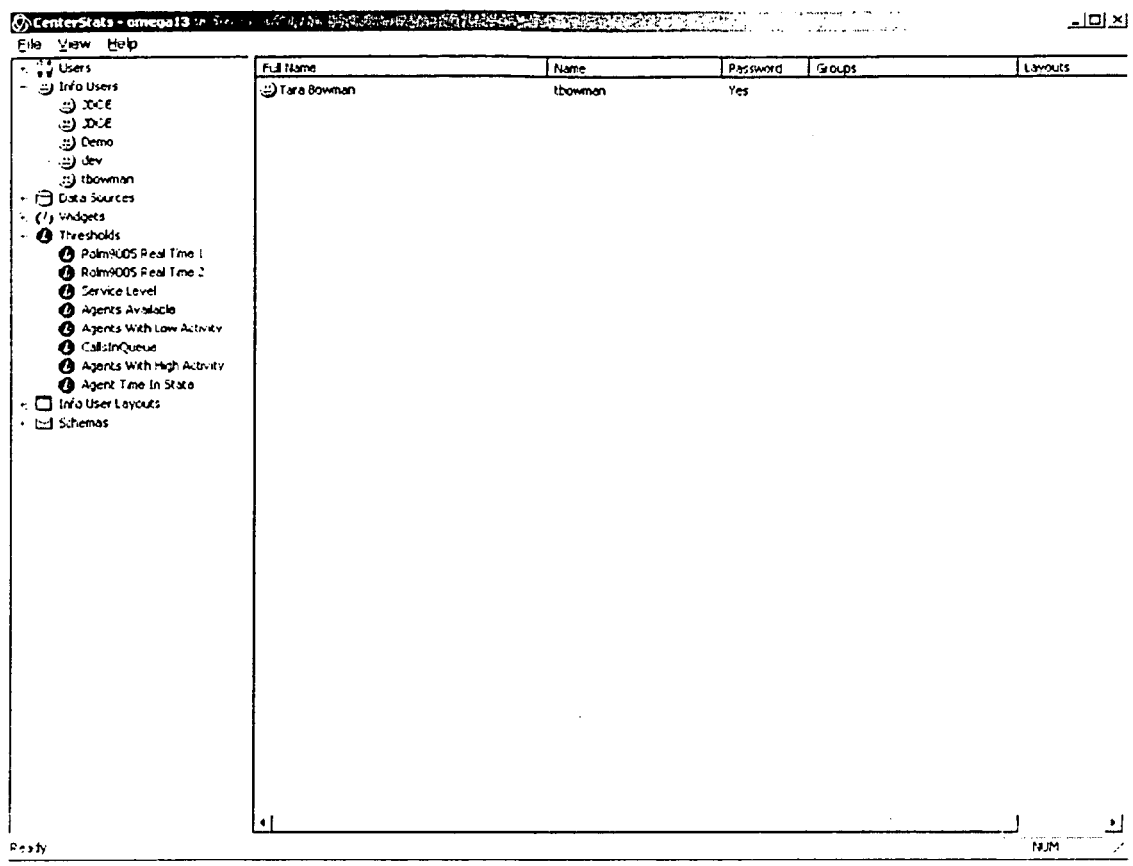
Figure 17T:
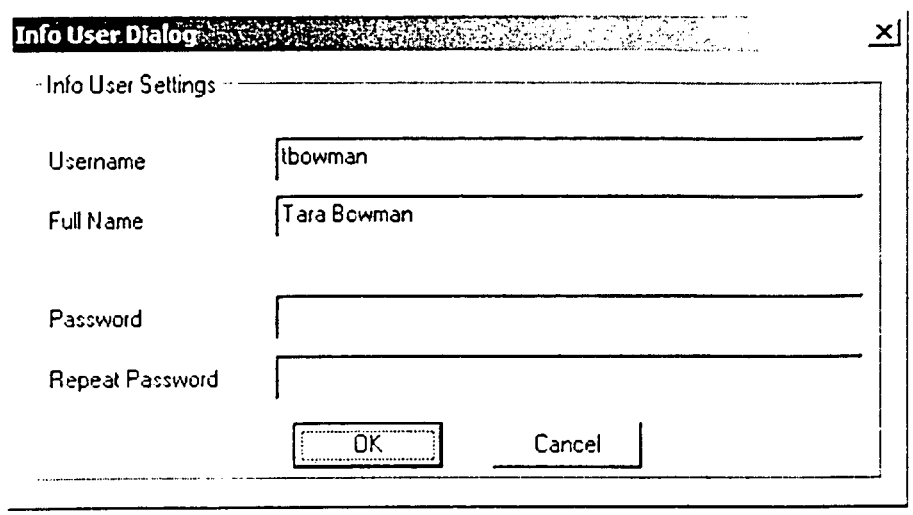
Figure 17U:
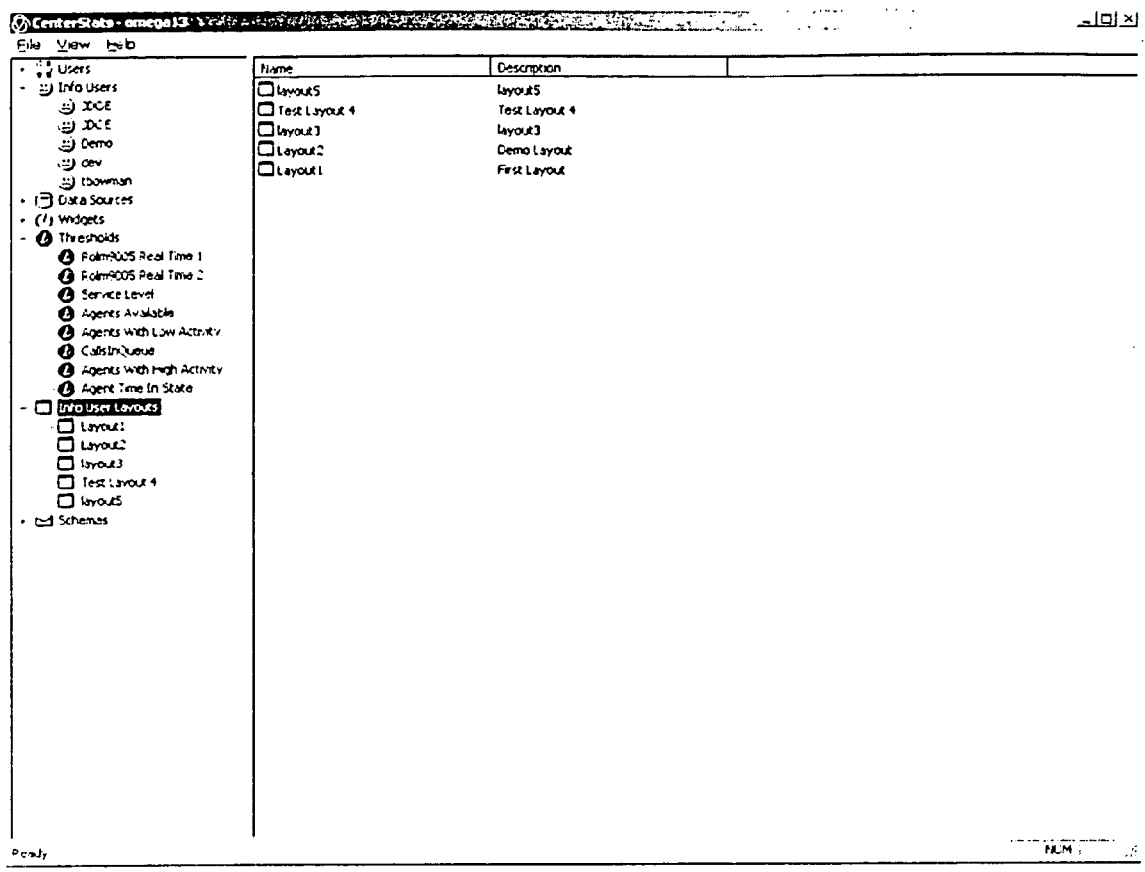
Figure 17V:
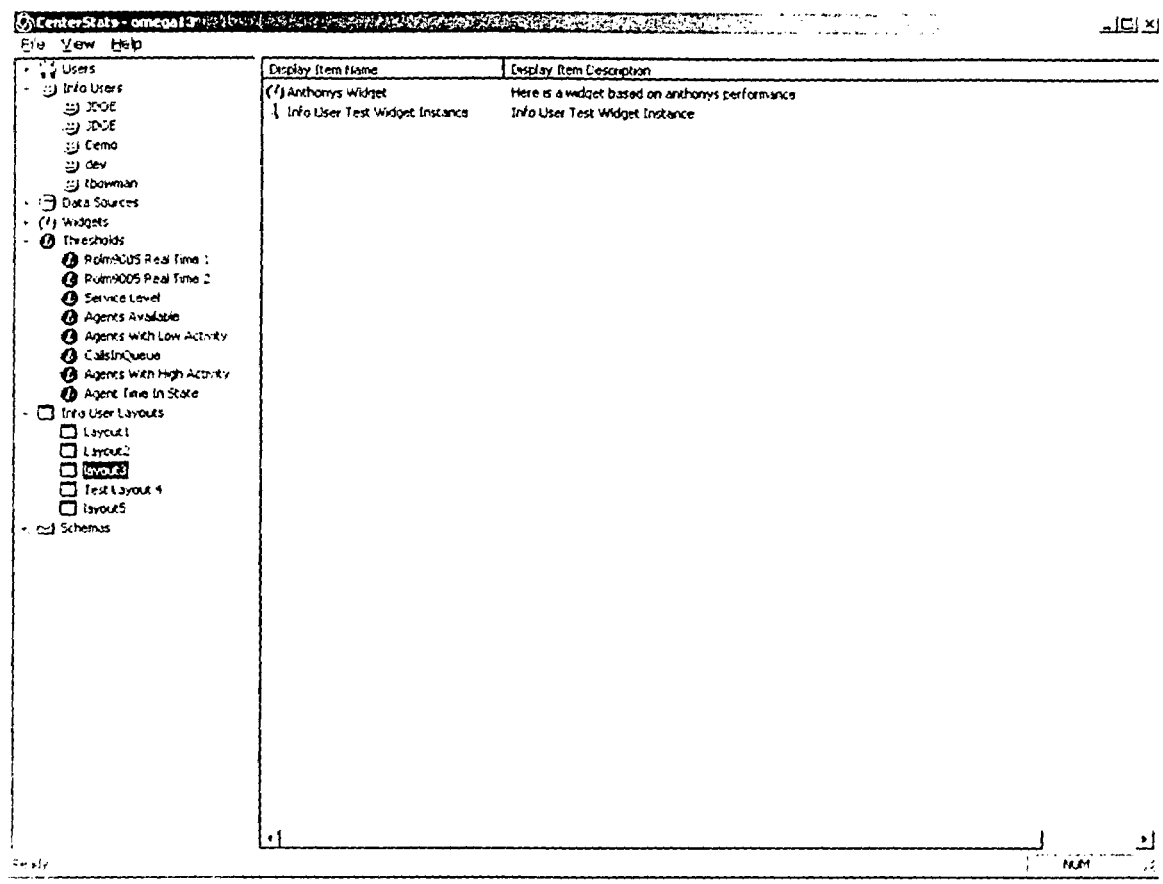
Figure 17X:
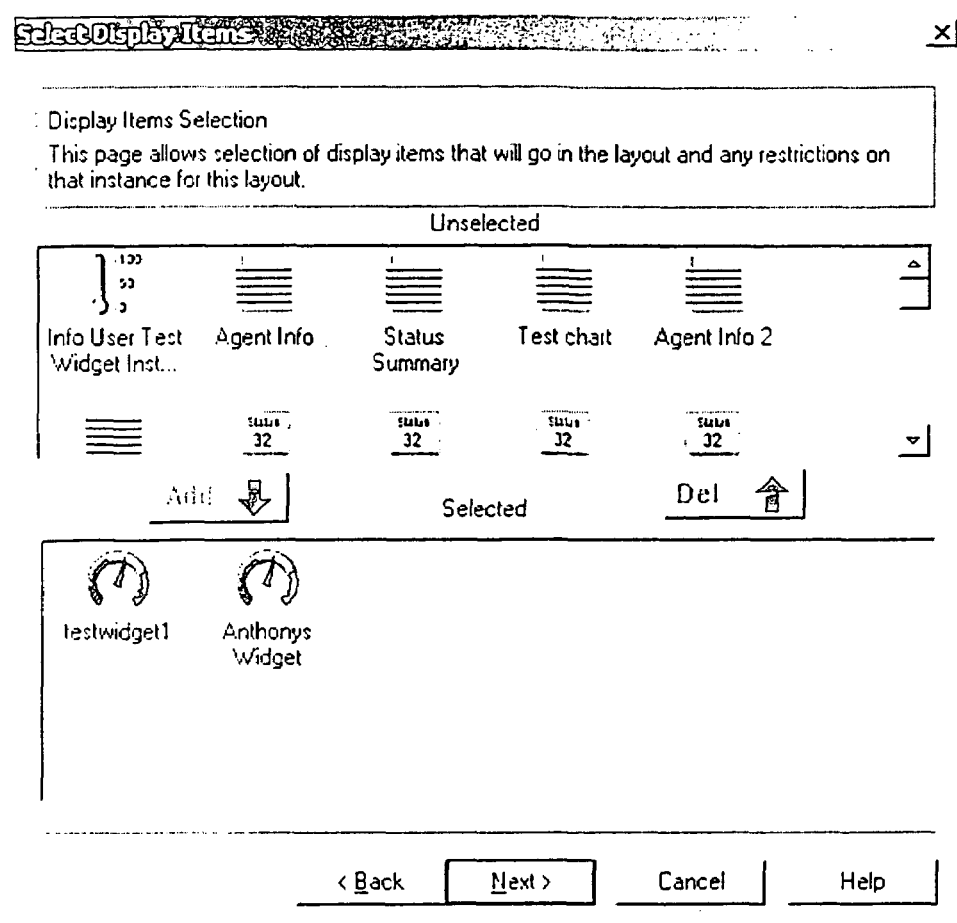

Widgets:

As discussed above, widgets are typically listed by widget type, as shown in FIGS. 17K and 17L. Widgets can be created/deleted/modified using a call to a DLL as with all the previous functions. Properties for a widget instance on creation can be edited, one example of how is shown in FIG. 17M. A widget can be associated with a threshold that can allow its appearance and behavior to change.

Thresholds:

Thresholds can be created, associated with displays, and removed using a dll, as shown in FIGS. 17N–17R. Each threshold is associated with a name, a description, and an identifying number. There are 0 or more threshold sequences arbitrary threshold sequences and that can be associated with a threshold identifier. Each sequence can be associated with one or more set of comparisons, between a field and a value.

Sequences are evaluated in order and short circuited if a threshold comparison is violated. Each sequence is associated with a schema that takes effect when that threshold is violated. The schema can be composed of actions and properties, such as change background color or send email.

InfoUsers:

As shown in FIGS. 17S–17Z, InfoUsers are associated with a unique numeric identifier, a name, a password, and one or more layouts. For any given layout they may have different positions, colors, labels, and may have different permissions (to modify) than other users sharing the same layout.

Figure 18A:
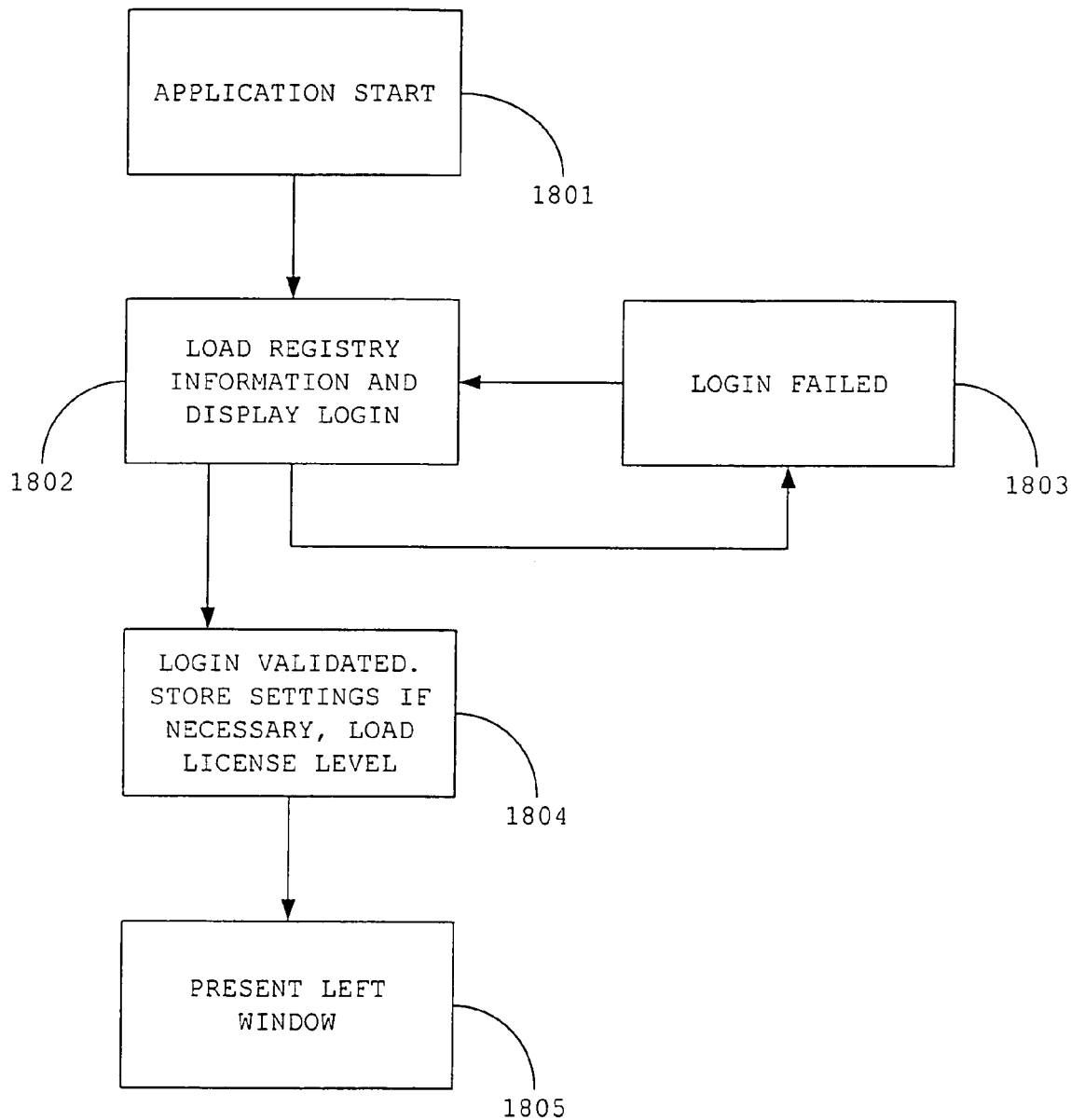
FIG. 18A shows a flow diagram used by a configuration module, according to one aspect of the present invention.
Figure 18B:
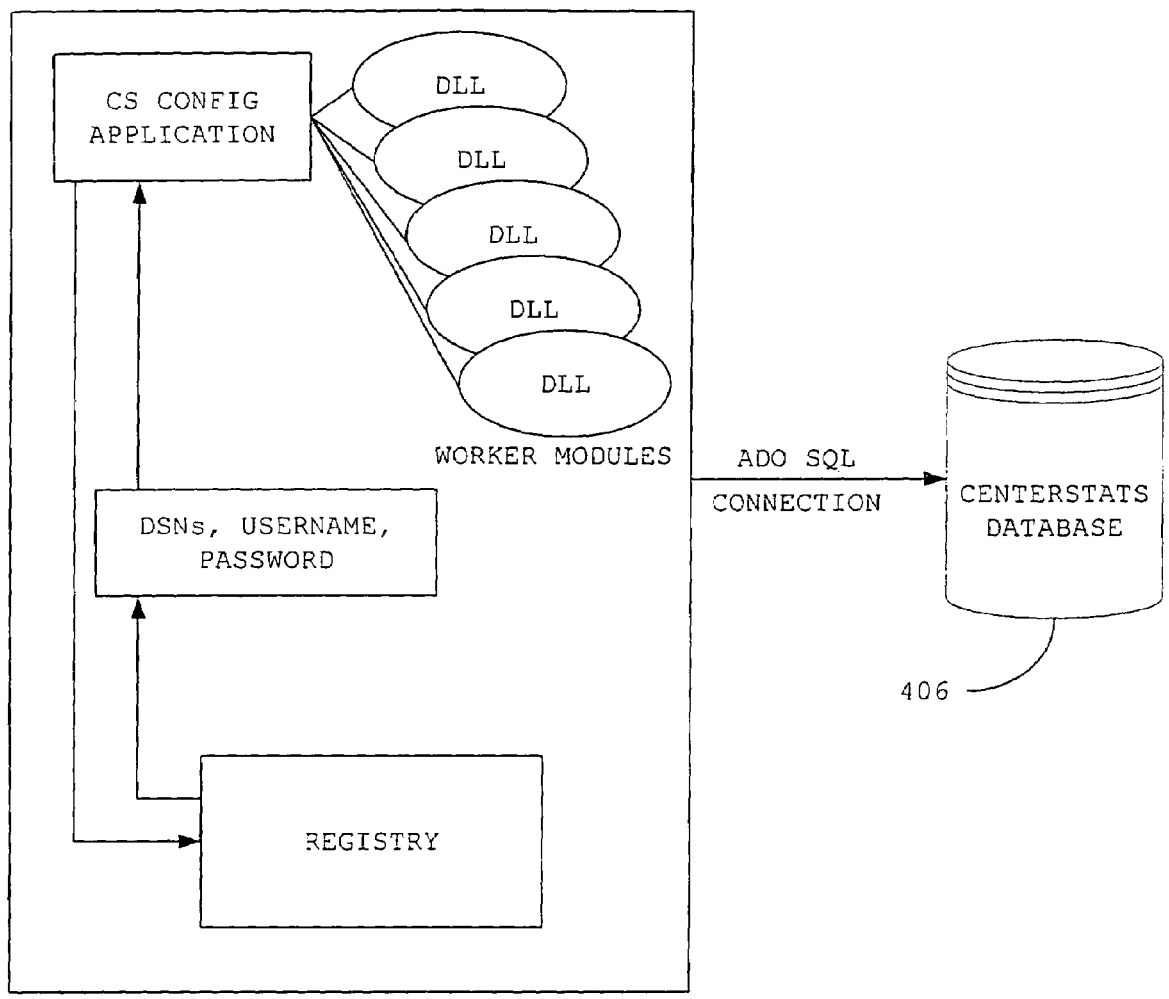
FIG. 18B is a block diagram showing the architecture of the configuration module, according to one aspect of the present invention.

FIGS. 18A–18B shows a block diagram of using the configuration tool, according to another aspect of the present invention. In FIG. 18A, steps 1801–1805 describe the process of the configuration tool. The application start-up is labeled as step 1801. Step 1802 prompts for user login and loads registry information. Validation of login information is done in step 1803 and repeats until a valid login is entered or user cancels and terminates application. Once validation has occurred step 1804 includes loading stored settings and license (access) level(s). Step 1804 may include permission levels and access rights information. Based on the permissions and/or license level, step 1805 will load the appropriate left window of the application.

FIG. 18B shows the architecture of system 1806 in config module 209A. System 1806 is dll based and allows for setup time for each installation.

Monitor Utility 209B

Monitor utility 209B allows administrator to monitor the state of any collector. Each collector thread can be started or stopped from monitor tool 209B. Administrators can view the number of objects collected as well as the health of the collectors.

Designer Utility 209C

Designer utility 209C allows administrators to Create DTS packages for DTS collector 203C. For most DTS packages the standard outputs from the DTS designer will be sufficient. For certain complex situations, it may be necessary to modify the basic DTS package.

Designer utility 209C connects to a source database and reads database schemas. Database schemas are then displayed to a user in a user-understandable format, and a DTS packet is then created.

Designer utility 209C creates tables in the storage module 204A and then creates the package(s). In addition to creating the tables in database 204, DTS designer utility 209C creates storage and trigger procedures.

Figure 16C:
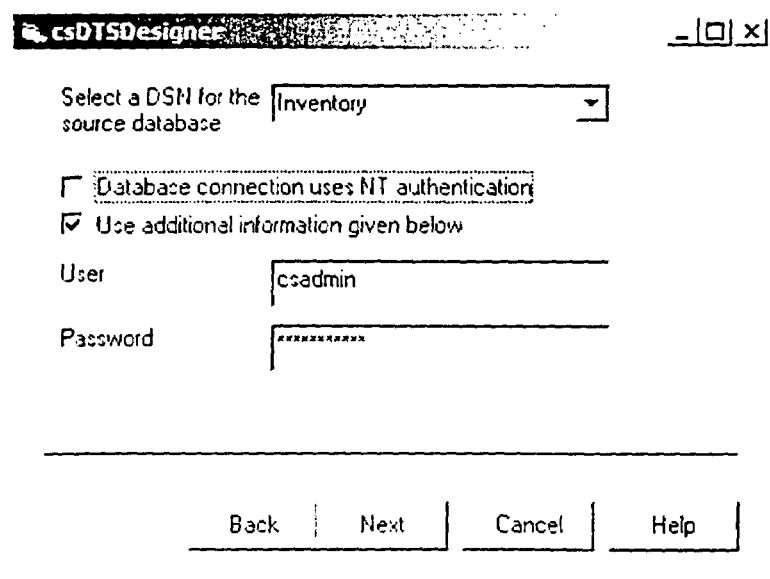
Figure 16D:
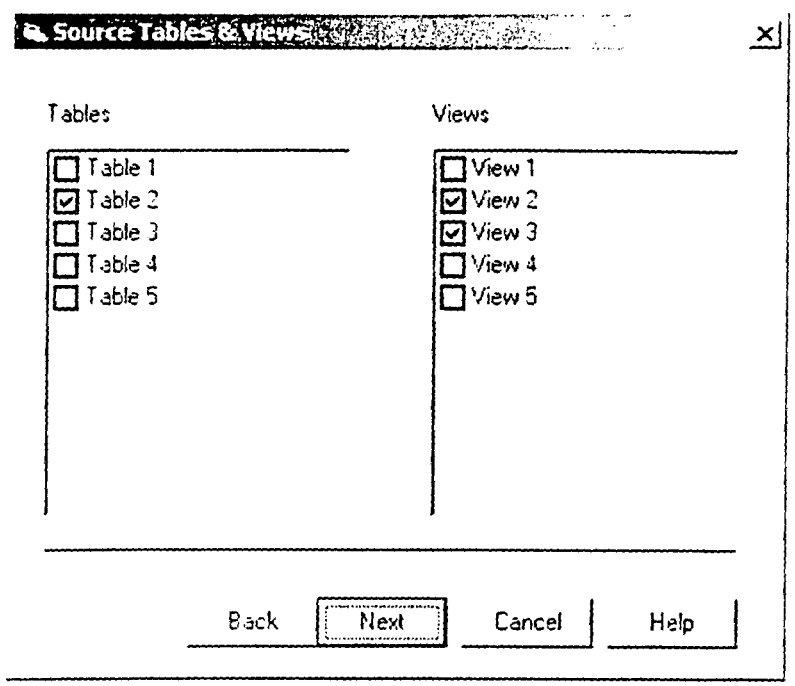
Figure 16E:
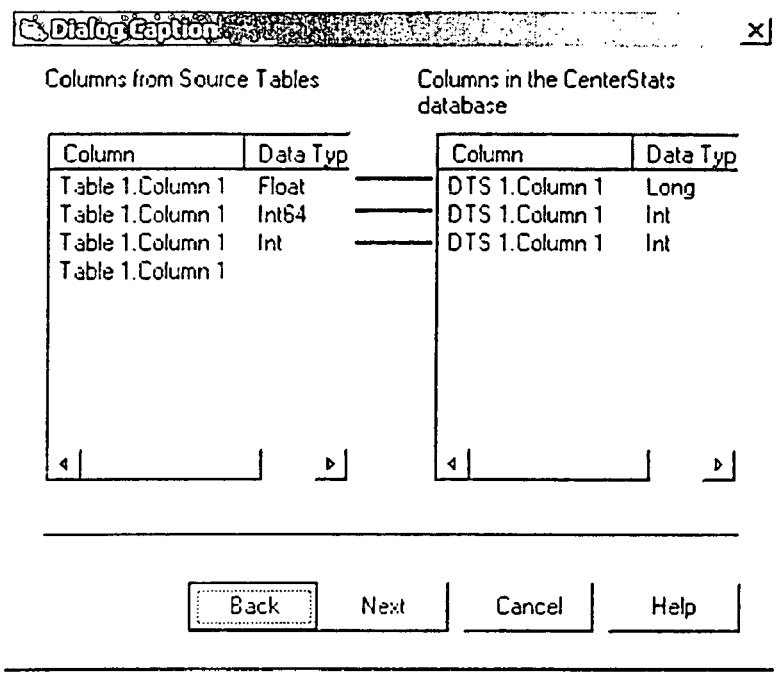

Examples of this designer tool are provided in FIGS. 16C–16E. Administrators log in to a source database using one of the available login methods, as shown in FIG. 16C. System 104 then shows a list of all available tables and views from the source database. Administrators can pick one or more tables and view for this DTS package, as shown in FIG. 16D. This DTS package can transform data from the selected tables and views. The DTS Designer utility 209C will create the necessary tables, stored procedures and a simple DTS package to transform data from the source database to system 104 database 204, as shown in FIG. 16E.

DTS Package Modifier

Overview

DTS_Package_Modifier includes computer executable process steps, for example, in a Visual Basic 6.0 program, to modify a DTS package that has been saved to a file so that every time the package is executed it will only get new records from a source table to put into the destination table. DTS_package Modifier creates (or replaces) an ActiveX Script task for each existing basic DTS package. The ActiveX Script task modifies a Source SQL Statement property of the Data Pump task so that it will only get new records. By only getting new records from a source table, the package does not have to empty-out the destination table each time it runs before bringing over every single record from the source. This makes the package run much more efficiently.

User Instructions:

When a DTS program starts it will ask to identify the DTS package file with which a user wants to work. If the user selects a DTS package file the program will load the package in memory and display the main form. The program will then identify the DTS tasks that are in the package, put their names in a box. It will then select the first DTS task, identify all of the columns in the source table, load them in a list box and highlight any columns that were in the Source SQL Statement of the Data Pump Task.

A user can review a list of source column names and highlight the ones that can be used to distinguish new records from old records. Usually, it will only be necessary to select one column because most tables have an "ID" column or a "Date/time created" column that can be used to identify the last record to be put into a destination table. However, if it is necessary to select more than one column the user can do that (for example: DataSourceID, PeriodTypeID, and StartingDateTime).

Once the columns have been selected the user can click the "Create Script" button which will display the "Filter Editor" form. This form will show the selected columns in 2 list boxes (source and destination). Also, the SELECT statement that will be used to retrieve the last value from the destination table will be displayed in an edit control. The SELECT statement will "SELECT" and "GROUP BY" all of the column names except the last one. The last one will have the MAX aggregate function applied to it in the SELECT list. The user can "drag" column names around to change their order in the "Source Columns" list box and the SELECT statement will be modified to reflect the new sequence.

When the user returns to the main form, the list of columns will have been replaced with an edit control displaying the text of the new ActiveX Script task. The user can review and modify the text of the script.

System 104 uses 2 registry entries. They may be stored in the following key:

HKEY_CURRENT_USER\Software\VB and VBA Program Settings\DTS_Package_Modifier\Startup The 2 values are:

LastFile—the name of the last DTS package file worked on

ScriptTemplateFile—the name of the ActiveX script template file

The ActiveX script template file contains the VB script code that gets put into the ActiveX Script task with some tokens that get replaced by the program to customize it for each DTS task. The tokens are:

REPLACE_WITH_DESTINATION_SERVER
REPLACE_WITH_DESTINATION_DATABASE
REPLACE_WITH_DATA_PUMP_TASK_NAME
REPLACE_WITH_SOURCE_TABLE
REPLACE_WITH_GET_WHAT_WE_ALREADY_HAVE_QUERY

After the tokens are replaced, the modified script is saved to a file named "CutoffScriptOut.txt" in the same directory as the template file. This file is created for debugging purposes.

Figure 19:
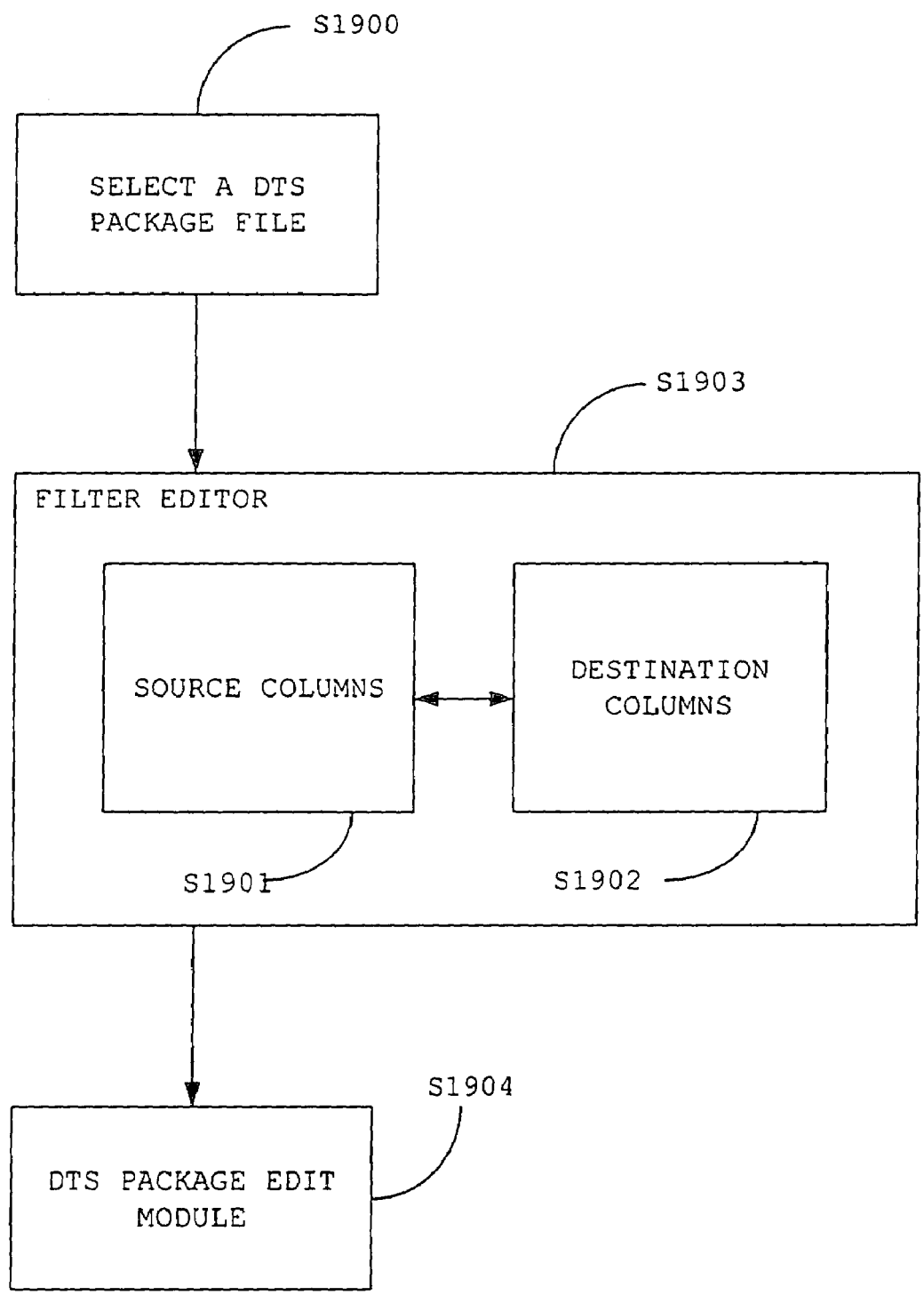
FIG. 19 is a flow diagram pf process steps used by a DTS modifier, according to one aspect of the present invention.

FIG. 19 shows a flow diagram of process steps used for using a DTS modifier package. In step 1900, a DTS package file is selected. In step 1903, a filter editor filters the columns. In step S1904, DTS package identifies new information.

Figure 19A:
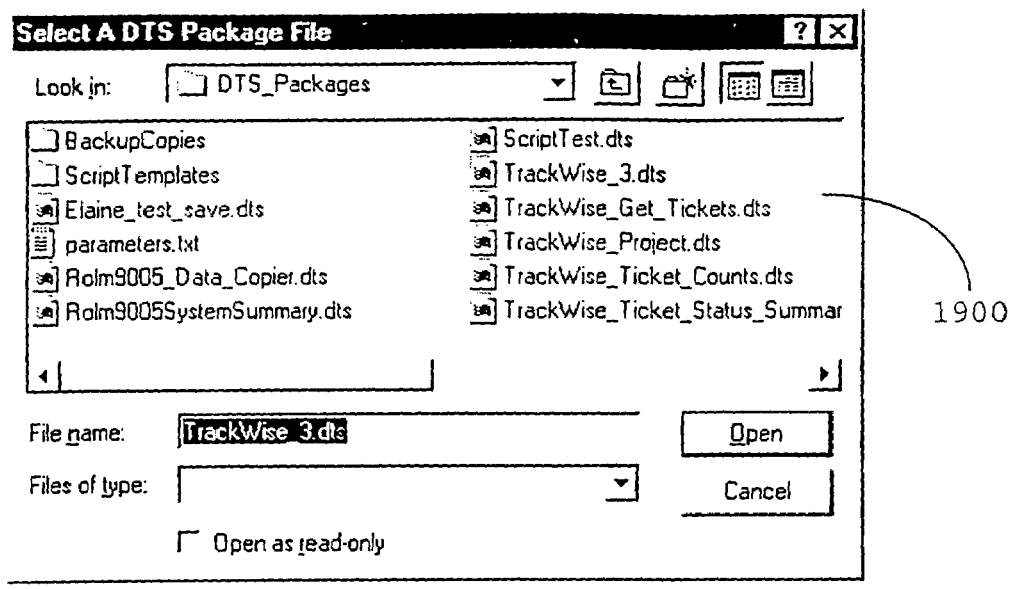
Figure 19B:
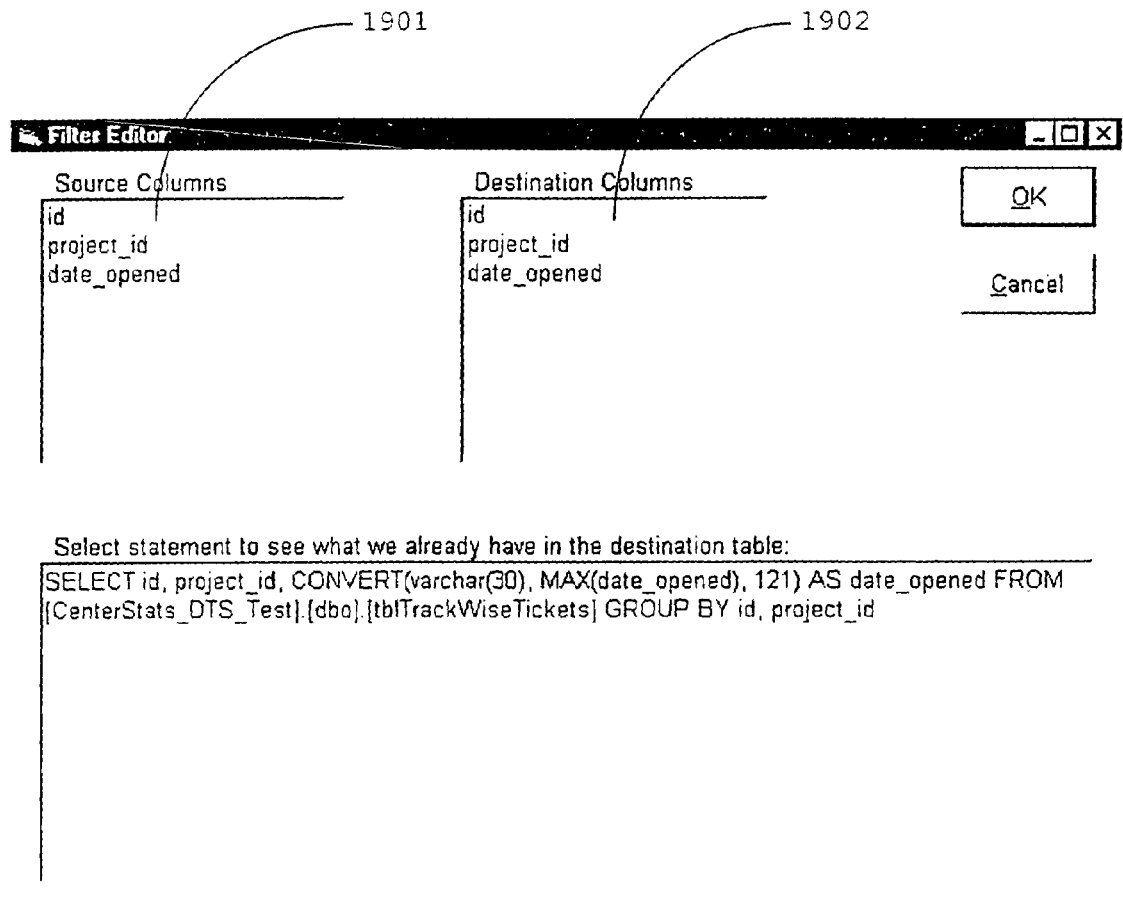
Figure 19C:
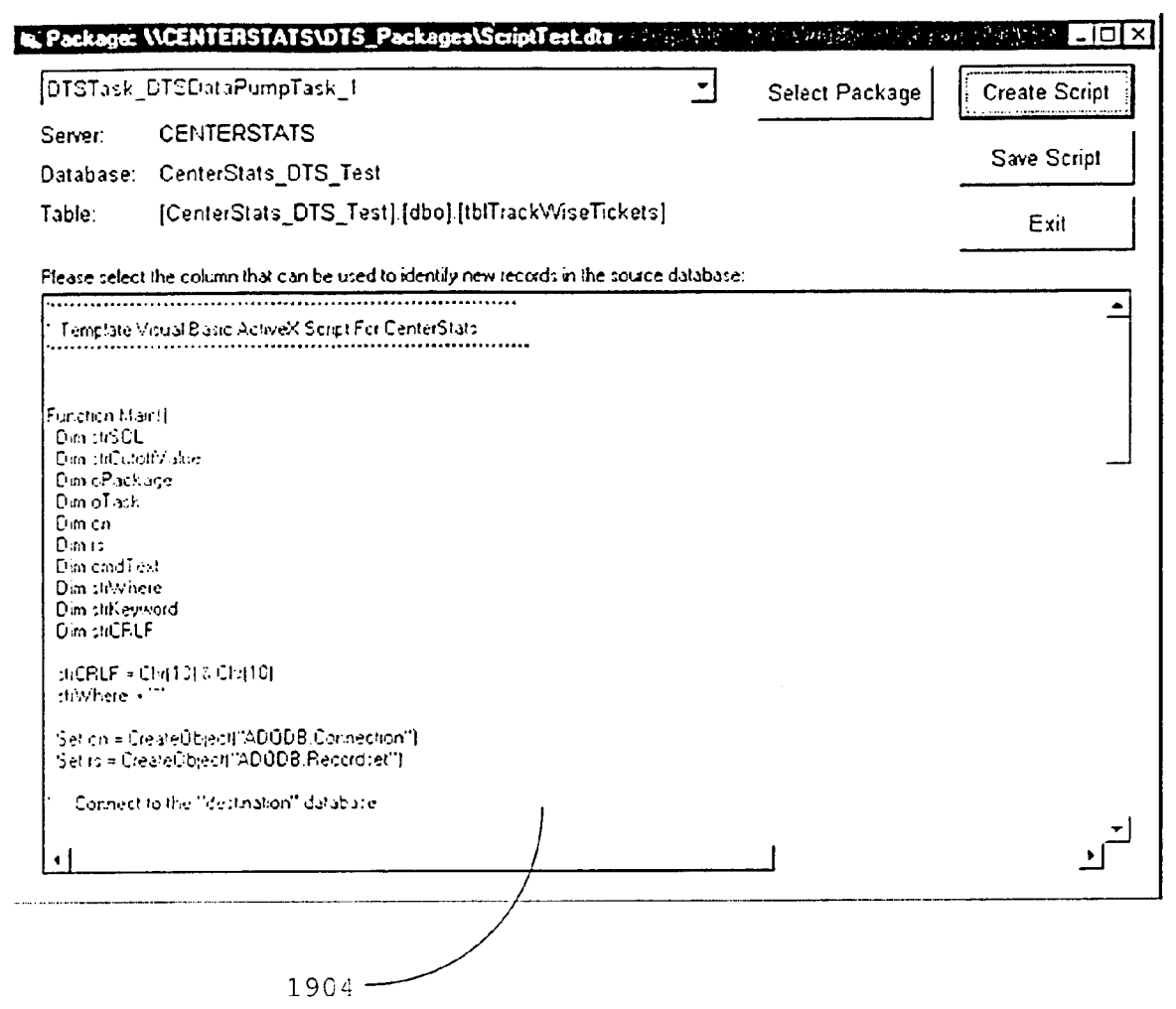

FIGS. 19A–19C illustrates examples of a modifier package using 1900–1904, according to one aspect of the present invention, as described above. [0514] FIG. 19A shows a listing of various DTS packages in screen 1900 (S1900). FIG. 19B shows a filter editor with source columns 1901 (S1901) and destination columns 1902 (S1902). FIG. 19C shows a screen shot for collecting data and identifying new records in a source table (S1904).

Database Designer Utility: The data base designer utility 209D allows system integrators to add stored procedures and alerts in database 204 and the related storage procedures.

KPI's:

System 104 allows users to identify key performance indicators ("KPI") in their business environment and track them using the systems described above. KPI's may vary for different users. For example, a CEO requires summary metrics to be tracked. Conversely, a middle manager requires detail or "drillable" metric "views" that correspond to the various processes for which the middle manager is responsible.

While the present invention is described above with respect to what is currently considered it's preferred embodiments, it is to be understood that the invention is not limited to that described above. To the contrary, the invention is intended to cover various modifications an equivalent arrangement within the spirit and scope of the appended claims.

What is claimed is:

1. A method for collecting data for analysis from plural data sources, comprising:

receiving data from the plural data sources in accordance with a collection schedule; wherein plural data collectors collect data from a finance data source, manufacturing data source, inventory data source and legacy system data source; wherein the finance data source provides financial indicators for making financial decisions, manufacturing data source provides manufacturing data points for manufacturing related information, inventory data source provides inventory status and legacy data source provides data in a proprietary format; and the collection schedule is set up by a collection scheduler;

parsing the data collected from the plural data sources, wherein a parsing module parses the collected data; wherein a processor parses the data;

scheduling data alerts, wherein a scheduling module schedules the data alerts;

evaluating threshold conditions based on data collection;

evaluating alert conditions at time of data collection, wherein alert and threshold conditions are set up to evaluate pre-defined conditions of incoming data and data that is displayed to a user and are independent of any action that is taken when a condition is met; and generating a message if a threshold is violated using information stored in a schema; wherein the schema comprises of actions and properties; and the message is generated using electronic mail, telephone call, pager and on paper based on schema actions and properties.

2. A system for collecting data, comprising of;

plural data collectors that collect data based on a data collection schedule from plural data sources; wherein plural data collectors collect data from a finance data source, manufacturing data source, inventory data source and legacy system data source; wherein the finance data source provides financial indicators for making financial decisions, manufacturing data source provides manufacturing data points for manufacturing related information, inventory data source provides inventory status and legacy data source provides data in a proprietary format;

a scheduling module that schedules data collection and data alerts, wherein data alerts are based on a schema that stores properties and action; and are generated using electronic mail, telephone call, pager and on paper; and alert conditions are evaluated at time of data collection, wherein alert and threshold conditions are set up to evaluate pre-defined conditions of incoming data and data that is displayed to a user, and are independent of any action that is taken when a condition is met; and a reporting module, coupled to the scheduling module, wherein the reporting module provides various reports, based on the data collected from the plural data collectors.

3. The system of claim 2, further comprising:

a triggering module that activates an event based on collected data.

4. The system of claim 3, wherein the triggering module sends an electronic mail based on the collected data.

5. The system of claim 2, wherein the data collectors include a legacy data collector.

6. The system of claim 2, wherein the data collectors include an API data collector.

7. The system of claim 2, wherein the data collectors include a data transformation service data collector.

8. The system of claim 2, wherein the data collectors include a remote data collector.

9. The system of claim 2, wherein the data collectors include an XML data collector.

10. The system of claim 2, wherein the data collectors include an interactive data collector.

11. The system of claim 10, further comprising:

a database that provides data collection schedules to the collection scheduler.

12. Computer-executable process steps in computer readable memory, for collecting data for analysis from plural sources, comprising:

receiving data from plural sources in accordance with a collection schedule; wherein plural data collectors collect data from a finance data source, manufacturing data source, inventory data source and legacy system data source; wherein the finance data source provides financial indicators for making financial decisions, manufacturing data source provides manufacturing data points for manufacturing related information, inventory data source provides inventory status and legacy data source provides data in a proprietary format; and the collection schedule is set up by a collection scheduler;

parsing the data collected from the plural data sources, wherein a parsing module parses the collected data, wherein a processor parses the data;

scheduling data alerts, wherein a scheduling module schedules the data alerts;

evaluating threshold conditions based on data collection;

evaluating alert conditions at time of data collection, wherein alert and threshold conditions are set up to evaluate pre-defined conditions of incoming data or data that is displayed to a user and are independent of any action that is taken when a condition is met; and generating a message if a threshold is violated using information stored in a schema; wherein the schema comprises of actions and properties; and the message is generated using electronic mail, telephone call, pager and on paper based on schema actions and properties.

* * * * *